(12) United States Patent
Galvin

(10) Patent No.: US 12,657,180 B2
(45) Date of Patent: Jun. 16, 2026

(54) ADAPTIVE REAL-TIME MULTI-MODAL COMPRESSION SYSTEM WITH DYNAMIC RESOURCE ALLOCATION

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/287,077

(22) Filed: Jul. 31, 2025

(65) Prior Publication Data

US 2025/0363092 A1     Nov. 27, 2025

Related U.S. Application Data

(63) Continuation-in-part of application No. 19/048,882, filed on Feb. 8, 2025, now Pat. No. 12,417,168, which
(Continued)

(51) Int. Cl.
*G06F 16/00* (2019.01)
*G06F 9/50* (2006.01)
(Continued)

(52) U.S. Cl.
CPC ........ *G06F 16/2365* (2019.01); *G06F 9/5044* (2013.01); *G06F 16/24578* (2019.01)

(58) Field of Classification Search
CPC .............. G06F 16/2365; G06F 9/5044; G06F 16/24578; H03M 7/3059; H03M 7/607;
(Continued)

(56) References Cited

U.S. PATENT DOCUMENTS 7,629,922 B2    12/2009    Winstead et al.
7,876,257 B2     1/2011    Vetro et al.
(Continued)

FOREIGN PATENT DOCUMENTS

CN         118677928 A      9/2024

OTHER PUBLICATIONS

Cai, Yuanhao et al; "Mask-guided Spectral-wise Transformer for Efficient Hyperspectral Image Reconstruction", Conference on Computer Vision and Pattern Recognition, pp. 17502-17511, 2022.
(Continued)

*Primary Examiner* — Anhtai V Tran
(74) *Attorney, Agent, or Firm* — GALVIN PATENT LAW LLC; Brian R. Galvin

(57) ABSTRACT

A system and method for adaptive real-time multi-modal compression with dynamic resource allocation provides intelligent compression optimization based on continuously monitored device conditions. The system monitors battery level, CPU utilization, and memory availability while classifying incoming multi-modal data streams comprising image, audio, text, and sensor data to determine processing priorities. Multi-objective optimization balances compression efficiency, reconstruction quality, and energy consumption using evolutionary algorithms that generate optimal parameters for an adaptive variational autoencoder. The autoencoder features dynamically selectable processing complexity, adjustable latent space dimensionality, and modality-specific processing layers. The system automatically switches between operational modes including emergency mode triggered by resource constraints, which applies maximum compression settings and intelligent data triage. Continuous learning adapts compression parameters based on observed performance outcomes, improving future optimization decisions. The system enables homomorphic
(Continued)

operations on compressed data and provides enhanced compression performance under varying resource constraints across diverse edge computing applications.

20 Claims, 27 Drawing Sheets

Related U.S. Application Data is a continuation-in-part of application No. 18/890,774, filed on Sep. 20, 2024, now Pat. No. 12,225,105, which is a continuation-in-part of application No. 18/657,683, filed on May 7, 2024, now Pat. No. 12,159,216, which is a continuation-in-part of application No. 18/648,340, filed on Apr. 27, 2024, now Pat. No. 12,166,507, which is a continuation-in-part of application No. 18/427,716, filed on Jan. 30, 2024, now Pat. No. 12,093,972, which is a continuation-in-part of application No. 18/410,980, filed on Jan. 11, 2024, now Pat. No. 12,068,761, which is a continuation-in-part of application No. 18/537,728, filed on Dec. 12, 2023, now Pat. No. 12,058,333.

(51) Int. Cl.
  *G06F 16/23* (2019.01)
  *G06F 16/2457* (2019.01)

(58) Field of Classification Search
  CPC ... H03M 7/6082; G06N 3/0464; G06N 3/047; G06N 3/0475; G06N 3/08; G06N 3/0455; H04L 9/008

See application file for complete search history.

(56) References Cited

U.S. PATENT DOCUMENTS

| | | | |
|---|---|---|---|
| 10,956,787 B2 | 3/2021 | Rothberg et al. | |
| 11,237,549 B2 | 2/2022 | Kane et al. | |
| 11,656,353 B2 | 5/2023 | Li et al. | |
| 11,915,690 B1 | 2/2024 | Chang et al. | |
| 2015/0308856 A1* | 10/2015 | Srinivasan | H04L 67/12 |
| | | | 340/870.02 |
| 2019/0081637 A1* | 3/2019 | Pool | G06N 5/046 |
| 2020/0272605 A1* | 8/2020 | More | G06F 16/1744 |
| 2020/0404340 A1 | 12/2020 | Xu et al. | |
| 2021/0281491 A1* | 9/2021 | Yelahanka Raghuprasad | |
| | | | G06N 3/084 |
| 2021/0344549 A1* | 11/2021 | Babington | H03M 7/6082 |
| 2022/0246158 A1 | 8/2022 | Nam et al. | |

OTHER PUBLICATIONS

Cai, Yuanhao et al; "MST++: Multi-stage Spectral-wise Transformer for Efficient Spectral Reconstruction", Conference on Computer Vision and Pattern Recognition, 2022.

He, Kaiming et al; "Deep Residual Learning for Image Recognition", Conference on Computer Vision and Pattern Recognition, pp. 770-778, 2016.

* cited by examiner

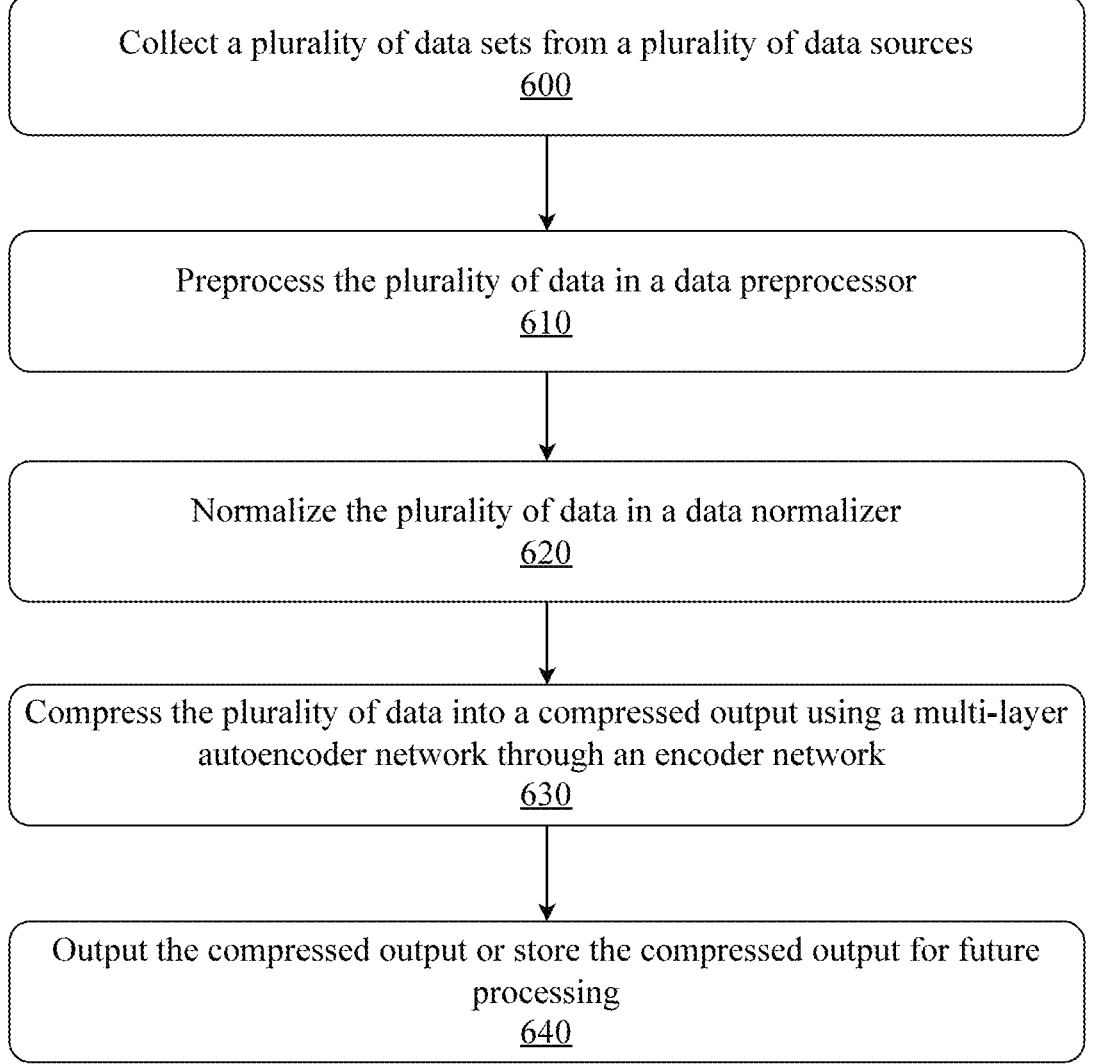

Collect a plurality of data sets from a plurality of data sources
600

Preprocess the plurality of data in a data preprocessor
610

Normalize the plurality of data in a data normalizer
620

Compress the plurality of data into a compressed output using a multi-layer autoencoder network through an encoder network
630

Output the compressed output or store the compressed output for future processing
640

FIG. 6

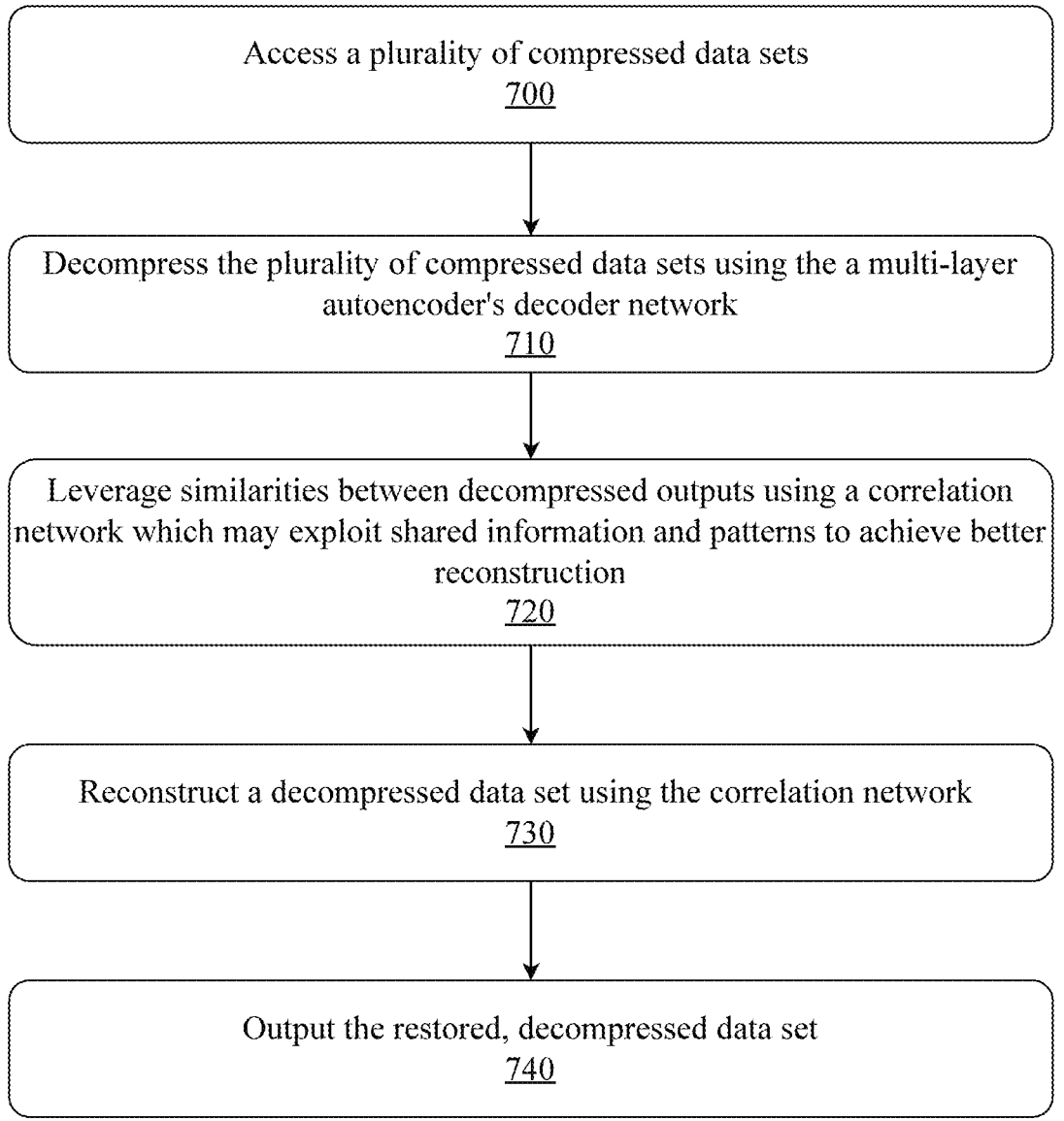

Access a plurality of compressed data sets
700

Decompress the plurality of compressed data sets using the a multi-layer autoencoder's decoder network
710

Leverage similarities between decompressed outputs using a correlation network which may exploit shared information and patterns to achieve better reconstruction
720

Reconstruct a decompressed data set using the correlation network
730

Output the restored, decompressed data set
740

FIG. 7

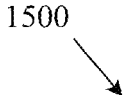
1500
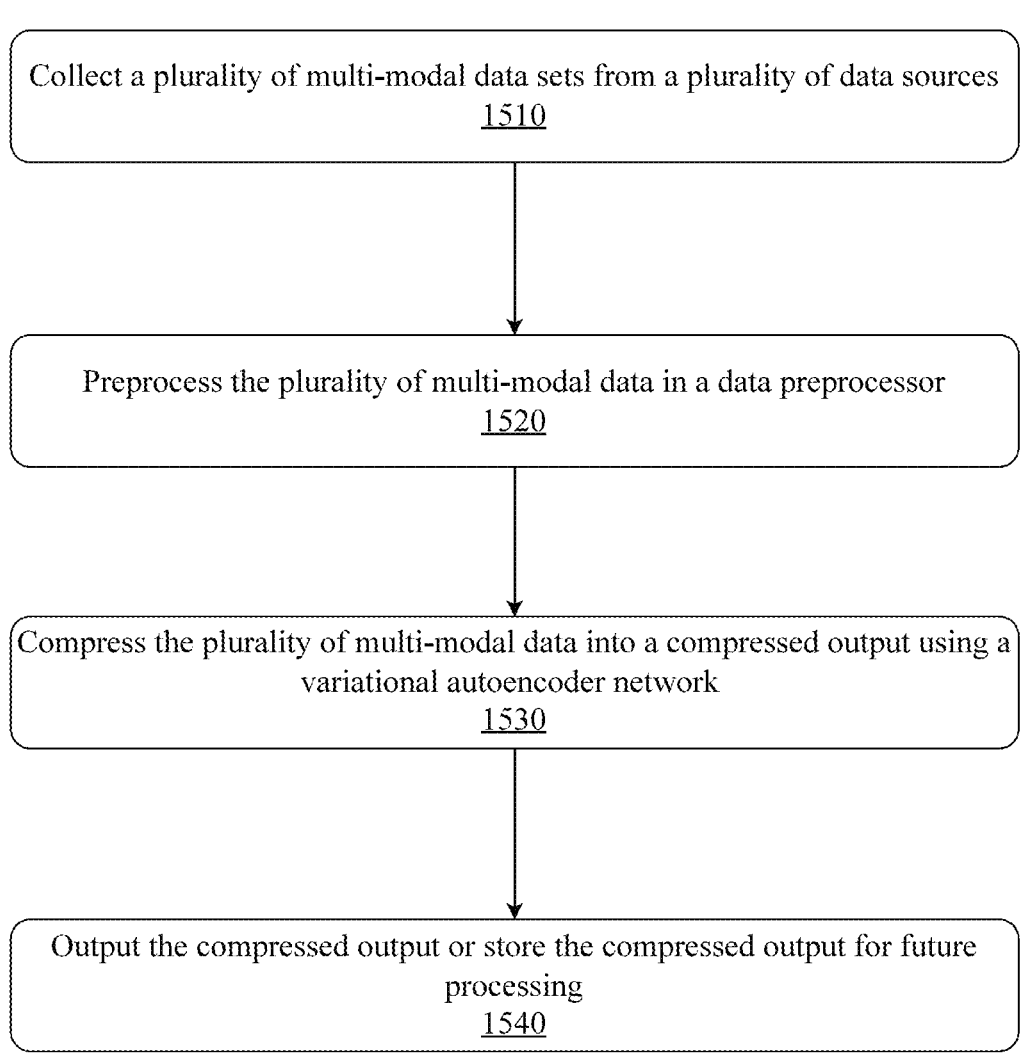
Collect a plurality of multi-modal data sets from a plurality of data sources
1510
Preprocess the plurality of multi-modal data in a data preprocessor
1520
Compress the plurality of multi-modal data into a compressed output using a variational autoencoder network
1530
Output the compressed output or store the compressed output for future processing
1540
FIG. 15

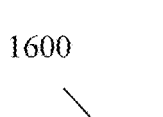
1600
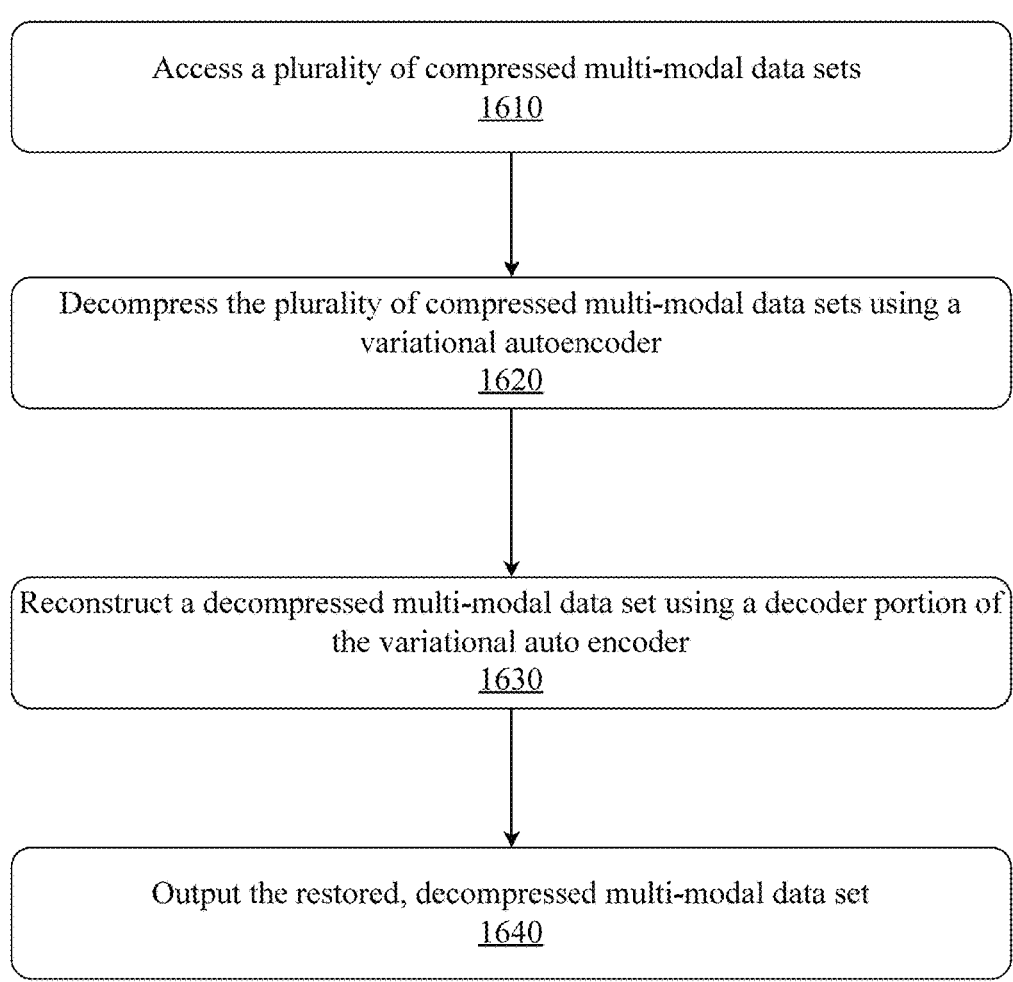
Access a plurality of compressed multi-modal data sets
1610
Decompress the plurality of compressed multi-modal data sets using a
variational autoencoder
1620
Reconstruct a decompressed multi-modal data set using a decoder portion of
the variational auto encoder
1630
Output the restored, decompressed multi-modal data set
1640
FIG. 16

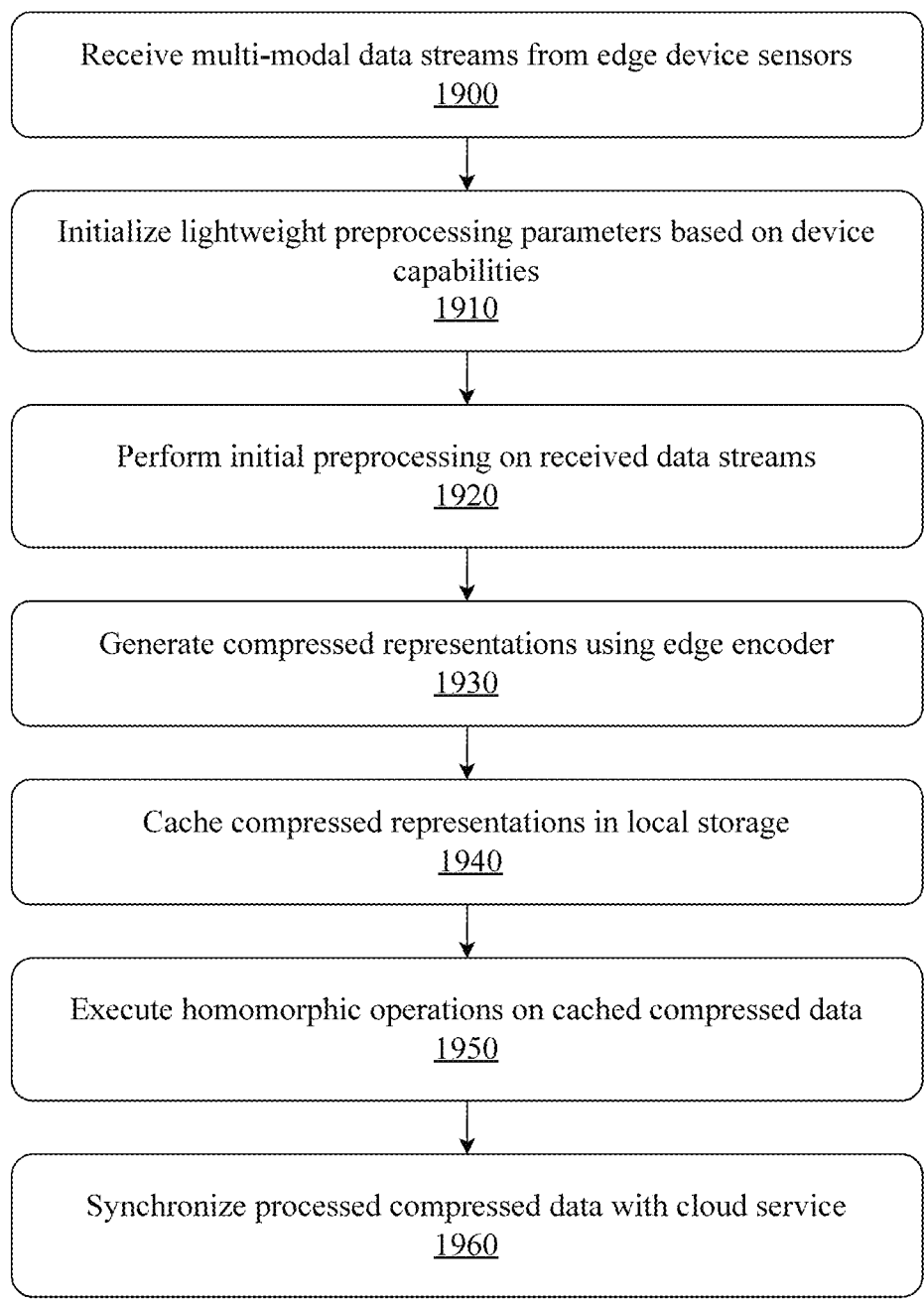

Receive multi-modal data streams from edge device sensors
1900

Initialize lightweight preprocessing parameters based on device capabilities
1910

Perform initial preprocessing on received data streams
1920

Generate compressed representations using edge encoder
1930

Cache compressed representations in local storage
1940

Execute homomorphic operations on cached compressed data
1950

Synchronize processed compressed data with cloud service
1960

FIG. 19

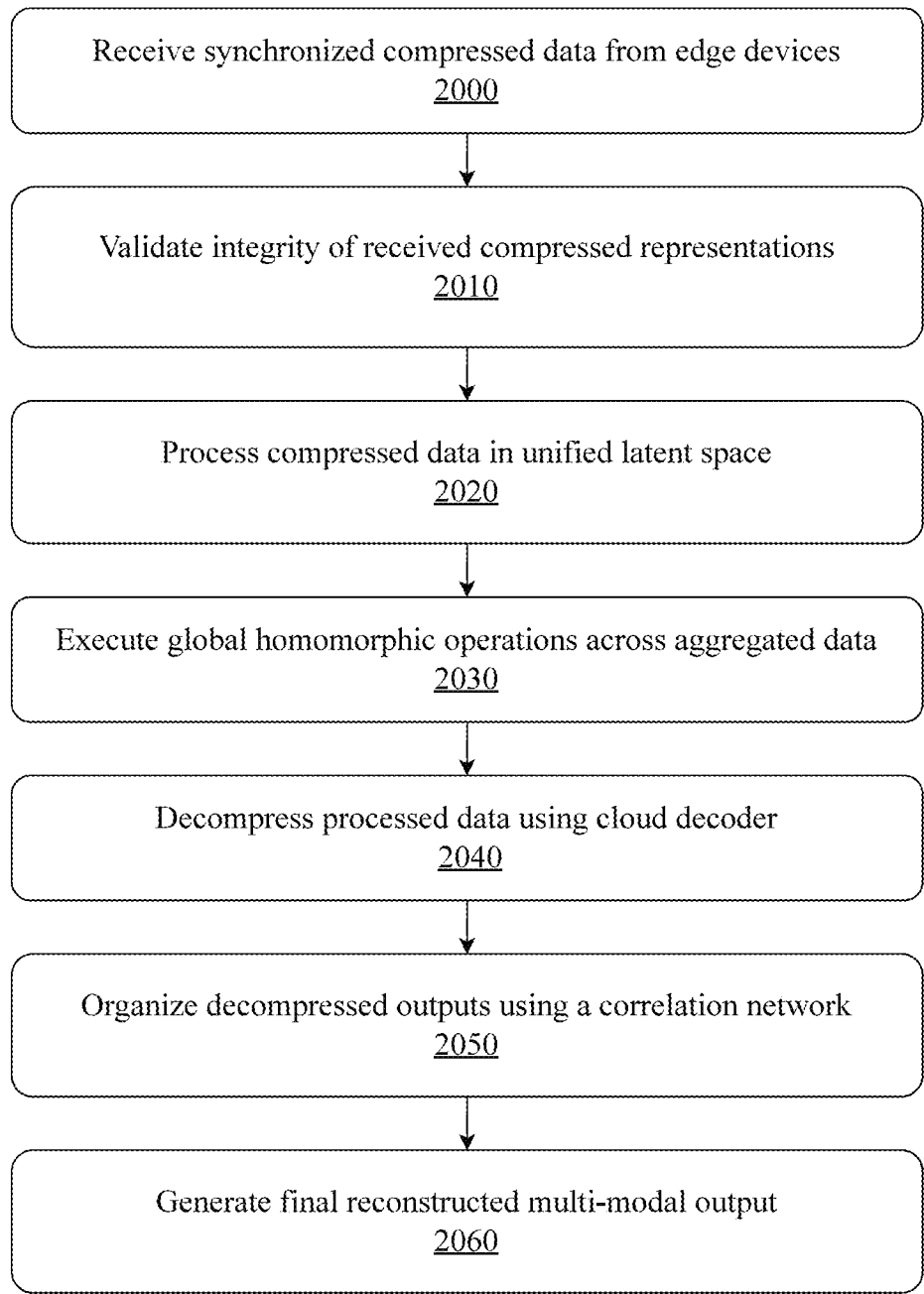

Receive synchronized compressed data from edge devices
2000

Validate integrity of received compressed representations
2010

Process compressed data in unified latent space
2020

Execute global homomorphic operations across aggregated data
2030

Decompress processed data using cloud decoder
2040

Organize decompressed outputs using a correlation network
2050

Generate final reconstructed multi-modal output
2060

FIG. 20

Figure 22:
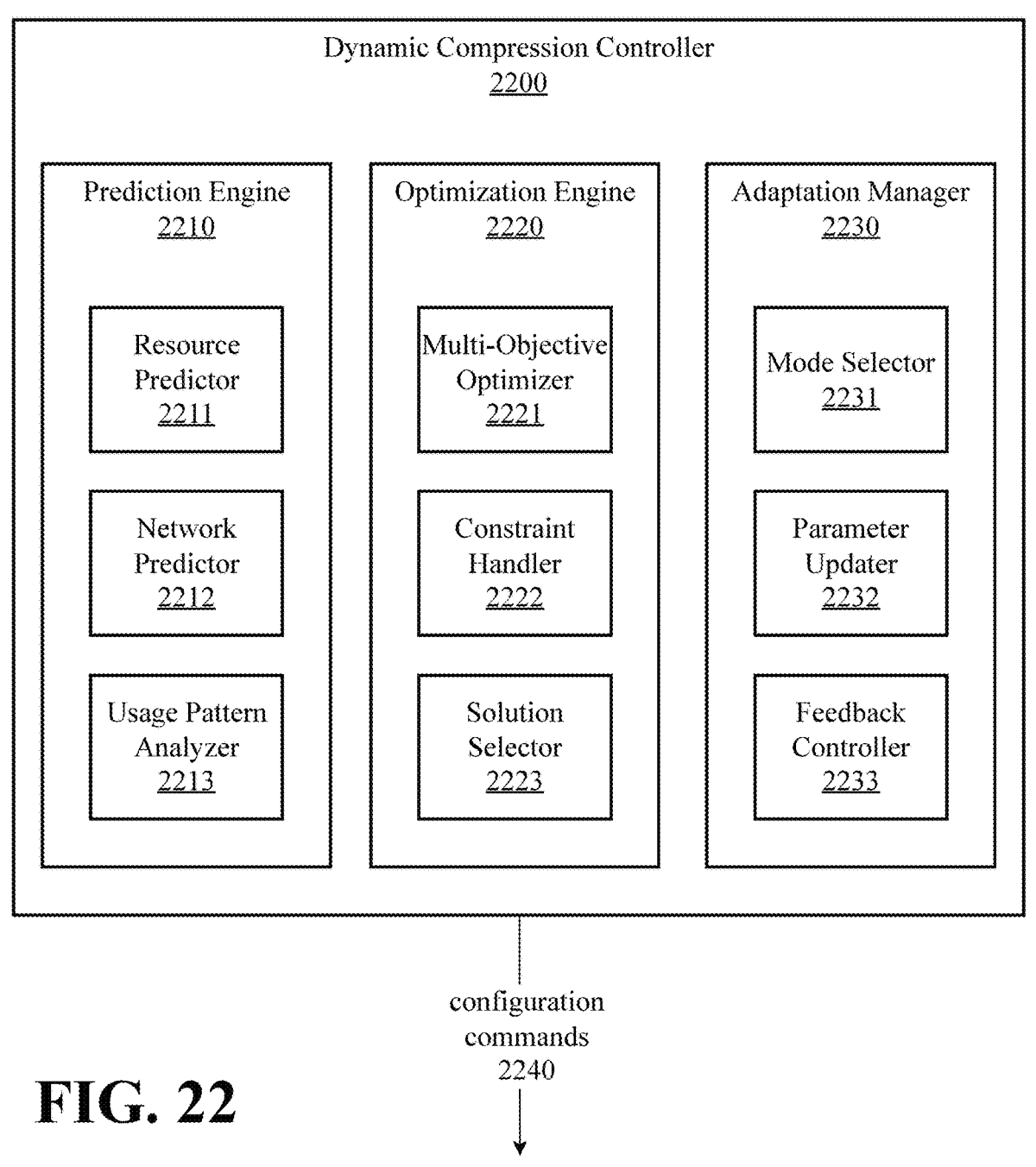

Dynamic Compression Controller
2200

Prediction Engine
2210

Resource
Predictor
2211

Network
Predictor
2212

Usage Pattern
Analyzer
2213

Optimization Engine
2220

Multi-Objective
Optimizer
2221

Constraint
Handler
2222

Solution
Selector
2223

Adaptation Manager
2230

Mode Selector
2231

Parameter
Updater
2232

Feedback
Controller
2233 configuration
commands
2240

ADAPTIVE REAL-TIME MULTI-MODAL COMPRESSION SYSTEM WITH DYNAMIC RESOURCE ALLOCATION

CROSS-REFERENCE TO RELATED APPLICATIONS

Priority is claimed in the application data sheet to the following patents or patent applications, each of which is expressly incorporated herein by reference in its entirety:

Continuation-in-part of application Ser. No. 19/048,882, filed on Feb. 8, 2025, now U.S. Pat. No. 12,417,168, which is a continuation-in-part of application Ser. No. 18/890,774, filed on Sep. 20, 2024, now U.S. Pat. No. 12,225,105, which is a continuation-in-part of application Ser. No. 18/657,683, filed on May 7, 2024, now U.S. Pat. No. 12,159,216, which is a continuation-in-part of application Ser. No. 18/648,340, filed on Apr. 27, 2024, now U.S. Pat. No. 12,166,507, which is a continuation-in-part of application Ser. No. 18/427,716, filed on Jan. 30, 2024, now U.S. Pat. No. 12,093,972, which is a continuation-in-part of application Ser. No. 18/410,980, filed on Jan. 11, 2024, now U.S. Pat. No. 12,068,761, which is a continuation-in-part of application Ser. No. 18/537,728, filed on Dec. 12, 2023, now U.S. Pat. No. 12,058,333.

BACKGROUND OF THE INVENTION

Field of the Art

The present invention relates to the field of adaptive data compression and edge computing resource management, and more specifically, to systems and methods that perform real-time multi-modal compression with dynamic resource allocation and emergency response capabilities.

Discussion of the State of the Art

Edge computing devices including Internet-of-Things (IoT) sensors, mobile devices, and autonomous vehicles operate under severe resource constraints including limited battery power, restricted computational capacity, and variable network connectivity. These devices must process growing volumes of multi-modal data comprising images, audio, text, and sensor readings while maintaining acceptable quality and meeting real-time processing requirements.

Traditional data compression techniques operate with fixed parameters determined at design time, without consideration of current device resource availability or operational context. Conventional algorithms such as JPEG for images, MP3 for audio, and ZIP for text fail to adapt when device conditions change, leading to suboptimal performance when battery levels drop, processing loads increase, or network bandwidth becomes limited.

Recent neural network-based compression methods, particularly autoencoders and variational autoencoders, require substantial computational resources and are designed for cloud environments with abundant processing power. These methods do not address dynamic resource constraints in edge computing scenarios nor provide mechanisms for adapting compression behavior based on real-time device conditions.

Existing multi-modal compression techniques focus on exploiting correlations between different data types to achieve better compression ratios. However, these approaches do not consider varying data criticality during resource-constrained operation nor provide emergency response capabilities when system resources become critically low.

What is needed is a system and method for adaptive real-time multi-modal compression that continuously monitors device resource state, automatically adjusts compression parameters through multi-objective optimization, implements emergency response modes with intelligent data prioritization when resources become critically constrained, and incorporates continuous learning capabilities to improve performance over time. Such a system would enable edge computing devices to maintain optimal compression performance under varying operational conditions while ensuring continued operation during crisis situations.

SUMMARY OF THE INVENTION

The inventor has conceived and reduced to practice, a system and method for adaptive real-time multi-modal compression with dynamic resource allocation provides intelligent compression optimization based on continuously monitored device conditions. The system monitors battery level, CPU utilization, and memory availability while classifying incoming multi-modal data streams comprising image, audio, text, and sensor data to determine processing priorities. Multi-objective optimization balances compression efficiency, reconstruction quality, and energy consumption using evolutionary algorithms that generate optimal parameters for an adaptive variational autoencoder. The autoencoder features dynamically selectable processing complexity, adjustable latent space dimensionality, and modality-specific processing layers. The system automatically switches between operational modes including emergency mode triggered by resource constraints, which applies maximum compression settings and intelligent data triage. Continuous learning adapts compression parameters based on observed performance outcomes, improving future optimization decisions. The system enables homomorphic operations on compressed data and provides enhanced compression performance under varying resource constraints across diverse edge computing applications.

According to a preferred embodiment, a system for adaptive real-time multi-modal compression with dynamic resource allocation is disclosed, comprising: a computing device comprising a processor and a memory; a plurality of programming instructions stored in the memory which, when operating on the processor, cause the computing device to: continuously monitor device resource state comprising battery level, CPU utilization, and memory availability; classify multi-modal input data streams to determine priority levels, wherein the multi-modal input data comprises at least two data types selected from image data, audio data, text data, and sensor data; determine optimal compression parameters by executing multi-objective optimization that balances compression efficiency, reconstruction quality, and energy consumption while satisfying resource availability constraints; compress the multi-modal input data using an adaptive variational autoencoder comprising an encoder network with dynamically selectable processing complexity, a unified latent space representation with adjustable dimensionality, and a decoder network; automatically switch between operational modes based on the monitored device resource state, including an emergency mode that applies maximum compression settings when resources fall below predetermined thresholds; and adapt compression parameters based on observed performance outcomes to improve future optimization.

According to another preferred embodiment, a method for adaptive real-time multi-modal compression with dynamic resource allocation is disclosed, comprising the steps of: continuously monitoring device resource state comprising battery level, CPU utilization, and memory availability; classifying multi-modal input data streams to determine priority levels, wherein the multi-modal input data comprises at least two data types selected from image data, audio data, text data, and sensor data; determining optimal compression parameters by executing multi-objective optimization that balances compression efficiency, reconstruction quality, and energy consumption while satisfying resource availability constraints; compressing the multi-modal input data using an adaptive variational autoencoder comprising an encoder network with dynamically selectable processing complexity, a unified latent space representation with adjustable dimensionality, and a decoder network; automatically switching between operational modes based on the monitored device resource state, including an emergency mode that applies maximum compression settings when resources fall below predetermined thresholds; and adapting compression parameters based on observed performance outcomes to improve future optimization.

According to a further aspect, the method includes determining optimal compression parameters comprising utilizing evolutionary algorithms to generate Pareto-optimal solutions that balance the compression efficiency, reconstruction quality, and energy consumption.

According to a further aspect, the method includes measuring network transmission conditions and incorporating network bandwidth availability into the multi-objective optimization.

According to a further aspect, the method includes compressing the multi-modal input data comprising processing different data types through modality-specific processing layers and integrating information across modalities through shared fusion layers.

According to a further aspect, the method includes the unified latent space representation which enables performing homomorphic operations on compressed data without decompression.

According to a further aspect, the method includes predicting future resource availability using machine learning models trained on historical resource consumption patterns.

According to a further aspect, the method includes the emergency mode comprising implementing intelligent data triage that processes critical data types before non-critical data types according to predetermined priority rankings According to a further aspect, the method includes implementing a gradual recovery process that incrementally transitions from emergency mode to normal operation while monitoring system stability.

According to a further aspect, the method includes dynamically selectable processing complexity comprising selecting between lightweight, medium, and heavy processing paths based on available computational resources.

According to a further aspect, the method includes adapting compression parameters comprising updating optimization weights based on actual compression ratios achieved and storing successful configuration parameters for retrieval under similar operational contexts.

BRIEF DESCRIPTION OF THE DRAWING FIGURES

FIG. 6 is a flow diagram illustrating an exemplary method for compressing a data input using a system for compressing and restoring data using multi-level autoencoders and correlation networks.

FIG. 7 is a flow diagram illustrating an exemplary method for decompressing a compressed data input using a system for compressing and restoring data using multi-level autoencoders and correlation networks.

FIG. 15 is a flow diagram illustrating an exemplary method for compressing a data input using a system for compressing and restoring data using variational autoencoders, according to an embodiment.

FIG. 16 is a flow diagram illustrating an exemplary method for decompressing a compressed data input using a system for compressing and restoring data using variational autoencoders, according to an embodiment.

FIG. 19 is a flow diagram illustrating an exemplary method for compressing a multi-modal data input on an edge device using a system for compressing and restoring data using variational autoencoders, according to an embodiment.

FIG. 20 is a flow diagram illustrating an exemplary method for decompressing compressed multi-modal data input on using a system for compressing and restoring data using variational autoencoders stores in a cloud environment, according to an embodiment.

FIG. 22 is a block diagram illustrating an exemplary aspect of the adaptive real-time multi-modal compression system, a dynamic compression controller subsystem.

DETAILED DESCRIPTION OF THE INVENTION

Figure 1:
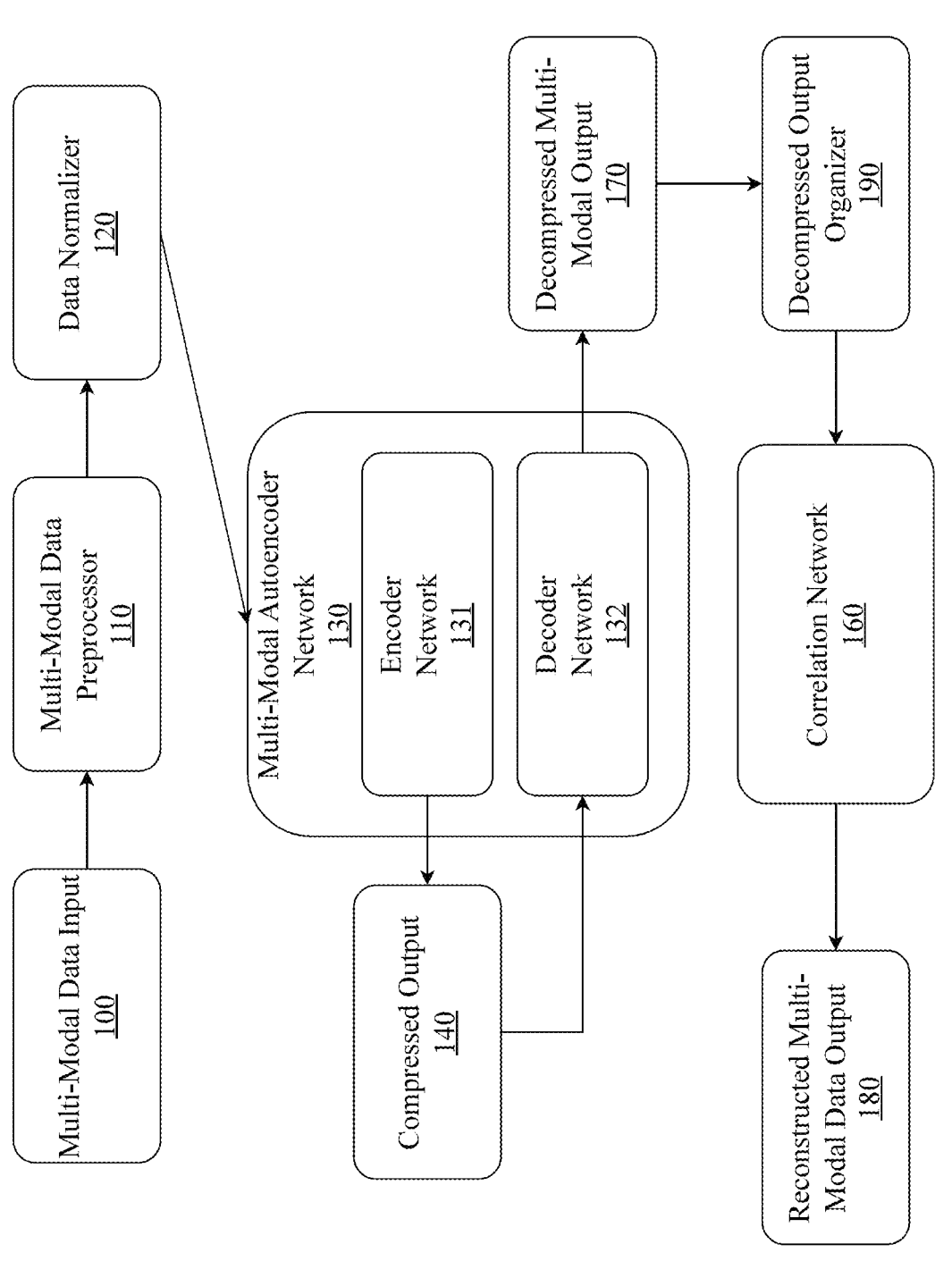
FIG. 1 is a block diagram illustrating an exemplary system architecture for compressing and restoring data using multi-level autoencoders and correlation networks.

The inventor has conceived and reduced to practice, a system and method for adaptive real-time multi-modal compression with dynamic resource allocation provides intelligent compression optimization based on continuously monitored device conditions.

First, the system can preprocess raw multi-modal data to generate a plurality of input data sets. Importantly, this multi-modal data comprises at least two different data types, allowing the system to handle diverse forms of information simultaneously. The system then compresses these input data sets into a plurality of compressed data sets using an encoder within a multi-modal variational autoencoder. This compression step is helpful for reducing data size while preserving essential information across all modalities.

Following compression, the system decompresses the compressed data sets using a decoder located within the same multi-modal variational autoencoder, obtaining a plurality of reduced output data sets. Finally, these reduced output data sets are processed through a decompressed output organizer, generating a reconstructed multi-modal output that closely resembles the original input data.

The multi-modal variational autoencoder at the heart of this system incorporates several sophisticated features. Its encoder and decoder comprise modality-specific layers for processing different data types, shared layers for integrating information across modalities, and activation functions. The modality-specific layers include convolutional layers for image data, recurrent layers for sequential data, and fully connected layers for numerical data, allowing the system to handle a wide variety of data types effectively.

One of the key innovations of this system is its ability to perform partially homomorphic compression in a unified latent space representing all data modalities. This allows for certain operations to be performed on the compressed data without fully decompressing it, offering significant advantages in terms of data privacy and computational efficiency. The system performs one or more linear operations in this unified latent space, further extending its capabilities.

The multi-modal variational autoencoder also utilizes cross-modal attention mechanisms to capture relationships between different data types, ensuring that important inter-modal correlations are preserved during the compression and decompression process.

In some implementations, the system includes a multi-modal correlation network. In this case, the output of the decompressed output organizer serves as input to this network, which then provides the final reconstructed multi-modal output. This additional step further enhances the quality of the reconstructed data by leveraging correlations across different modalities.

The inventor envisions numerous practical applications for this multi-modal homomorphic compression system. In a non-limiting use case example, the system is utilized in an industry where data privacy and security are paramount, such as healthcare or finance. For instance, a business with secure data needs, such as a hospital or a bank, uses the system to compress and analyze diverse customer or patient data. This data includes various types such as images, textual records, and time-series data from monitoring devices or transactions. The homomorphic properties of the compression allow for analysis of this data while maintaining privacy, facilitating large-scale studies or analyses while ensuring compliance with relevant data protection regulations.

In another non-limiting use case example, the system is employed in a field requiring real-time processing of multi-modal sensor data, such as autonomous vehicles or advanced robotics. The system efficiently compresses and processes multi-modal sensor data in real-time, including visual data, distance measurement data, and location information. The compressed format allows for efficient data transmission to remote processing centers for further analysis and machine learning model updates, helpful for the continuous improvement of the system's performance and decision-making capabilities.

In a further non-limiting use case example, the system is applied in a context involving multiple data sources and privacy concerns, such as smart city management or industrial IoT. The system compresses and analyzes data from various sensors measuring different environmental or operational factors, alongside video feeds from monitoring cameras. The homomorphic properties allow for data analysis and decision-making without fully decrypting sensitive information, thereby enhancing privacy for individuals or protecting proprietary information while still enabling effective management and optimization of operations.

These use cases illustrate the wide-ranging potential of the invented system, showcasing its ability to handle diverse data types, preserve privacy, and enable efficient analysis across various industries and applications. The system's versatility makes it applicable in numerous scenarios where multi-modal data compression, privacy preservation, and efficient analysis are required.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring nonsimultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 21:
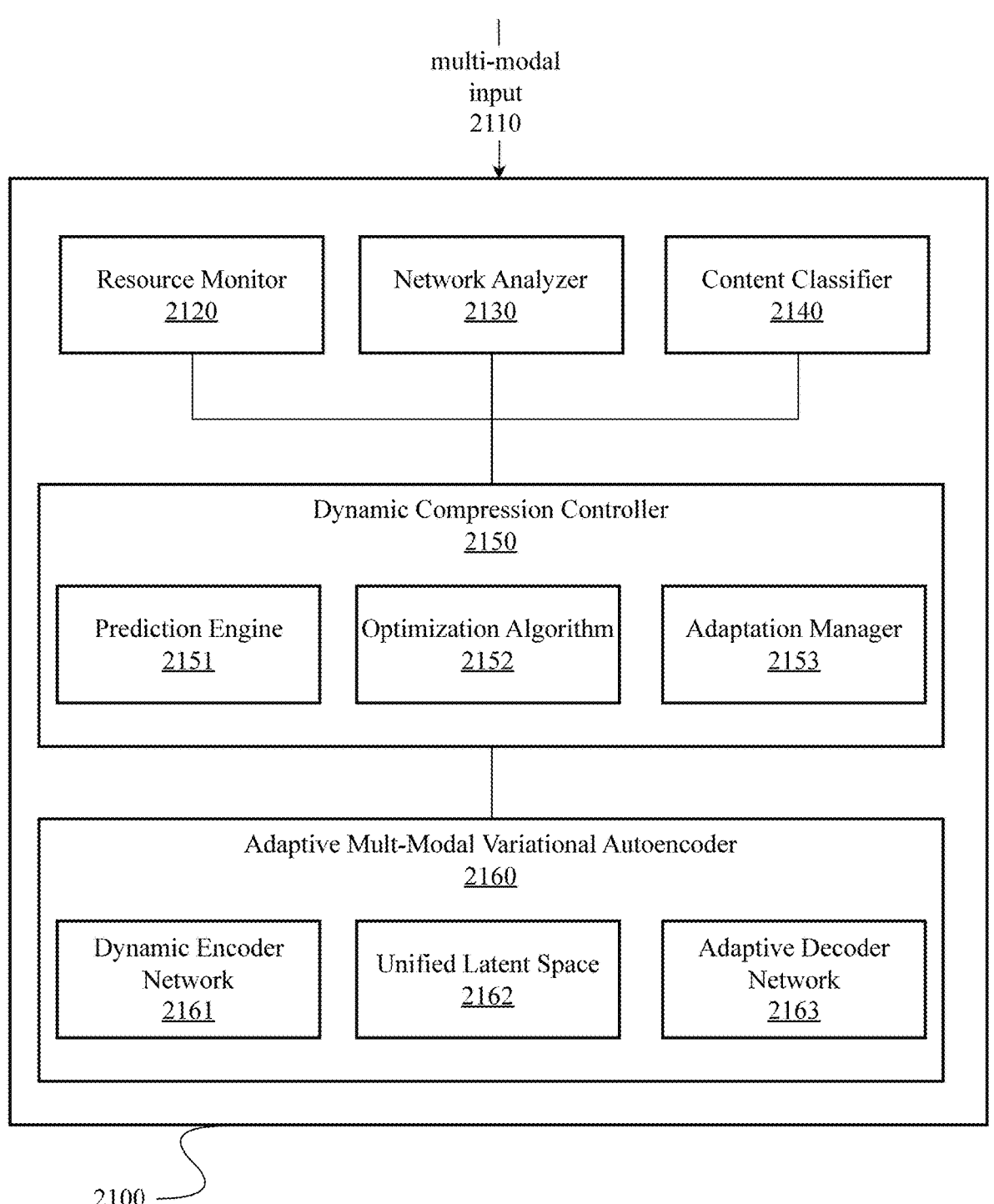
FIG. 21 is a block diagram illustrating an exemplary system architecture for adaptive real-time multi-modal compression with dynamic resource allocation, according to an embodiment.

FIG. 21 is a block diagram illustrating an exemplary system architecture for adaptive real-time multi-modal compression with dynamic resource allocation, according to an embodiment. In one embodiment, an adaptive compression system 2100 comprises a plurality of multi-modal data inputs 2110, a resource monitor 2120, a network analyzer 2130, a content classifier 2140, a dynamic compression controller 2150, and an adaptive multi-modal variational autoencoder 2160. Adaptive compression system 2100 is specifically designed to operate on edge computing devices with limited computational and power resources, while maintaining high compression efficiency and data quality across multiple data modalities.

The plurality of multi-modal data inputs 2110 represents raw data streams from various sources, such as sensors, cameras, microphones, or databases, comprising at least two different data types. These data types may include, but are not limited to, image data, audio data, text data, time-series data, and sensor data from Internet of Things (IoT) devices. The raw multi-modal data can arrive in different formats and at varying rates, requiring sophisticated handling to maintain temporal alignment and data integrity across all modalities. Multi-modal data inputs 2110 may be transferred to resource monitor 2120, network analyzer 2130, and content classifier 2140 for comprehensive analysis and characterization.

A resource monitor 2120 continuously tracks the operational state of the edge computing device, including but not limited to battery level, CPU utilization, memory availability, thermal conditions, and storage capacity. Resource monitor 2120 may employ real-time sampling techniques to gather device performance metrics at configurable intervals, typically ranging from 100 milliseconds to 5 seconds depending on the criticality of the application. In one embodiment, resource monitor 2120 incorporates predictive capabilities using machine learning models to forecast future resource availability, enabling proactive system adaptation before resource constraints become critical. Resource monitor 2120 may also track power source type, distinguishing between battery operation, AC power, and energy harvesting sources to optimize power management strategies accordingly.

A network analyzer 2130 performs continuous assessment of network conditions affecting data transmission capabilities. Network analyzer 2130 measures available bandwidth, latency, packet loss rates, connection stability, and network type identification including, but not limited to, WiFi, cellular, and satellite connections. In one embodiment, network analyzer 2130 employs bandwidth estimation algorithms and latency measurement techniques to provide real-time network performance metrics. Network analyzer 2130 may also incorporate cost-aware analysis, tracking data transmission costs for cellular networks and optimizing compression parameters to minimize data usage expenses. Network analyzer 2130 provides essential input for determining optimal compression ratios and transmission scheduling strategies.

A content classifier 2140 analyzes incoming multi-modal data streams to determine priority levels, complexity characteristics, and quality requirements for each data type. Content classifier 2140 employs one or more machine learning models trained on domain-specific datasets to classify data importance, distinguishing between critical data requiring immediate processing, such as medical alerts or safety warnings, and routine data that can be processed with relaxed constraints. In one embodiment, content classifier 2140 incorporates semantic understanding capabilities for text data, computer vision analysis for image data, and signal processing for audio and sensor data. Content classifier 2140 may also assess temporal criticality, identifying data with strict real-time processing requirements versus data that can tolerate processing delays.

A dynamic compression controller 2150 serves as the central intelligence system that orchestrates adaptive compression behavior based on inputs from resource monitor 2120, network analyzer 2130, and content classifier 2140. Dynamic compression controller 2150 comprises a prediction engine 2151, an optimization engine 2152, and an adaptation manager 2153. Prediction engine 2151 utilizes machine learning models, including, for example, Long Short-Term Memory (LSTM) networks and transformer architectures, to forecast future resource availability, network conditions, and data processing loads. Optimization engine 2152 employs multi-objective optimization algorithms, such as Non-dominated Sorting Genetic Algorithm II (NSGA-II), to balance competing objectives including, but not limited to, compression ratio, quality preservation, processing speed, and energy consumption. Adaptation manager 2153 implements the optimal configuration parameters determined by optimization engine 2152, dynamically reconfiguring adaptive multi-modal variational autoencoder 2160 in real-time.

An adaptive multi-modal variational autoencoder 2160 comprises a dynamic encoder network 2161, a unified latent space 2162, and an adaptive decoder network 2163. Dynamic encoder network 2161 incorporates modality-specific layers for processing different data types, including, for instance, convolutional layers for image data, recurrent layers for sequential data, and fully connected layers for numerical data. Dynamic encoder network 2161 features selectable complexity levels, enabling adaptive compression system 2100 to dynamically adjust computational requirements based on available resources. In one embodiment, dynamic encoder network 2161 includes lightweight, medium, and heavy processing paths that can be selected in real-time based on device capabilities and performance requirements.

A unified latent space 2162 provides a mathematically continuous and differentiable representation where all data modalities are mapped to a shared dimensional space. Unified latent space 2162 enables homomorphic operations to be performed on compressed data without requiring decompression, thereby maintaining data privacy and computational efficiency. In one embodiment, the dimensionality of unified latent space 2162 can be dynamically adjusted (e.g., from 32 to 512 dimensions, or any other dimension size) based on target compression ratios, available computational resources, and quality requirements. Unified latent space 2162 preserves cross-modal relationships between different data types, ensuring that important correlations are maintained throughout the compression and decompression process.

An adaptive decoder network 2163 reconstructs the original multi-modal data from the compressed representations stored in unified latent space 2162. Adaptive decoder network 2163 mirrors the architecture of dynamic encoder network 2161 but in reverse, progressively expanding the compressed representation back to the original data dimensions. In one embodiment, adaptive decoder network 2163 may be located in cloud computing infrastructure to leverage greater computational resources for the reconstruction process, while dynamic encoder network 2161 operates on the edge device to minimize data transmission requirements.

Adaptive compression system 2100 can automatically transition between multiple operational modes based on current device state and data criticality. Emergency mode may be triggered when battery levels fall below a given threshold (e.g., 10%, CPU utilization exceeds 90%), or critical data requiring immediate processing is detected. In emergency mode, adaptive compression system 2100 applies maximum compression ratios (e.g., 0.95 or higher), reduces latent space dimensions (e.g., to 64 or fewer), and disables computationally intensive features such as homomorphic operations. Efficiency mode operates when resources are moderately constrained, applying balanced compression settings with ratios around 0.85 and latent dimensions of 256, for example. Performance mode is activated when abundant resources are available, enabling high-quality compression with ratios around 0.7, full latent space utilization of 512 dimensions, and activation of all advanced features including homomorphic operations and cross-modal attention mechanisms, according to an embodiment.

Adaptive compression system 2100 incorporates continuous learning capabilities through feedback mechanisms that monitor compression performance, quality metrics, and user satisfaction. The learning system updates prediction models based on actual outcomes versus predicted performance, adjusting optimization weights to improve future decision-making. In one embodiment, adaptive compression system 2100 stores successful configuration parameters associated with specific operational contexts, enabling rapid adaptation when similar conditions are encountered in the future. Adaptive compression system 2100 provides intelligent, resource-aware multi-modal data compression that dynamically optimizes performance based on real-time operational constraints while maintaining high compression efficiency and data quality across diverse application domains.

FIG. 22 is a block diagram illustrating an exemplary aspect of the adaptive real-time multi-modal compression system, a dynamic compression controller subsystem. In one embodiment, a dynamic compression controller 2200 comprises a prediction engine 2210, an optimization engine 2220, and an adaptation manager 2230. Dynamic compression controller 2200 serves as a central intelligence system that coordinates adaptive compression behavior by processing inputs from resource monitoring, network analysis, and content classification subsystems to generate optimal compression parameters in real-time.

A prediction engine 2210 comprises a resource predictor 2211, a network predictor 2212, and a usage pattern analyzer

2213. Resource predictor 2211 employs one or more machine learning algorithms to forecast future device resource availability across multiple time horizons. In one embodiment, resource predictor 2211 utilizes Long Short-Term Memory (LSTM) neural networks trained on historical resource consumption patterns to predict battery drain rates, CPU utilization trends, and memory allocation patterns. Resource predictor 2211 may also implement exponential smoothing algorithms for short-term predictions, autoregressive integrated moving average (ARIMA) models for medium-term forecasting, and Kalman filtering techniques for real-time state estimation of battery chemistry and thermal dynamics. In another embodiment, resource predictor 2211 incorporates ensemble methods combining multiple prediction algorithms, such as random forest regressors for CPU load prediction and support vector regression for memory usage forecasting, with weighted voting schemes to improve prediction accuracy.

Network predictor 2212 analyzes historical network performance data to forecast future bandwidth availability, latency variations, and connection stability. In one embodiment, network predictor 2212 implements transformer-based neural networks that process sequences of network measurements including, but not limited to, bandwidth samples, round-trip time measurements, and packet loss statistics to predict network conditions over time horizons ranging from seconds to hours. Network predictor 2212 may employ time-series decomposition techniques to separate trend, seasonal, and irregular components of network performance, enabling more accurate predictions during peak usage periods or network congestion events. In another embodiment, network predictor 2212 utilizes Hidden Markov Models (HMMs) to model network state transitions, such as handoffs between cellular towers or switches between WiFi and cellular connections, providing probabilistic forecasts of network availability and quality metrics.

A usage pattern analyzer 2213 identifies recurring patterns in data processing requirements and user behavior to optimize compression scheduling and resource allocation. Usage pattern analyzer 2213 may implement clustering algorithms such as k-means or DBSCAN to group similar usage scenarios based on data types, processing loads, and timing patterns. In one embodiment, usage pattern analyzer 2213 employs frequent pattern mining techniques to discover temporal relationships between different types of data processing tasks, enabling predictive pre-configuration of compression parameters. Usage pattern analyzer 2213 may also utilize reinforcement learning algorithms to adapt scheduling policies based on observed user preferences and application performance requirements.

An optimization engine 2220 comprises a multi-objective optimizer 2221, a constraint handler 2222, and a solution selector 2223. Multi-objective optimizer 2221 employs advanced optimization algorithms to balance competing objectives including compression ratio maximization, quality preservation, processing speed, and energy efficiency. In one embodiment, multi-objective optimizer 2221 implements the Non-dominated Sorting Genetic Algorithm II (NSGA-II) with problem-specific genetic operators designed for compression parameter optimization. Multi-objective optimizer 2221 may utilize particle swarm optimization (PSO) techniques for continuous parameter spaces, simulated annealing for discrete optimization problems, and differential evolution algorithms for robust global optimization. In another embodiment, multi-objective optimizer 2221 employs multi-objective Bayesian optimization using Gaussian process models to efficiently explore the parameter space while minimizing computational overhead on resource-constrained edge devices.

Constraint handler 2222 ensures that optimization solutions satisfy operational constraints including, but not limited to, battery level requirements, processing deadlines, memory limitations, and quality thresholds. Constraint handler 2222 may implement penalty function methods that add constraint violations to the objective function, barrier methods that prevent infeasible solutions from being evaluated, and repair algorithms that modify infeasible solutions to satisfy constraints. In one embodiment, constraint handler 2222 utilizes adaptive constraint relaxation techniques that temporarily relax non-critical constraints when system resources become severely limited, enabling continued operation under extreme conditions. Constraint handler 2222 may also employ constraint satisfaction programming (CSP) techniques to model complex interdependencies between different system constraints and identify feasible parameter regions.

A solution selector 2223 chooses the most appropriate optimization solution from the Pareto-optimal set based on current system priorities and user preferences. Solution selector 2223 may implement weighted sum methods that combine multiple objectives using dynamically adjusted weights based on current operational context. In one embodiment, solution selector 2223 employs technique for order preference by similarity to ideal solution (TOPSIS) methods to rank solutions based on their distance from ideal and anti-ideal points in the objective space. Solution selector 2223 may utilize fuzzy logic systems to handle uncertainty in objective preferences and implement adaptive weighting schemes that adjust solution selection criteria based on observed system performance and user feedback.

An adaptation manager 2230 comprises a mode selector 2231, a parameter updater 2232, and a feedback controller 2233. Mode selector 2231 determines the appropriate operational mode for adaptive compression system based on current device state and data characteristics. Mode selector 2231 may implement finite state machine logic with hysteresis thresholds to prevent rapid oscillation between operational modes. In one embodiment, mode selector 2231 employs decision tree algorithms trained on historical performance data to classify optimal operational modes based on multi-dimensional feature vectors including battery level, CPU load, network quality, and data priority scores. Mode selector 2231 may utilize fuzzy inference systems with membership functions that model gradual transitions between operational modes, enabling smooth parameter adjustments rather than abrupt mode changes.

Parameter updater 2232 applies optimal compression configuration parameters to adaptive multi-modal variational autoencoder components in real-time. Parameter updater 2232 may implement gradual parameter interpolation techniques to avoid sudden performance changes that could disrupt ongoing data processing tasks. In one embodiment, parameter updater 2232 employs rate-limited update mechanisms that constrain the speed of parameter changes based on system stability requirements and processing deadlines. Parameter updater 2232 may utilize configuration caching strategies that pre-compute and store frequently used parameter sets, enabling rapid switching between common operational configurations without computational overhead.

A feedback controller 2233 monitors system performance and adjusts optimization parameters based on observed outcomes compared to predicted performance. Feedback controller 2233 may implement proportional-integral-derivative control algorithms to maintain target performance metrics such as compression quality, processing latency, and energy consumption. In one embodiment, feedback controller 2233 employs adaptive control techniques that automatically tune controller parameters based on system identification and performance characterization. Feedback controller 2233 may utilize model predictive control (MPC) methods that optimize control actions over future time horizons while considering predicted disturbances and system constraints.

Dynamic compression controller 2200 generates configuration commands 2240 that specify operational parameters for adaptive compression system components. Configuration commands 2240 may include, but are not limited to, encoder complexity level settings, latent space dimension adjustments, emergency mode activation signals, priority weight updates, and batch size configurations. In one embodiment, configuration commands 2240 are transmitted using lightweight communication protocols optimized for real-time delivery with minimal overhead. Dynamic compression controller 2200 may implement command queuing and prioritization mechanisms to ensure that critical configuration changes are applied before less urgent parameter updates. Dynamic compression controller 2200 provides intelligent coordination of adaptive compression behavior through sophisticated prediction, optimization, and adaptation mechanisms that enable optimal performance under varying operational conditions while maintaining system stability and responsiveness.

Figure 23:
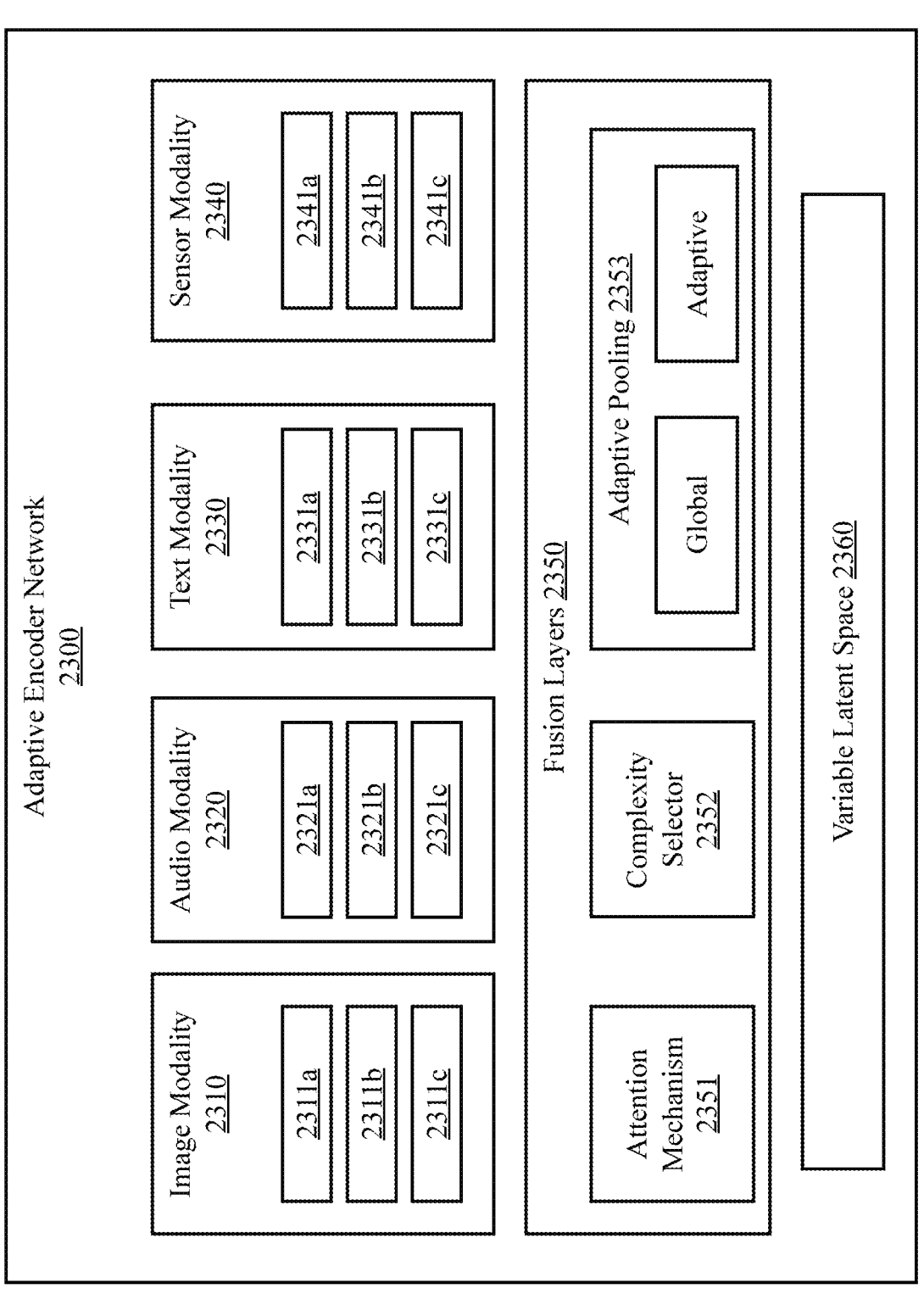
FIG. 23 is a block diagram illustrating an exemplary detailed architecture of an adaptive encoder network with dynamic layer selection for multi-modal data compression, according to an embodiment.

FIG. 23 is a block diagram illustrating an exemplary detailed architecture of an adaptive encoder network with dynamic layer selection for multi-modal data compression, according to an embodiment. In one embodiment, an adaptive encoder network 2300 comprises a plurality of modality-specific processing layers for image modality 2310, audio modality 2320, text modality 2330, and sensor modality 2340, shared fusion layers 2350, and a variable latent space projection 2360. Adaptive encoder network 2300 receives multi-modal input data and processes each data type through specialized pathways while enabling dynamic complexity adjustment based on available computational resources and quality requirements.

An image modality processing layer 2310 comprises selectable convolutional layers with light 2311a, medium 2311b, and heavy 2311c complexity options. Light complexity convolutional layers 2311a may implement depthwise separable convolutions that factorize standard convolutions into depthwise and pointwise operations, reducing computational complexity by factors of 8-10 compared to standard convolutions. In one embodiment, light complexity layers 2311a utilize MobileNet architectures with inverted residual blocks and linear bottlenecks optimized for mobile and edge computing environments. Light complexity layers 2311a may employ channel shuffling techniques to improve information flow between channel groups while maintaining computational efficiency, and implement pruning algorithms that remove redundant neural network connections based on magnitude-based criteria.

Medium complexity convolutional layers 2311b may implement standard convolution operations with residual connections and batch normalization for balanced performance and computational requirements. In one embodiment, medium complexity layers 2311b utilize ResNet-style architectures with skip connections that enable training of deeper networks while mitigating vanishing gradient problems. Medium complexity layers 2311b may employ squeeze-and-excitation blocks that adaptively recalibrate channel-wise feature responses through global average pooling and fully connected layers. Medium complexity layers 2311b may also implement dilated convolutions with varying dilation rates to capture multi-scale spatial features without increasing computational complexity significantly.

Heavy complexity convolutional layers 2311c may implement advanced architectures such as DenseNet connections, attention mechanisms, and multi-scale feature extraction for maximum feature representation capability. In one embodiment, heavy complexity layers 2311c utilize EfficientNet architectures that employ compound scaling methods to uniformly scale network width, depth, and resolution dimensions. Heavy complexity layers 2311c may implement spatial attention modules that generate attention maps highlighting important spatial locations, and channel attention mechanisms that emphasize informative channels while suppressing irrelevant ones. Heavy complexity layers 2311c may also employ neural architecture search (NAS) techniques to automatically optimize layer configurations based on specific deployment constraints and performance requirements.

An audio modality processing layer 2320 comprises selectable 1D convolutional layers with light 2321a, medium 2321b, and heavy 2321c complexity options for processing temporal audio signals. Light complexity audio layers 2321a may implement time-domain convolutional networks with causal dilated convolutions that process audio signals in real-time with minimal latency. In one embodiment, light complexity layers 2321a utilize WaveNet-style architectures with exponentially increasing dilation rates to capture long-range temporal dependencies efficiently. Light complexity layers 2321a may employ mel-scale filterbank preprocessing to reduce spectral dimensionality while preserving perceptually important frequency components, and implement temporal pooling strategies that downsample audio signals while maintaining essential temporal structure.

Medium complexity audio layers 2321b may implement hybrid time-frequency domain processing with short-time Fourier transform (STFT) preprocessing and 2D convolutions applied to spectrograms. In one embodiment, medium complexity layers 2321b utilize log-mel spectrogram representations that mimic human auditory perception and enable efficient compression of audio signals. Medium complexity layers 2321b may employ temporal convolutional networks (TCNs) with residual connections and normalization layers to capture complex temporal patterns in audio data. Medium complexity layers 2321b may also implement attention mechanisms that focus on salient temporal segments and frequency bands based on learned importance weights.

Heavy complexity audio layers 2321c may implement transformer-based architectures with self-attention mechanisms for capturing long-range dependencies in audio sequences. In one embodiment, heavy complexity layers 2321c utilize Wav2Vec-style architectures that learn representations from raw audio waveforms through contrastive learning objectives. Heavy complexity layers 2321c may employ multi-head attention mechanisms that capture different types of temporal relationships simultaneously, and implement positional encoding schemes that provide temporal order information to the attention mechanism. Heavy complexity layers 2321c may also utilize conformer architectures that combine convolutional and attention mechanisms to capture both local and global temporal patterns effectively.

A text modality processing layer 2330 comprises selectable embedding and encoding layers with light 2331a, medium 2331b, and heavy 2331c complexity options for processing textual data. Light complexity text layers 2331a may implement bag-of-words representations with term frequency-inverse document frequency (TF-IDF) weighting schemes and simple linear transformations. In one embodiment, light complexity layers 2331a utilize word-level embeddings with dimensionality reduction techniques such as principal component analysis (PCA) or random projections to minimize computational requirements. Light complexity layers 2331a may employ n-gram features that capture local word dependencies and implement hash vectorization to handle large vocabularies efficiently while maintaining fixed memory footprints.

Medium complexity text layers 2331b may implement recurrent neural networks such as Long Short-Term Memory (LSTM) or Gated Recurrent Unit (GRU) architectures for sequential text processing. In one embodiment, medium complexity layers 2331b utilize bidirectional RNNs that process text sequences in both forward and backward directions to capture complete contextual information. Medium complexity layers 2331b may employ word embedding techniques such as Word2Vec or GloVe that map words to dense vector representations capturing semantic relationships. Medium complexity layers 2331b may also implement attention mechanisms that weight different words based on their relevance to the current processing context.

Heavy complexity text layers 2331c may implement transformer-based architectures with multi-head self-attention mechanisms for capturing complex linguistic relationships. In one embodiment, heavy complexity layers 2331c utilize BERT-style encoders with masked language modeling objectives that learn contextualized word representations. Heavy complexity layers 2331c may employ positional encoding schemes that provide word order information and implement layer normalization techniques that stabilize training of deep transformer networks. Heavy complexity layers 2331c may also utilize pre-trained language models fine-tuned for specific domain applications and implement sub-word tokenization strategies such as Byte-Pair Encoding (BPE) to handle out-of-vocabulary words effectively.

A sensor modality processing layer 2340 comprises selectable fully connected layers with light 2341a, medium 2341b, and heavy 2341c complexity options for processing numerical sensor data. Light complexity sensor layers 2341a may implement simple linear transformations with minimal hidden layers and activation functions optimized for low computational overhead. In one embodiment, light complexity layers 2341a utilize feature selection techniques such as correlation-based feature selection or mutual information to identify the most informative sensor measurements. Light complexity layers 2341a may employ quantization techniques that reduce numerical precision while maintaining adequate representation accuracy, and implement online normalization schemes that adapt to changing sensor value distributions.

Medium complexity sensor layers 2341b may implement multi-layer perceptrons with non-linear activation functions and regularization techniques such as dropout or batch normalization. In one embodiment, medium complexity layers 2341b utilize residual connections that enable training of deeper networks for complex sensor fusion tasks. Medium complexity layers 2341b may employ ensemble methods that combine multiple sensor processing pathways and implement adaptive weighting schemes that adjust sensor importance based on data quality and reliability metrics. Medium complexity layers 2341b may also utilize time-series processing techniques such as sliding window features or temporal convolutions for sensors that provide sequential measurements.

Heavy complexity sensor layers 2341c may implement advanced neural architectures such as graph neural networks for processing sensor networks with complex spatial relationships. In one embodiment, heavy complexity layers 2341c utilize attention mechanisms that dynamically weight different sensors based on their relevance to current processing tasks. Heavy complexity layers 2341c may employ multi-task learning approaches that jointly optimize sensor processing for multiple downstream applications, and implement uncertainty quantification techniques that provide confidence estimates for sensor measurements. Heavy complexity layers 2341c may also utilize domain adaptation methods that enable sensor processing models to generalize across different deployment environments and sensor configurations.

Shared fusion layers 2350 comprise an attention mechanism 2351, a complexity selector 2352, and adaptive pooling 2353 components that integrate information across different data modalities. Attention mechanism 2351 may implement cross-modal attention that allows different modalities to attend to relevant features in other modalities, enabling capture of complementary information across data types. In one embodiment, attention mechanism 2351 utilizes multi-head attention with separate attention heads specialized for different types of cross-modal relationships. Attention mechanism 2351 may employ self-attention mechanisms that capture intra-modal dependencies within each data type, and implement hierarchical attention schemes that operate at multiple granularity levels from fine-grained features to coarse-grained representations. In some aspects, attention mechanism 2351 may be implemented as an n-channel wise transformer 330 as described herein.

A complexity selector 2352 determines the appropriate processing complexity for each modality based on current resource constraints and quality requirements provided as resource state input. Complexity selector 2352 may implement reinforcement learning algorithms that learn optimal complexity selection policies based on observed performance outcomes and resource consumption patterns. In one embodiment, complexity selector 2352 utilizes multi-armed bandit algorithms that balance exploration of different complexity configurations with exploitation of known high-performing settings. Complexity selector 2352 may employ fuzzy logic systems that make gradual complexity adjustments based on multiple input criteria, and implement predictive models that anticipate optimal complexity settings based on upcoming data characteristics and resource availability forecasts.

Adaptive pooling 2353 comprises global average pooling and adaptive max pooling operations that reduce spatial and temporal dimensions while preserving essential information across modalities. Global average pooling may compute spatial averages across entire feature maps to create compact representations invariant to input size variations. In one embodiment, adaptive pooling 2353 utilizes learned pooling operations that optimize pooling strategies through gradient-based training. Adaptive pooling 2353 may implement multi-scale pooling that operates at different spatial or temporal resolutions to capture features at various granularity levels, and employ attention-based pooling that weights different spatial or temporal locations based on their importance for the compression task.

Variable latent space projection 2360 dynamically adjusts the dimensionality of the compressed representation based on target compression ratios, available memory constraints, content complexity, and quality requirements. In one embodiment, latent space projection 2360 may be configured with dimensions ranging from (an exemplary) 64 for emergency mode operation to 512 for performance mode operation. Latent space projection 2360 may implement progressive dimensionality reduction techniques that gradually decrease representation dimensionality while monitoring quality metrics to determine optimal compression levels. Latent space projection 2360 may employ learned projection matrices that optimize dimensionality reduction for specific data distributions and implement regularization techniques such as orthogonality constraints that ensure efficient use of latent space dimensions. Adaptive encoder network 2300 provides flexible and efficient multi-modal data encoding with dynamic complexity adjustment capabilities that enable optimal compression performance under varying operational constraints while maintaining high-quality compressed representations across diverse data types.

Figure 24:
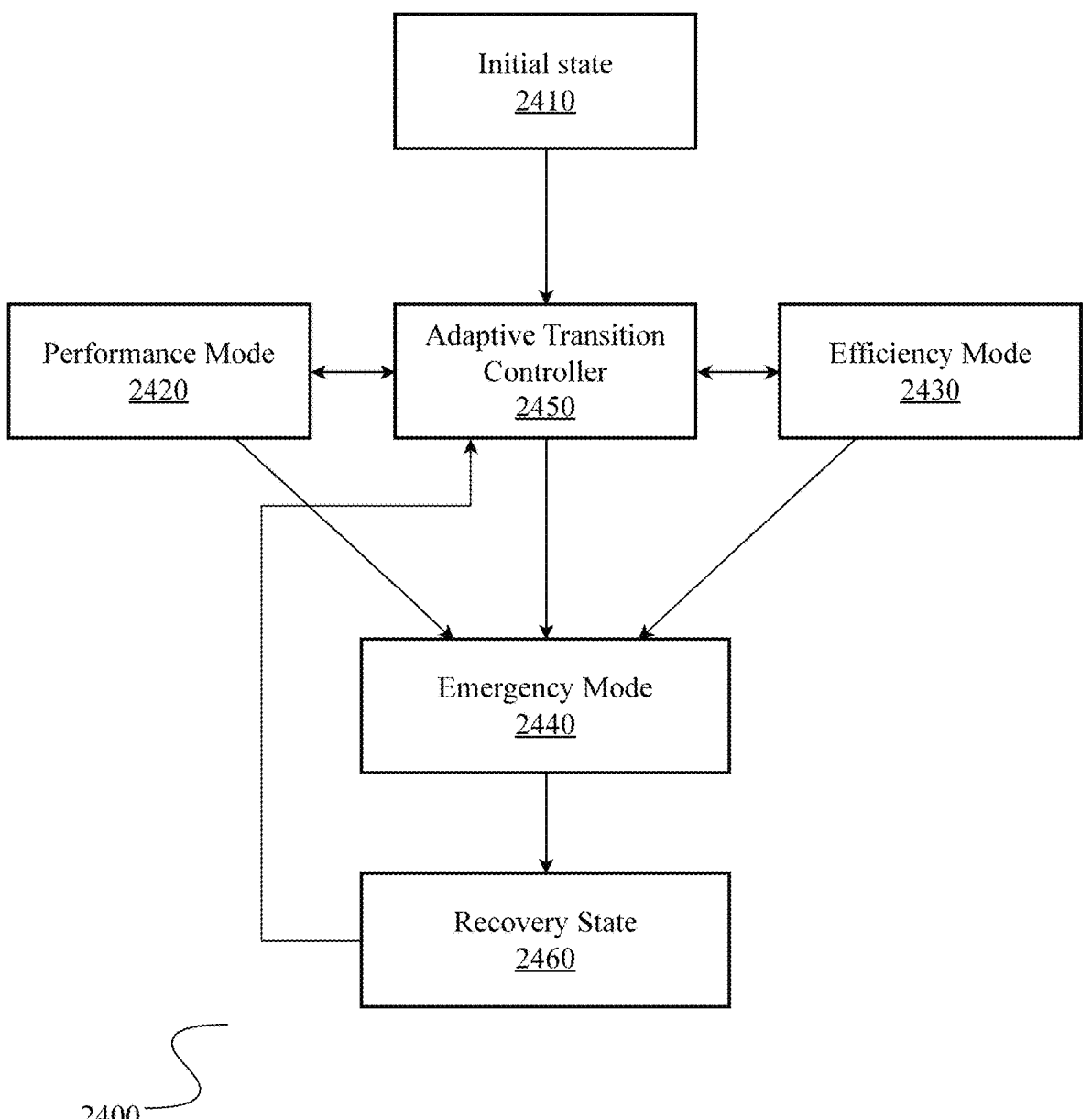
FIG. 24 is a state diagram illustrating an exemplary operational mode transition system for adaptive real-time multi-modal compression with dynamic resource allocation, according to an embodiment.

FIG. 24 is a state diagram illustrating an exemplary operational mode transition system for adaptive real-time multi-modal compression with dynamic resource allocation, according to an embodiment. In one embodiment, an operational mode state system 2400 comprises an initial state 2410, a performance mode 2420, an efficiency mode 2430, an emergency mode 2440, an adaptive transitions controller 2450, and a recovery state 2460. Operational mode state system 2400 manages dynamic transitions between different operational configurations based on real-time device conditions, resource availability, and data processing requirements to ensure optimal compression performance under varying constraints.

An initial state 2410 represents the system startup phase where adaptive compression system establishes baseline operational parameters and initializes monitoring subsystems. Initial state 2410 loads base configuration parameters from stored settings, initializes continuous monitoring of device resources including battery level, CPU utilization, memory availability, and thermal conditions, and calibrates sensor inputs to establish accurate measurement baselines. In one embodiment, initial state 2410 performs system health checks to verify proper operation of all compression components and establishes communication channels with cloud infrastructure if available. Initial state 2410 may also load historical performance data and user preferences to optimize initial parameter selection based on previous operational patterns and application-specific requirements.

A performance mode 2420 operates when abundant computational and power resources are available, enabling high-quality compression with advanced processing capabilities. Performance mode 2420 is activated when battery level exceeds 50%, CPU utilization remains below 30%, high network bandwidth is available, and incoming data is classified as non-critical priority. Performance mode 2420 configures compression parameters including, for example, a compression ratio of approximately 0.7 to maintain high data quality, a quality threshold of 0.8 to preserve essential information characteristics, latent space dimensions of 512 to enable detailed feature representation, and homomorphic operations enabled to support advanced privacy-preserving computations. In one embodiment, performance mode 2420 may also activate multi-path transmission capabilities, cross-modal attention mechanisms, and sophisticated optimization algorithms that require additional computational resources but provide superior compression quality and feature preservation.

An efficiency mode 2430 operates under moderate resource constraints, providing balanced compression performance with acceptable quality degradation to conserve computational and power resources. Efficiency mode 2430 is activated when battery levels range between 20% and 50%, CPU utilization operates between 30% and 70%, normal network conditions are present, and routine data processing tasks are being performed. Efficiency mode 2430 configures compression parameters including a compression ratio of approximately 0.85 to balance quality and resource consumption, a quality threshold of 0.6 to maintain acceptable reconstruction fidelity, latent space dimensions of 256 to reduce computational overhead while preserving essential features, and batch processing enabled to improve computational efficiency through parallel processing of multiple data items. In one embodiment, efficiency mode 2430 may implement adaptive quantization techniques that dynamically adjust numerical precision based on data characteristics and quality requirements.

An emergency mode 2440 operates under severe resource constraints or when critical data requiring immediate processing is detected, prioritizing system survival and essential functionality over compression quality. Emergency mode 2440 may be triggered when battery level falls below 10%, CPU utilization exceeds 90%, device temperature exceeds 85 degrees Celsius, or critical data such as medical alerts or safety warnings is detected. Emergency mode 2440 configures compression parameters including a compression ratio of 0.95 or higher to achieve maximum data reduction, a quality threshold of 0.3 to accept significant quality degradation in favor of speed and resource conservation, latent space dimensions of 64 or fewer to minimize computational requirements, homomorphic operations disabled to eliminate complex processing overhead, and processing timeout limits of 100 milliseconds to ensure rapid data handling. In one embodiment, emergency mode 2440 implements data prioritization schemes that process text data first, followed by sensor data, audio data, and finally image data, ensuring that the most essential information is transmitted before system resources are exhausted.

An adaptive transitions controller 2450 manages state transitions between operational modes through one or more decision-making algorithms that prevent rapid oscillation and ensure system stability. Adaptive transitions controller 2450 implements gradual parameter changes that smoothly transition between operational configurations rather than abrupt switches that could disrupt ongoing processing tasks. Adaptive transitions controller 2450 employs hysteresis mechanisms that introduce buffer zones around transition thresholds, preventing rapid mode switching when resource levels fluctuate near boundary conditions. In one embodiment, adaptive transitions controller 2450 utilizes predictive algorithms that anticipate optimal mode transitions based on resource consumption trends, data processing patterns, and historical performance data. Adaptive transitions controller 2450 monitors multiple transition triggers including battery level thresholds, CPU utilization levels, network bandwidth availability, data criticality scores, thermal conditions, and user-defined policy constraints to determine appropriate operational mode selections.

A recovery state 2460 manages the gradual transition from emergency mode back to normal operation, ensuring system stability and performance validation before resuming standard operational modes. Recovery state 2460 implements phased restoration procedures that incrementally increase system capabilities while monitoring performance metrics and resource stability. Recovery state 2460 performs system health verification to ensure that emergency conditions have been resolved and that device resources have returned to sustainable levels. In one embodiment, recovery state 2460 validates performance metrics by comparing actual compression outcomes with expected performance targets and adjusts operational parameters if significant deviations are detected. Recovery state 2460 integrates learning updates from emergency operation experiences, updating prediction models and threshold parameters based on observed system behavior during crisis conditions to improve future emergency response effectiveness.

Operational mode state system 2400 implements specific transition conditions that govern mode changes based on quantitative thresholds and qualitative assessments. For instance, transition to emergency mode may occur when battery level falls below 10%, CPU utilization exceeds 90%, device temperature rises above 85 degrees Celsius, or critical data requiring immediate processing is detected. Transition to efficiency mode may occur when battery level ranges between 20% and 50%, CPU utilization operates between 30% and 70%, and normal network conditions are present. Transition to performance mode occurs when battery level exceeds 50%, CPU utilization remains below 30%, and high bandwidth network connectivity is available. In one embodiment, all transition thresholds incorporate 5% buffer zones to prevent oscillation between modes when resource levels fluctuate near boundary conditions. The specific operating conditions which can lead to operational state transitions provided in this description are merely exemplary and do not limit in any way the systems and methods described herein.

Operational mode state system 2400 may also implement advanced transition features including predictive mode switching that anticipates optimal transitions based on resource consumption forecasts, user activity patterns, and application scheduling information. In one embodiment, operational mode state system 2400 incorporates machine learning algorithms that optimize transition thresholds based on observed system performance and user satisfaction metrics. Operational mode state system 2400 may utilize reinforcement learning techniques that adapt transition policies based on reward signals derived from compression quality, energy efficiency, and user experience measurements. Operational mode state system 2400 provides intelligent operational mode management that ensures optimal compression performance while maintaining system stability and resource conservation under varying operational conditions and constraints.

Figure 25:
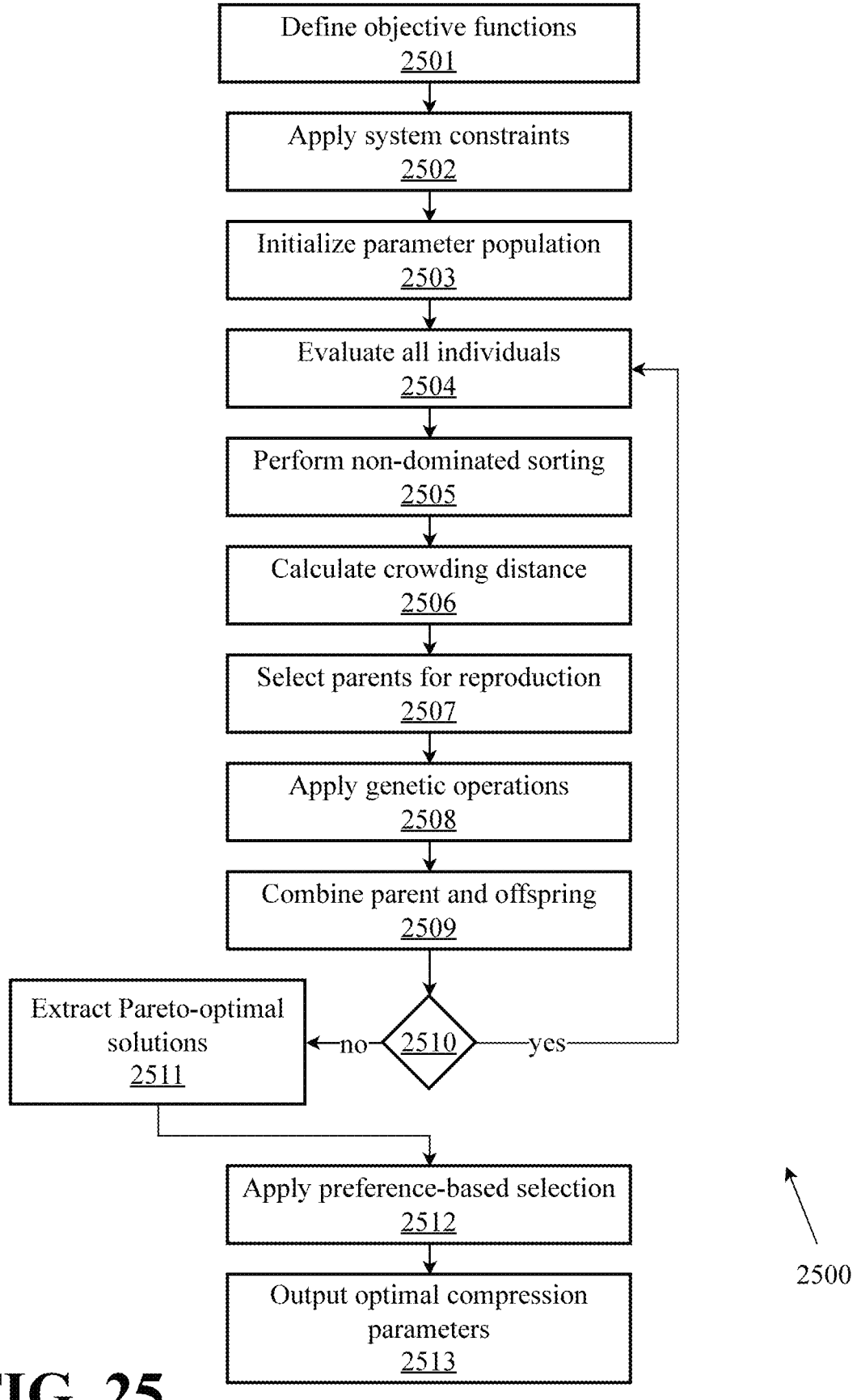
FIG. 25 is a flow diagram illustrating an exemplary multi-objective optimization process flow for adaptive real-time multi-modal compression with dynamic resource allocation, according to an embodiment.

FIG. 25 is a flow diagram illustrating an exemplary multi-objective optimization process flow for adaptive real-time multi-modal compression with dynamic resource allocation, according to an embodiment. In one embodiment, a multi-objective optimization process 2500 comprises various steps that systematically balance competing performance criteria including compression efficiency, quality preservation, processing speed, and energy consumption to determine optimal compression parameters under current operational conditions and resource constraints.

According to the embodiment, the optimization process 2500 begins with step 2501 that defines objective functions for the multi-criteria optimization problem. Step 2501 calculates compression ratio targets to achieve efficient data reduction, determines quality preservation requirements based on application-specific fidelity needs, and sets processing speed constraints to meet real-time operational deadlines. In one embodiment, step 2501 may incorporate modality-specific objective weighting that accounts for different importance levels across image, audio, text, and sensor data types. Step 2501 may also establish dynamic objective priorities that adapt based on current system state, user preferences, and application context to ensure optimal performance under varying operational scenarios.

Step 2502 applies system constraints that define feasible parameter regions and operational boundaries for the optimization process. Step 2502 checks battery level limits to prevent system shutdown, verifies CPU and memory availability to ensure adequate computational resources, and validates deadline requirements to maintain real-time processing capabilities. In one embodiment, step 2502 may incorporate thermal constraints that prevent device overheating, bandwidth constraints that consider network transmission limitations, and quality constraints that maintain minimum acceptable reconstruction fidelity. Step 2502 may also implement adaptive constraint relaxation mechanisms that temporarily modify constraint boundaries during emergency operating conditions while maintaining system stability and functionality.

Step 2503 initializes a parameter population comprising multiple candidate solutions for the optimization problem. Step 2503 generates a plurality of random parameter sets that represent diverse compression configurations, includes encoder and decoder architecture specifications such as layer complexity and activation functions, and sets latent space dimensions and batch processing sizes to cover the feasible parameter space. In one embodiment, step 2503 may employ knowledge-based initialization that incorporates successful parameter configurations from previous optimization runs to accelerate convergence toward high-quality solutions. Step 2503 may also utilize Latin hypercube sampling or other space-filling design techniques to ensure uniform coverage of the parameter space and improve optimization efficiency.

Step 2504 evaluates all individuals in the current population by computing objective function values and constraint satisfaction levels. Step 2504 calculates objective function values including compression ratio, quality metrics such as peak signal-to-noise ratio (PSNR) or structural similarity index (SSIM), processing speed measurements, and energy consumption estimates for each parameter configuration. Step 2504 checks constraint violations against battery, CPU, memory, deadline, and quality thresholds, and applies penalty functions to infeasible solutions that violate operational boundaries. In one embodiment, step 2504 may utilize surrogate models or lookup tables to reduce computational overhead when exact objective function evaluation requires extensive compression trials or simulation runs.

Step 2505 performs non-dominated sorting to rank solutions based on Pareto dominance relationships within the multi-objective optimization framework. Step 2505 ranks solutions by dominance where solution A dominates solution B if A performs better than or equal to B in all objectives and strictly better in at least one objective. Step 2505 creates Pareto fronts including, for example, Front 1 containing non-dominated solutions, Front 2 containing solutions dominated only by Front 1, and subsequent fronts with progressively lower dominance ranks. Step 2505 identifies non-dominated solutions that represent optimal trade-offs between competing objectives and cannot be improved in one criterion without degrading performance in another criterion. In one embodiment, step 2505 may implement fast non-dominated sorting algorithms with optimized computational complexity to enable real-time optimization on resource-constrained edge devices.

Step 2506 calculates crowding distance to measure solution density in objective space and promote diversity preservation within each Pareto front. Step 2506 measures solution density by computing the average distance between neighboring solutions in the objective space, assigns higher crowding distance values to isolated solutions located in less populated regions of the Pareto front, and promotes diversity preservation by favoring solutions that explore underrepresented areas of the objective space. In one embodiment, step 2506 may incorporate objective normalization to ensure balanced contribution from all optimization criteria regardless of their numerical ranges and scales. Step 2506 may also implement adaptive diversity mechanisms that adjust crowding distance calculations based on population convergence characteristics and exploration requirements.

Step 2507 selects parents for reproduction using tournament selection, in some embodiments, based on dominance rank and crowding distance criteria. Step 2507 can use tournament selection that compares multiple individuals and selects the best candidate based on dominance ranking, prefer solutions with lower dominance rank indicating better overall performance across multiple objectives, and among solutions with equal rank, favor those with higher crowding distance to maintain population diversity. In one embodiment, step 2507 may implement adaptive tournament size that adjusts selection pressure based on population convergence status and optimization progress. Step 2507 may also utilize alternative selection mechanisms such as fitness proportionate selection or rank-based selection depending on population characteristics and optimization requirements.

Step 2508 applies genetic operations including crossover and mutation to create offspring solutions from selected parent individuals. Step 2508 performs crossover operations that blend parent parameters with probability 0.9 using techniques such as simulated binary crossover (SBX) for continuous parameters and uniform crossover for discrete configuration choices. Step 2508 applies mutation operations that add Gaussian noise to parameters with probability 0.1 to introduce variation and explore new regions of the parameter space, and creates an offspring population equal in size to the parent population. In one embodiment, step 2508 may implement adaptive genetic operator probabilities that adjust crossover and mutation rates based on population diversity, convergence progress, and optimization performance metrics.

Step 2509 combines parent and offspring populations to create an extended population for elitist selection procedures. Step 2509 merges parent and offspring populations to create a combined population of size 2N where N represents the target population size, applies elitist selection that ensures high-quality solutions are preserved across generations while allowing inferior solutions to be replaced by better offspring, and selects the best N individuals based on dominance ranking and crowding distance criteria for the next generation. In one embodiment, step 2509 may implement environmental selection strategies that maintain population diversity while ensuring convergence toward optimal solutions through balanced exploration and exploitation mechanisms.

The optimization process 2500 includes a termination condition check 2510 that determines whether the algorithm should continue for additional generations or proceed to solution selection. Termination condition 2510 evaluates whether the current generation number is less than the maximum specified generation limit, typically ranging from 20 to 50 generations depending on computational budget and convergence requirements. If the termination condition is not met, the process returns to step 2504 for continued evolution through the feedback loop, enabling iterative improvement of solution quality through successive generations. In one embodiment, termination condition 2510 may incorporate convergence detection algorithms that monitor objective improvement rates, population diversity metrics, and solution stability to automatically determine optimal stopping conditions based on optimization progress rather than fixed generation limits.

Step 2511 extracts Pareto-optimal solutions from the final optimization population after termination criteria are satisfied. Step 2511 identifies all non-dominated solutions that represent optimal trade-offs between competing objectives and cannot be improved in any single criterion without degrading performance in other criteria. Step 2511 creates solution trade-off options that enable selection based on current operational priorities and user preferences, and prepares the Pareto front for preference-based selection procedures. In one embodiment, step 2511 may implement solution filtering mechanisms that remove similar or redundant solutions to provide a diverse set of high-quality alternatives for final selection.

Step 2512 applies preference-based selection to choose the most appropriate solution from the Pareto-optimal set based on current system priorities and operational context. Step 2512 weights different objectives according to current operational priorities including battery level influence on energy conservation importance, network conditions affecting compression ratio preferences, data criticality determining quality requirements, and user-specified preferences for acceptable trade-offs. Step 2512 considers multiple contextual factors including, but not limited to, current battery status, network bandwidth availability, thermal conditions, and data processing urgency to select the solution closest to the ideal point in the weighted objective space. In one embodiment, step 2512 may employ techniques such as technique for order preference by similarity to ideal solution, weighted sum methods, or fuzzy logic systems to handle uncertainty in preference specification and provide robust solution selection under varying operational conditions.

The optimization process 2500 concludes with step 2513 that outputs optimal compression parameters for application to the adaptive multi-modal variational autoencoder. Step 2513 configures encoder complexity levels including lightweight, medium, or heavy processing paths based on available computational resources, sets latent space dimensions, and applies the selected configuration parameters to the adaptive autoencoder for immediate implementation. In one embodiment, step 2513 may implement gradual parameter transition mechanisms that smoothly adjust compression settings to avoid disruption of ongoing data processing tasks. Multi-objective optimization process 2500 provides systematic and intelligent parameter selection that balances multiple competing criteria to achieve optimal compression performance under varying operational constraints and user requirements through sophisticated evolutionary optimization techniques.

Figure 26:
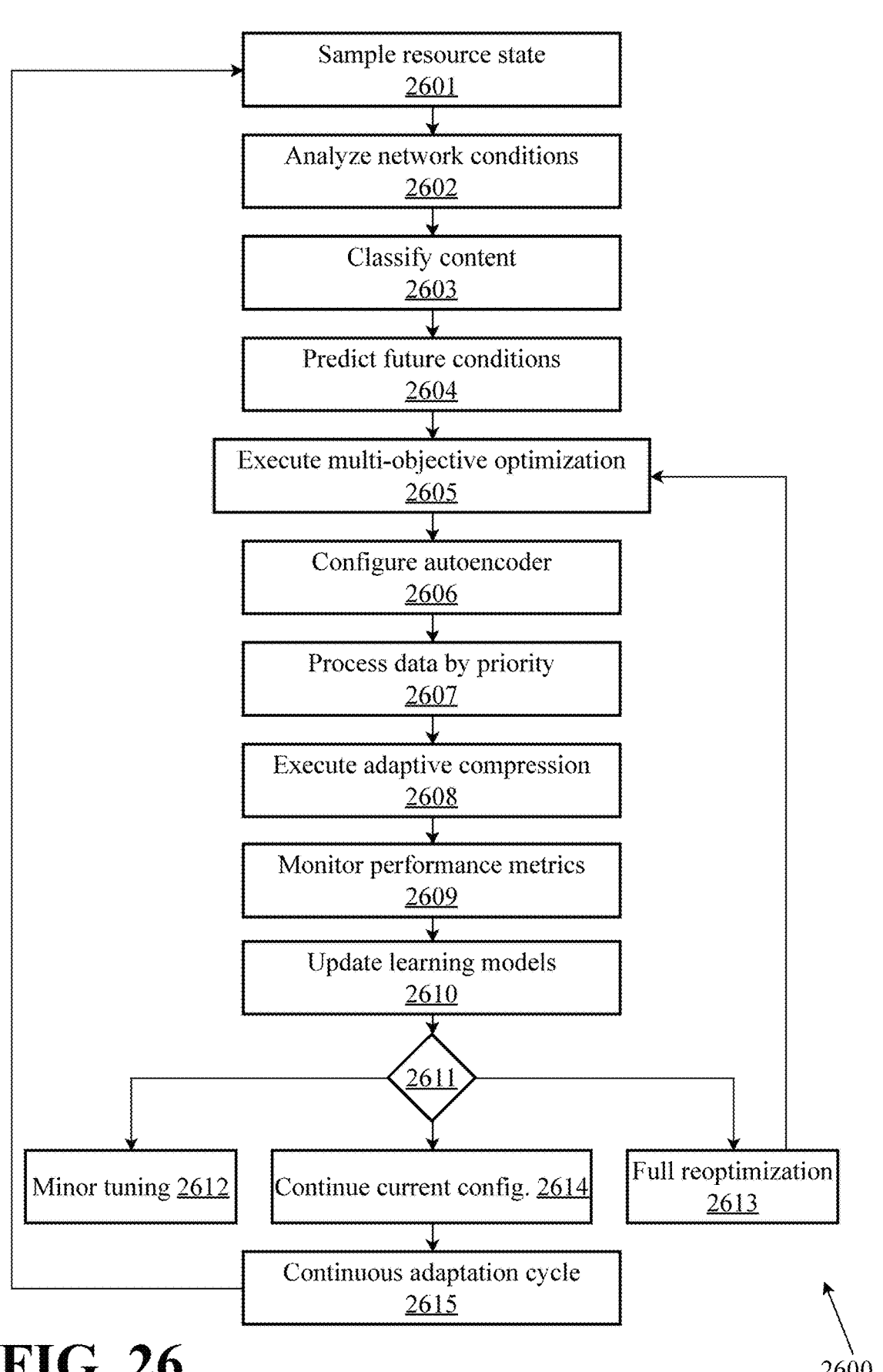
FIG. 26 is a flow diagram illustrating an exemplary real-time adaptive compression method flow for dynamic resource allocation and multi-modal data processing, according to an embodiment.

FIG. 26 is a flow diagram illustrating an exemplary real-time adaptive compression method flow for dynamic resource allocation and multi-modal data processing, according to an embodiment. In one embodiment, a real-time adaptive compression method 2600 comprises various steps organized into distinct phases: continuous monitoring, prediction and forecasting, dynamic parameter optimization, adaptive compression execution, and feedback and learning. Real-time adaptive compression method 2600 operates as a continuous control loop that adapts compression behavior every 1-5 seconds (or some other configurable time interval) based on changing device conditions, network status, and data characteristics to maintain optimal performance under varying operational constraints.

Continuous monitoring phase comprises three parallel monitoring steps that gather real-time information about system state and incoming data characteristics. Step 2601 samples resource state by monitoring CPU utilization every second, checking battery level and thermal state to prevent overheating and power depletion, and assessing memory availability to ensure adequate computational resources for compression operations. In one embodiment, step 2601 may incorporate predictive resource monitoring that anticipates future resource availability based on current consumption trends and historical usage patterns. Step 2602 analyzes network conditions by measuring available bandwidth and latency to determine transmission capabilities, detecting packet loss rates and connection stability to assess network reliability, and identifying network type and associated data transmission costs for cost-aware optimization. Step 2603 classifies content by determining data modality and priority levels to establish processing order, assessing complexity and quality requirements based on data characteristics, and evaluating temporal criticality to identify time-sensitive information requiring immediate processing.

Prediction and forecasting phase comprises step 2604 that predicts future system conditions over a configurable (e.g., 30-second) time horizon to enable proactive adaptation. Step 2604 can employ LSTM neural networks for prediction of battery drain rates and CPU utilization trends based on historical consumption patterns, utilizes transformer-based models for network bandwidth forecasting that account for time-of-day variations and network congestion patterns, and performs content analysis to estimate upcoming data volume and processing requirements. In one embodiment, step 2604 may incorporate ensemble prediction methods that combine multiple forecasting models to improve accuracy and robustness under varying operational conditions. Step 2604 may also implement uncertainty quantification to provide confidence intervals for predictions and enable risk-aware decision making in subsequent optimization steps.

Dynamic parameter optimization phase comprises step 2605 that executes multi-objective optimization to determine optimal compression configuration parameters. Step 2605 balances competing objectives including, but not limited to, compression ratio maximization, quality preservation, processing speed, and energy consumption minimization using sophisticated optimization algorithms. Step 2605 applies system constraints including, for example, battery level requirements greater than or equal to 10%, CPU utilization limits less than or equal to 85%, memory availability constraints, and processing deadline requirements to ensure feasible operation. Step 2605 generates optimal configuration parameters using NSGA-II that explores trade-offs between competing objectives and identifies Pareto-optimal solutions. In one embodiment, step 2605 may implement adaptive optimization that adjusts algorithm parameters based on convergence progress and solution quality to improve optimization efficiency and effectiveness.

Adaptive compression execution phase comprises various steps that apply the optimized configuration to actual data processing. Step 2606 configures the adaptive autoencoder by setting encoder complexity levels including lightweight, medium, or heavy processing paths based on available computational resources, adjusting latent space dimensions from 32 for emergency operation to 512 for performance mode, and enabling or disabling homomorphic operations based on security requirements and computational constraints. Step 2607 processes data by priority through sorting the processing queue according to emergency priority levels that prioritize critical data such as medical alerts and safety warnings, applying modality-specific preprocessing techniques optimized for each data type, and monitoring processing timeouts to ensure real-time operation constraints are satisfied. Step 2608 executes adaptive compression by applying the configured encoder to each data stream in priority order, performing real-time quality checks to ensure acceptable reconstruction fidelity, and implementing timeout protection that triggers emergency compression modes if processing constraints are exceeded.

Feedback and learning phase comprises two steps that monitor performance and update system models based on observed outcomes. Step 2609 monitors performance metrics by measuring actual compression ratio achieved compared to target values, calculating quality preservation using metrics such as PSNR or SSIM, and recording processing time and energy consumption to evaluate efficiency. Step 2610 updates learning models through online updates of prediction models based on actual versus predicted outcomes, adjusts optimization weights based on observed performance to improve future decision making, and stores successful configuration parameters associated with specific operational contexts for rapid retrieval when similar conditions are encountered.

Real-time adaptive compression method 2600 includes a decision point 2611 that determines whether significant changes to the compression configuration are needed based on performance monitoring results and changing operational conditions. Decision point 2611 evaluates whether current performance deviates significantly from target objectives, whether resource conditions have changed substantially, or whether new data characteristics require different processing approaches. If minor adjustments are needed, the method proceeds to step 2612 that performs minor parameter tuning including adjustment of optimization weights, modification of threshold values, and fine-tuning of processing parameters without complete reconfiguration. If major changes are required, the method proceeds to step 2613 that triggers full re-optimization by returning to step 2605 for complete recalculation of optimal parameters using updated system state and requirement information. If no changes are needed, the method proceeds to step 2614 that continues the current configuration while returning to continuous monitoring.

Real-time adaptive compression method 2600 implements a continuous adaptation cycle through step 2615 that returns to continuous monitoring loop, enabling the system to adapt every time interval for real-time responsiveness to changing conditions. The continuous loop ensures that compression behavior remains optimal as device resources, network conditions, and data characteristics evolve during operation. In one embodiment, the loop frequency may be dynamically adjusted based on rate of change in system conditions, with more frequent updates during periods of rapid change and less frequent updates during stable operation to conserve computational resources. Real-time adaptive compression method 2600 may also include emergency exit conditions that terminate the process during system shutdown or critical failure scenarios.

Real-time adaptive compression method 2600 provides intelligent and responsive compression management that continuously optimizes performance based on real-time operational constraints while maintaining high compression efficiency and data quality across diverse application domains. The method enables autonomous adaptation to varying resource availability, network conditions, and data processing requirements without requiring manual intervention or predefined configuration settings. In one embodiment, real-time adaptive compression method 2600 may incorporate machine learning techniques that improve adaptation strategies over time based on accumulated experience and user feedback, enabling the system to become more effective and efficient through continued operation and learning.

Figure 27:
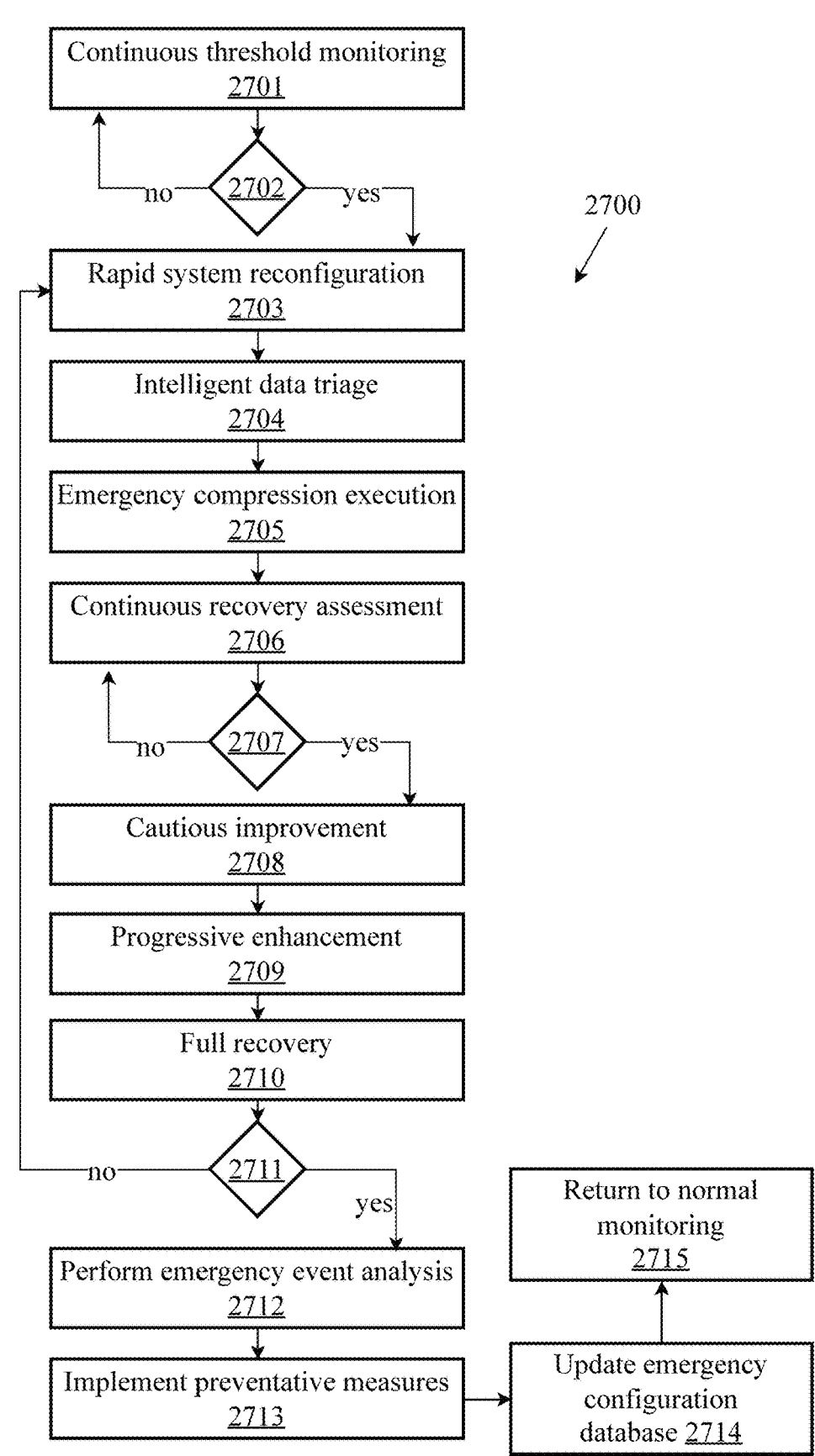
FIG. 27 is a flowchart illustrating an exemplary emergency mode activation and recovery method for adaptive real-time multi-modal compression with dynamic resource allocation, according to an embodiment.

FIG. 27 is a flowchart illustrating an exemplary emergency mode activation and recovery method for adaptive real-time multi-modal compression with dynamic resource allocation, according to an embodiment. In one embodiment, an emergency mode activation and recovery method 2700 comprises various steps organized into distinct phases: emergency trigger detection, immediate emergency response, recovery condition monitoring, gradual recovery process, and post-emergency learning. Emergency mode activation and recovery method 2700 provides intelligent crisis management that ensures system survival and continued operation under severe resource constraints while maintaining essential data processing capabilities and enabling systematic recovery to normal operation.

Emergency trigger detection phase comprises step 2701 that implements continuous threshold monitoring to detect critical system conditions requiring immediate emergency response. Step 2701 monitors battery levels with critical threshold below, for example, 10% and emergency threshold below 5% indicating imminent system shutdown, tracks CPU overload conditions exceeding 90% utilization and memory critical conditions exceeding 95% capacity that threaten system stability, and detects temperature danger above 85 degrees Celsius and network failure below 0.1 Mbps that compromise operational capability. Step 2701 includes a decision point 2702 that determines whether emergency conditions have been triggered based on threshold violations. If no emergency conditions are detected, the method continues normal operation monitoring through a feedback loop. If emergency conditions are detected, the method immediately proceeds to emergency response procedures with high-priority signaling.

Immediate emergency response phase comprises rapid reconfiguration and data processing steps that execute within strict time constraints to ensure system survival. Step 2703 performs rapid system reconfiguration with response time requirements less than 100 milliseconds to minimize service disruption. Step 2703 implements parameter override settings including, for example, compression ratio of 0.95 for maximum data reduction, quality threshold of 0.2 to accept significant quality degradation in favor of speed, and latent dimensions of 32 to minimize computational requirements. Step 2703 aborts current processing operations, clears data queues, and halts non-essential operations to free computational resources. Step 2703 disables homomorphic operations, background processes, and non-essential systems to reduce power consumption and computational overhead. In one embodiment, step 2703 may implement graduated emergency responses with different severity levels based on the specific emergency trigger and remaining system resources.

Step 2704 implements intelligent data triage through priority-based processing that ensures critical information is transmitted before system resources are exhausted. Step 2704 establishes priority ordering that processes medical alerts first, followed by safety warnings, security breaches, system status information, sensor data, text communications, audio data, and finally image data in decreasing order of importance. Step 2704 applies aggressive filtering mechanisms that discard non-essential data to conserve processing resources and transmission bandwidth for critical information. In one embodiment, step 2704 may implement context-aware prioritization that adapts priority schemes based on application domain, user preferences, and situational requirements such as emergency response scenarios or medical monitoring applications.

Step 2705 executes emergency compression using ultra-fast algorithms optimized for speed over quality. Step 2705 processes critical data with hard timeout limits of 50 milliseconds (for example) to ensure rapid completion and prevent system lockup. Step 2705 applies minimal preprocessing to reduce computational overhead while maintaining basic data integrity, utilizes fastest available compression algorithms that prioritize speed over compression efficiency, and implements immediate transmission with emergency priority flags to ensure prompt delivery. In one embodiment, step 2705 may employ hardware acceleration capabilities such as dedicated compression processors or GPU-based parallel processing to maximize compression speed under emergency conditions.

Recovery condition monitoring phase comprises step 2706 that continuously assesses system conditions to determine when safe recovery to normal operation can begin. Step 2706 monitors battery stability requiring levels greater than, for example, 15% with 5% buffer above emergency threshold, tracks CPU normalization with utilization below 70% indicating reduced processing load, and checks memory availability greater than 80% indicating adequate computational resources. Step 2706 verifies temperature safety below 75 degrees Celsius indicating thermal conditions have improved, confirms network restoration above 1.0 Mbps indicating viable communication capability, and requires stability duration of at least 30 seconds to ensure conditions have stabilized before initiating recovery procedures. Step 2706 includes decision point 2707 that determines recovery readiness based on sustained improvement across all monitored parameters. If recovery conditions are not met, the method continues emergency mode operation with ongoing condition monitoring.

Gradual recovery process phase implements a multi-phase recovery strategy that incrementally restores system capabilities while monitoring stability. Step 2708 initiates Phase 1 cautious improvement lasting 30 seconds with conservative parameter adjustments including compression ratio of 0.90 representing slight reduction from emergency levels, quality threshold of 0.4 providing modest quality improvement, latent dimensions of 64 representing small increase in representation capacity, and batch size of 2 enabling limited parallel processing. Step 2709 implements Phase 2 progressive enhancement lasting 60 seconds with moderate capability restoration including compression ratio of 0.80 for further quality improvement, quality threshold of 0.6 for better reconstruction fidelity, latent dimensions of 128 for increased feature representation, and selective re-enabling of homomorphic operations if resources permit.

Step 2710 executes Phase 3 full recovery that restores complete system functionality including normal operation mode parameters, re-enabling of background processes such as system monitoring and maintenance tasks, resumption of learning updates and model adaptation, and restoration of full logging and diagnostic capabilities. Each recovery phase includes stability monitoring with decision point 2711 that evaluates recovery success. If recovery fails at any phase, the method returns to emergency mode operation to prevent system instability. If recovery succeeds, the method proceeds to post-emergency learning phase.

Post-emergency learning phase comprises various steps that analyze emergency events and implement improvements to prevent future crises. Step 2712 performs emergency event analysis and learning by identifying root causes of emergency conditions, measuring emergency duration and system impact, analyzing data processing performance and quality degradation, and calculating energy conservation achieved during emergency operation. Step 2712 updates prediction models with emergency data patterns to improve future emergency detection accuracy, adjusts emergency thresholds by lowering triggers if response was too late or raising triggers if response was premature, and stores successful emergency configurations for similar operational contexts.

Step 2713 implements preventive measures including early warning systems with threshold levels 10% above emergency levels to provide advance notice of deteriorating conditions, predictive emergency scheduling that forecasts potential emergencies up to 5 minutes in advance, preemptive resource management that gradually reduces system load when emergency conditions are predicted, and critical data pre-compression that prepares essential information for rapid transmission. Step 2714 updates emergency configuration database by storing successful emergency response configurations associated with specific trigger conditions, creating context-specific emergency response templates for rapid deployment, and optimizing emergency detection algorithms based on observed system behavior and performance outcomes.

Emergency mode activation and recovery method 2700 concludes with step 2715 that returns to normal monitoring operation with enhanced emergency prevention capabilities. The method maintains continuous vigilance for emergency conditions while incorporating lessons learned from previous emergency events to improve system resilience and response effectiveness. In one embodiment, emergency mode activation and recovery method 2700 may implement machine learning techniques that continuously refine emergency detection thresholds, response strategies, and recovery procedures based on accumulated operational experience and changing system characteristics. Emergency mode activation and recovery method 2700 thus provides comprehensive crisis management that ensures system survival under extreme conditions while maintaining essential functionality and enabling intelligent recovery to optimal performance levels.

FIG. 1 is a block diagram illustrating an exemplary system architecture for compressing and restoring multimodal data using multi-level autoencoders and correlation networks. In one embodiment, a system for compressing and restoring multi-modal data using multi-level autoencoders and correlation networks comprises a plurality of multimodal data inputs 100, a data preprocessor 110, a data normalizer 120, a multi-layer multi-modal variational autoencoder network 130 which further comprises an encoder network 131 and a decoder network 132, a plurality of compressed outputs 140, plurality of decompressed multimodal outputs 170, a decompressed output organizer 190, a multi-modal correlation network 160, and a reconstructed multi-modal output 180. The plurality of multi-modal data inputs 100 are representations of raw data from various sources, such as sensors, cameras, or databases, comprising at least two different data types. These data types may include, but are not limited to, image data, audio data, text data, time-series data, and sensor data. The raw multi-modal data can be in different formats, including but not limited to images, videos, audio, or structured data. The plurality of multi-modal data inputs 100 may be transferred to the data preprocessor 110 for further processing.

The data preprocessor 110 applies various preprocessing techniques to the raw multi-modal data received from the data input 100. These techniques may include data cleaning, noise reduction, artifact removal, format conversion, and importantly, aligning and synchronizing the different data types. The preprocessor 110 ensures that the multi-modal data is in a suitable format and quality for subsequent stages of the system, with different modalities properly aligned for joint processing.

The compressed latent representation obtained from the encoder network 131 is the compressed output 140. The compressed output 140 has a significantly reduced size compared to the original input data, enabling efficient storage and transmission. The compressed output 140 may be stored in a storage system. A storage system may include any suitable storage medium, such as a database, file system, or cloud storage. Storage systems allow for the efficient management and retrieval or the compressed data as needed. When the compressed data needs to be restored or reconstructed, it may be retrieved from the storage system and passed to the decoder network 132. Additionally, the compressed data may be directly passed to the decompression network 132. The decoder network 132 is responsible for decoding the compressed latent representation back into the original data space by outputting a decompressed multimodal output 170. It consists of multiple layers of decoders that progressively increase the dimensionality of the data, reconstructing the original input.

The decompressed multi-modal output 170 from the decoder network 132 may have some loss of information compared to the original input data due to the compression process. To further enhance the quality of the decompressed output, the system may incorporate a multi-modal correlation network 160. The correlation network 160 leverages the correlations and patterns between different compressed inputs to restore the decompressed output more accurately. It learns to capture the relationships and dependencies within the data, allowing for better reconstruction and restoration of the original information. The multi-modal correlation network 160 takes the decompressed multi-modal outputs 170 as inputs. It analyzes the correlations and similarities between the data samples and uses this information to refine and enhance the decompressed output. The refined decompressed output from the multi-modal correlation network 160 is a reconstructed multi-modal output 180 of the system. The reconstructed multi-modal output 180 closely resembles the original input data, with minimal loss of information and improved quality compared to the output from the decoder network 132 alone.

In one embodiment, the multi-modal correlation network 160 may receive inputs from a decompressed output organizer 190 which operates on the decompressed multi-modal outputs 170 obtained from the decoder network 132. The decompressed output organizer 190 may organize the decompressed multi-modal outputs 170 into groups based on their cross-modal correlations and similarities.

By grouping decompressed multi-modal outputs 170 based on similarities across different data types, the multimodal correlation network 160 will more easily be able to identify correlations between decompressed outputs 170 both within and across modalities. The multi-modal correlation network 160 finds patterns and similarities between decompressed outputs 170 to develop a more holistic reconstructed original multi-modal input. By priming the multimodal correlation network 160 with already grouped, similar compressed multi-modal outputs 170, the network will be able to generate even more reliable reconstructions. The multi-layer multi-modal variational autoencoder network 130 and the multi-modal correlation network 160 are trained using a large dataset of diverse multi-modal samples. The training process involves minimizing the reconstruction loss between the original multi-modal input data and the decompressed output 170, accounting for reconstruction quality across all data modalities. The system learns to compress the multi-modal data efficiently while preserving the essential features and patterns across different data types.

Figure 2:
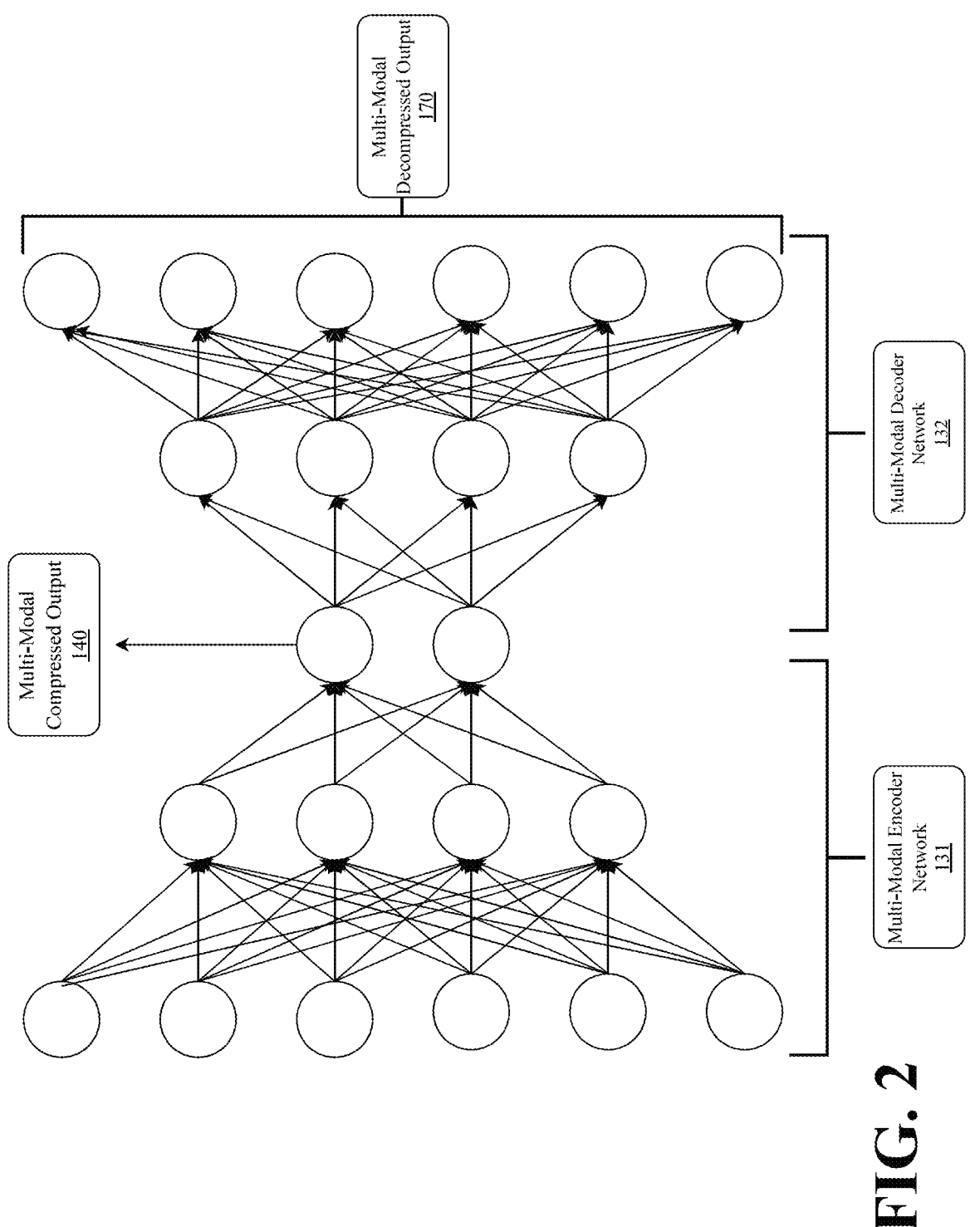
FIG. 2 is a block diagram illustrating an exemplary architecture for a subsystem of the system for compressing and restoring data using multi-level autoencoders and correlation networks, an autoencoder network.

FIG. 2 is a block diagram illustrating an exemplary architecture for a subsystem of the system for compressing and restoring multi-modal data using multi-level autoencoders and correlation networks, a multi-layer multi-modal variational autoencoder network. The multi-layer multi-modal variational autoencoder network comprises a multi-modal encoder network 131 and a multi-modal decoder network 132 that work together to encode and decode multi-modal data effectively. The multi-modal encoder network 131 and multi-modal decoder network 132 within the multi-layer multi-modal variational autoencoder network are comprised of a plurality of layers that contribute to the encoding and decoding process. These layers include, but are not limited to, modality-specific layers for processing different data types, shared layers for integrating information across modalities, and a unified bottleneck layer. Some embodiments also include functions that operate on information including but not limited to rectified linear unit functions, sigmoid functions, and skip connections.

The modality-specific layers are responsible for extracting meaningful features from the different types of input data. For image data, convolutional layers apply convolutional operations using learnable filters to capture spatial patterns and hierarchical representations of the data. For sequential data such as text or time-series, recurrent layers may be used. For numerical data, fully connected layers can be employed. These layers can have different configurations to capture features at various scales and resolutions appropriate to each data type. Skip connections are employed to facilitate the flow of information across different layers of the autoencoder. Skip connections allow the output of a layer to be directly added to the output of a subsequent layer, enabling the network to learn residual mappings and mitigate the vanishing gradient problem. Skip connections help in preserving fine-grained details and improving the training stability of the multi-modal autoencoder.

Pooling layers are used to downsample the feature maps generated by the modality-specific layers. They reduce the dimensions of the feature maps while retaining the most salient information. Common pooling operations include but are not limited to max pooling and average pooling. Pooling layers help in achieving translation invariance, reducing computational complexity, and controlling the receptive field of the autoencoder. Rectified Linear Unit (ReLU) functions introduce non-linearity into the autoencoder by applying a ReLU activation function element-wise to the output of the previous layer. ReLU functions help in capturing complex patterns and relationships in the multi-modal data by allowing the network to learn non-linear transformations. They also promote sparsity and alleviate the vanishing gradient problem. The unified bottleneck layer represents the most compressed representation of the multi-modal input data in a shared latent space. This layer has a significantly reduced dimensionality compared to the input and output layers of the autoencoder. It forces the network to learn a compact and meaningful encoding of the data, capturing the essential features across all modalities and discarding redundant information. In one embodiment, the multi-layer multi-modal variational autoencoder network is comprised of a plurality of the previously mentioned layers where the sequence and composition of the layers may vary depending on a user's preferences and goals. The unified bottleneck layer is where the compressed multi-modal output 140 is created in a shared latent space. Each layer previous to the bottleneck layer creates a more and more compressed version of the original multi-modal input. The layers after the bottleneck layer represent the decoder network 132 where a plurality of layers operate on a compressed input to decompress a multi-modal data set. Decompression results in a version of the original multi-modal input which is largely similar but has some lost data from the transformations.

Figure 3:
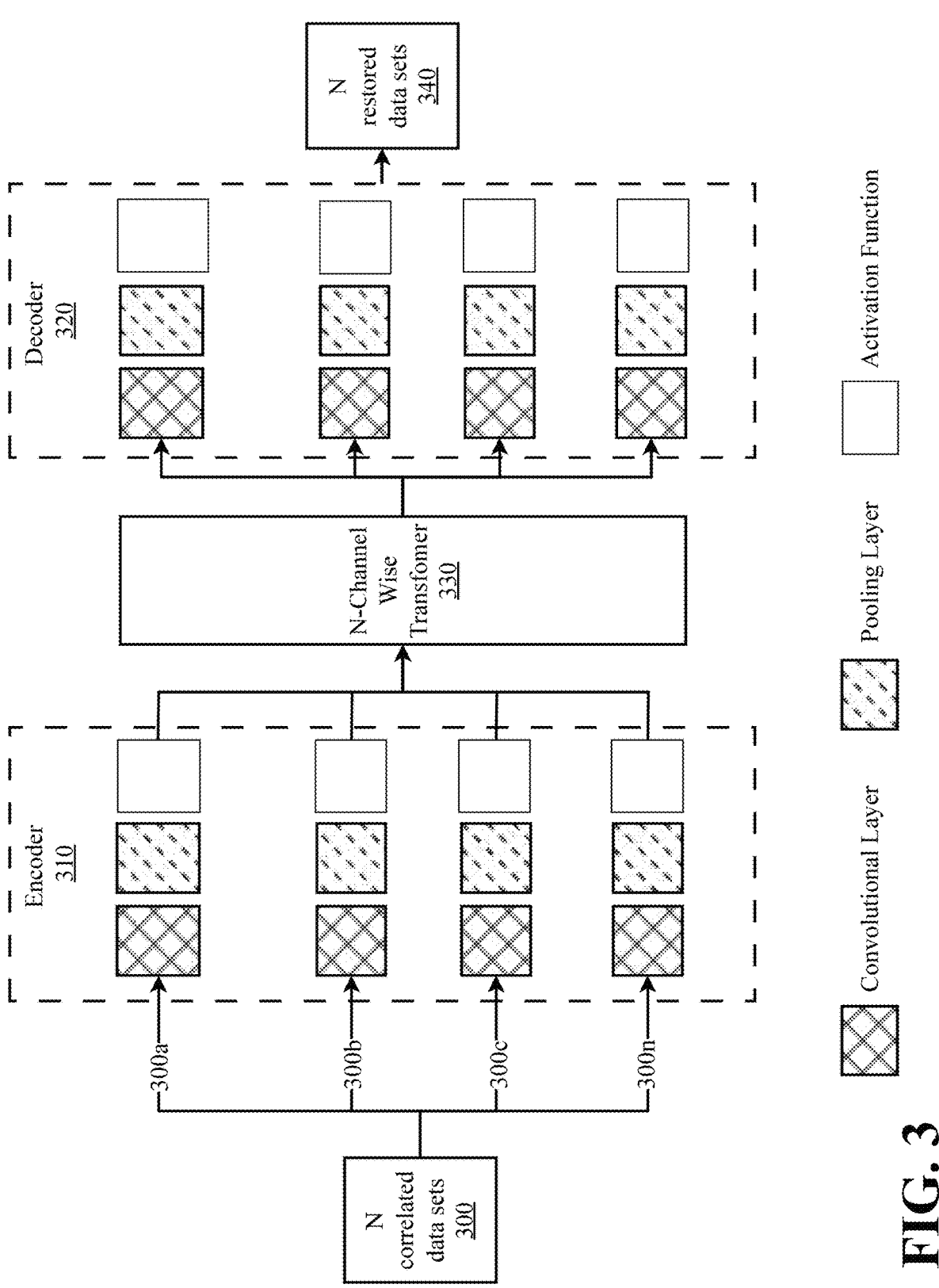
FIG. 3 is a block diagram illustrating an exemplary architecture for a subsystem of the system for compressing and restoring data using multi-level autoencoders and correlation networks, a correlation network.

FIG. 3 is a block diagram illustrating an exemplary architecture for a subsystem of the system for compressing and restoring data using multi-level autoencoders and correlation networks, a correlation network. The correlation network 160 is designed to enhance the reconstruction of decompressed data by leveraging correlations and patterns within the data. The correlation network 160 may also be referred to as a neural upsampler. The correlation network 160 comprises a plurality of correlation network elements that work together to capture and utilize the correlations for improved data reconstruction. Each correlation network element within the correlation network 160 contributes to the correlation learning and data reconstruction process. These elements include, but are not limited to, convolutional layers, skip connections, pooling layers and activation functions such as but not limited to, rectified linear unit functions or sigmoid functions.

The convolutional layers are responsible for extracting meaningful features from the input data. They apply convolutional operations using learnable filters to capture spatial patterns and hierarchical representations of the data. The convolutional layers can have different numbers of filters, kernel sizes, and strides to capture features at various scales and resolutions. Skip connections are employed to facilitate the flow of information across different layers of the autoencoder. Skip connections allow the output of a layer to be directly added to the output of a subsequent layer, enabling the network to learn residual mappings and mitigate the vanishing gradient problem. Skip connections help in preserving fine-grained details and improving the training stability of the autoencoder.

Pooling layers are used to downsample the feature maps generated by the convolutional layers. They reduce the spatial dimensions of the feature maps while retaining the most salient information. Common pooling operations include but are not limited to max pooling and average pooling. Pooling layers help in achieving translation invariance, reducing computational complexity, and controlling the receptive field of the autoencoder. Rectified Linear Unit (ReLU) functions introduce non-linearity into the autoencoder by applying a ReLU activation function element-wise to the output of the previous layer. ReLU functions help in capturing complex patterns and relationships in the data by allowing the network to learn non-linear transformations. They also promote sparsity and alleviate the vanishing gradient problem.

In one embodiment, the correlation network 160 may comprise an encoder 310, a decoder 320, an N number of correlated data sets 300, an N number-channel wise transformer 330, and an N number of restored data sets 340. Additionally, the correlation network 160 may be comprised of a plurality of convolutional layers, pooling layers, and activation functions. In one embodiment, the correlation network 160 may be configured to receive N correlated data sets 300 where each correlated data set includes a plurality of decompressed data points. In one embodiment, the correlation network 160 may be configured to receive four correlated data sets as an input. The correlated data sets may have been organized by a decompressed output organizer 190 to maximize the similarities between the data points in each set. One data set, 300, may include data points 300a, 300b, 300c, through 300n, where the decompressed output organizer 190 has determined the N number of data points are similar enough to be grouped together. The correlation network 160 may then receive and process full data sets at a time. In FIG. 3, the data is processed through an encoder 310 by passing through a convolutional layer, a pooling layer, and an activation function.

Activation functions introduce non-linearity into the network, enabling it to learn and represent complex patterns and relationships in the data. Common activation functions include but are not limited to sigmoid, tanh, ReLU (Rectified Linear Unit), and its variants. These functions have different properties and are chosen based on the specific requirements of the task and the network architecture. For example, ReLU is widely used in deep neural networks due to its ability to alleviate the vanishing gradient problem and promote sparsity in the activations. By applying activation functions, the neural network can learn capture non-linear relationships in the data, enabling it to model complex patterns and make accurate predictions or decisions.

The encoder 310 breaks the decompressed outputs passed by the decompressed output organizer 190 down into smaller representations of the original data sets. Following the encoder the data may pass through a transformer 330. A transformer is a type of neural network architecture that may rely on a self-attention mechanism which allows the model to weigh the importance of different parts of the input sequence when processing each element. This enables the transformer to capture dependencies and relationships between elements in the sequence efficiently. After being processed by a transformer 330, the data sets may be further processed by a decoder 320 which restores the smaller representations back into the original decompressed data sets. The decoder 320 may have a similar composition as the encoder 310, but reversed, to undo the operations performed on the data sets by the encoder 310. The transformer 330 may identify important aspects in each group of decompressed data passed through the correlation network which allows the decoder 320 to rebuild a more complete version of the original decompressed data sets. The decoder 320 may output an N number of restored data sets 340 which correspond to the N number of correlated data sets 300 originally passed through the correlation network 170.

Figure 4:
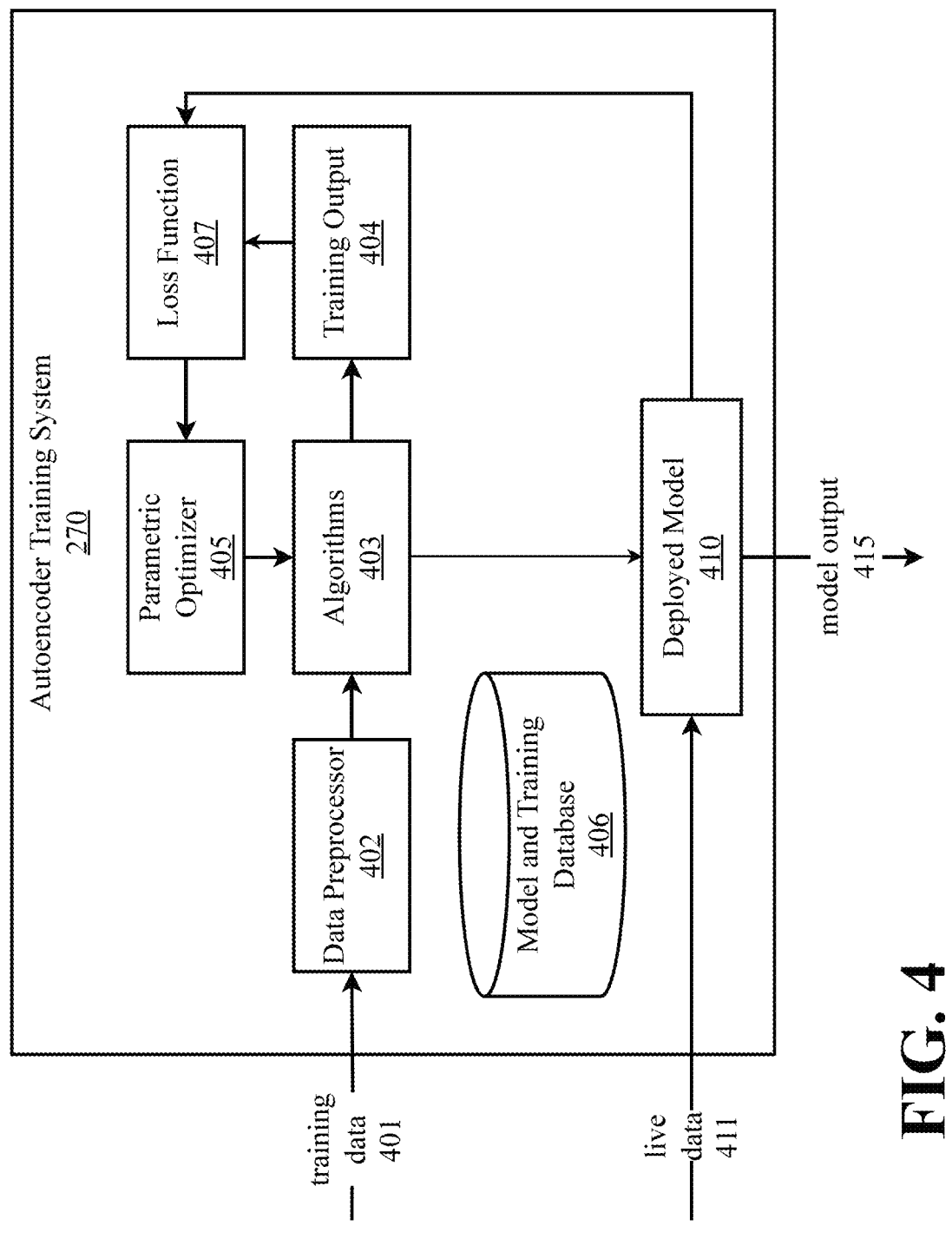
FIG. 4 is a block diagram illustrating an exemplary architecture for a subsystem of the system for compressing and restoring data using multi-level autoencoders and correlation networks, an autoencoder training system.

FIG. 4 is a block diagram illustrating an exemplary aspect of a platform for a subsystem of the system for compressing and restoring data using multi-level autoencoders and correlation networks, an autoencoder training system 270. According to the embodiment, the autoencoder training system 270 may comprise a model training stage comprising a data preprocessor 402, one or more machine and/or deep learning algorithms 403, training output 404, and a parametric optimizer 405, and a model deployment stage comprising a deployed and fully trained model 410 configured to perform tasks described herein such as transcription, summarization, agent coaching, and agent guidance. Autoencoder training system 270 may be used to train and deploy a multi-layer autoencoder network in order to support the services provided by the compression and restoration system.

At the model training stage, a plurality of training data 401 may be received at the autoencoder training system 270.

In some embodiments, the plurality of training data may be obtained from one or more storage systems and/or directly from various information sources. In a use case directed to hyperspectral images, a plurality of training data may be sourced from data collectors including but not limited to satellites, airborne sensors, unmanned aerial vehicles, ground-based sensors, and medical devices. Hyperspectral data refers to data that includes wide ranges of the electromagnetic spectrum. It could include information in ranges including but not limited to the visible spectrum and the infrared spectrum. Data preprocessor 402 may receive the input data (e.g., hyperspectral data) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 402 may also be configured to create training dataset, a validation dataset, and a test set from the plurality of input data 401. For example, a training dataset may comprise 80% of the preprocessed input data, the validation set 10%, and the test dataset may comprise the remaining 10% of the data. The preprocessed training dataset may be fed as input into one or more machine and/or deep learning algorithms 403 to train a predictive model for object monitoring and detection.

During model training, training output 404 is produced and used to measure the quality and efficiency of the compressed outputs. During this process a parametric optimizer 405 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLU, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the autoencoder training system 270 to evaluate a model's performance. Metrics can include, but are not limited to, compression ratio, the amount of data lost, the size of the compressed file, and the speed at which data is compressed, to name a few. In one embodiment, the system may utilize a loss function 407 to measure the system's performance. The loss function 407 compares the training outputs with an expected output and determined how the algorithm needs to be changed in order to improve the quality of the model output. During the training stage, all outputs may be passed through the loss function 407 on a continuous loop until the algorithms 403 are in a position where they can effectively be incorporated into a deployed model 415.

The test dataset can be used to test the accuracy of the model outputs. If the training model is compressing or decompressing data to the user's preferred standards, then it can be moved to the model deployment stage as a fully trained and deployed model 410 in a production environment compressing or decompressing live input data 411 (e.g., hyperspectral data).

Further, model compressions or decompressions made by deployed model can be used as feedback and applied to model training in the training stage, wherein the model is continuously learning over time using both training data and live data and predictions.

A model and training database 406 is present and configured to store training/test datasets and developed models. Database 406 may also store previous versions of models. According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 403 may comprise a deep learning algorithm such as neural networks (e.g., recurrent, convolutional, long short-term memory networks, etc.). In some implementations, the autoencoder training system 270 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 406.

Figure 5:
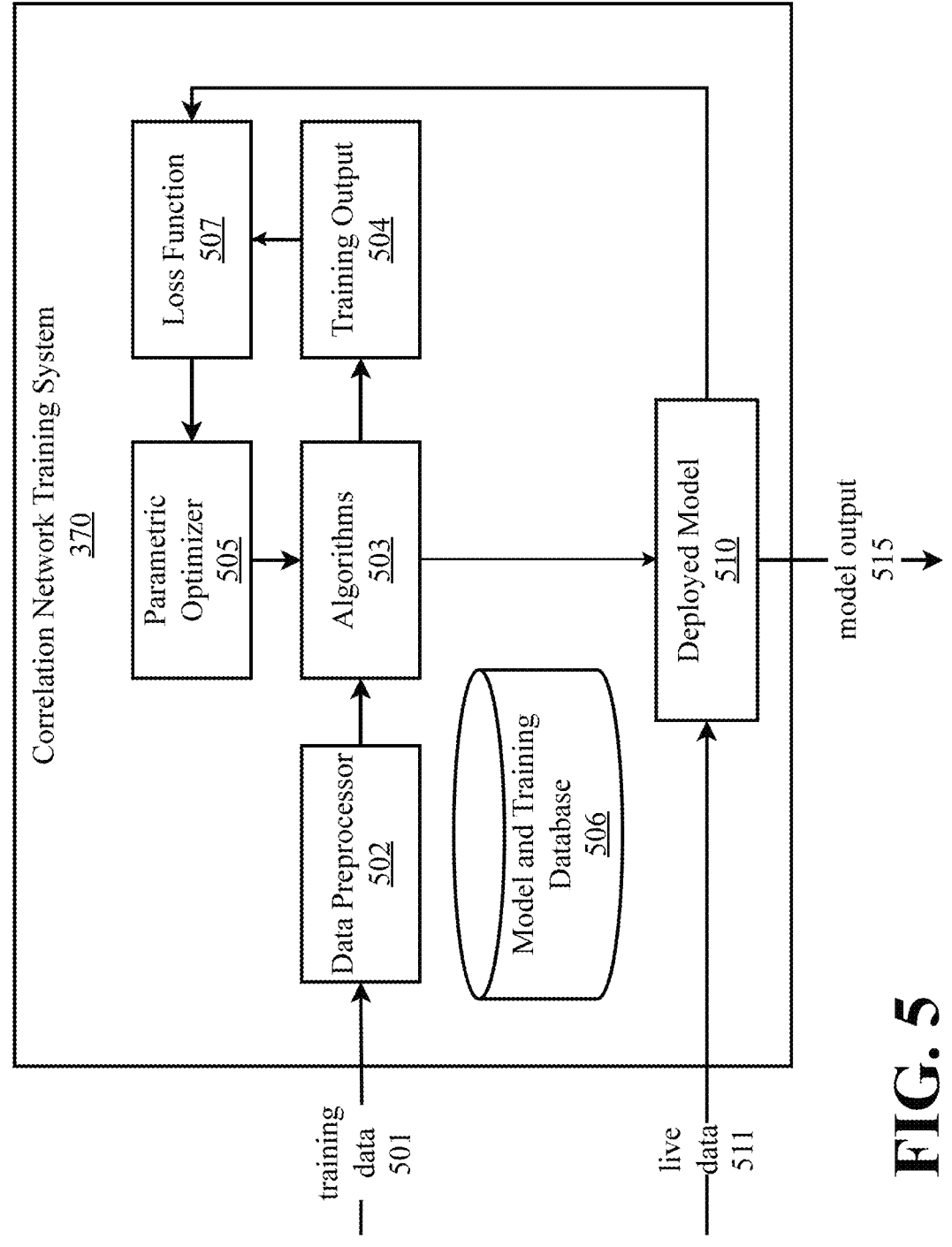
FIG. 5 is a block diagram illustrating an exemplary architecture for a subsystem of the system for compressing and restoring data using multi-level autoencoders and correlation networks, correlation network training system.

FIG. 5 is a block diagram illustrating an exemplary aspect of a subsystem of the system for compressing and restoring data using multi-level autoencoders and correlation networks, a correlation network training system 370. According to the embodiment, correlation network training system 370 may comprise a model training stage comprising a data preprocessor 502, one or more machine and/or deep learning algorithms 503, training output 504, and a parametric optimizer 505, and a model deployment stage comprising a deployed and fully trained model 510 configured to perform tasks described herein such determining correlations between compressed data sets. The correlation network training system 370 may be used to train and deploy the correlation network 300 in order to support the services provided by the compression and decompression system.

At the model training stage, a plurality of training data 501 may be received by the correlation network training system 370. In some embodiments, the plurality of training data may be obtained from one or more storage systems and/or directly from the compression network 131. In some embodiments, the correlation network training system may obtain data sets from a vector grouping system. In a use case directed to hyperspectral data sets, a plurality of decompressed training data may be sourced from a hyperspectral data compression system. Data preprocessor 502 may receive the input data (e.g., decompressed hyperspectral data) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 502 may also be configured to create training dataset, a validation dataset, and a test set from the plurality of input data 501. For example, a training dataset may comprise 80% of the preprocessed input data, the validation set 10%, and the test dataset may comprise the remaining 10% of the data. The preprocessed training dataset may be fed as input into one or more machine and/or deep learning algorithms 503 to train a predictive model for object monitoring and detection.

During model training, training output 504 is produced and used to measure the accuracy and usefulness of the predictive outputs. During this process a parametric optimizer 505 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLU, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by a machine learning engine to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, cost-to-performance tradeoff, and personal identifying information/payment card industry redaction, to name a few. In one embodiment, the system may utilize a loss function 507 to measure the system's performance. The loss function 507 compares the training outputs with an expected output and determined how the algorithm needs to be changed in order to improve the quality of the model output. During the training stage, all outputs may be passed through the loss function 507 on a continuous loop until the algorithms 503 are in a position where they can effectively be incorporated into a deployed model 515.

The test dataset can be used to test the accuracy of the model outputs. If the training model is establishing correlations that satisfy a certain criterion such as but not limited to quality of the correlations and amount of restored lost data, then it can be moved to the model deployment stage as a fully trained and deployed model 510 in a production environment making predictions based on live input data 511 (e.g., compressed hyperspectral data). Further, model correlations and restorations made by deployed model can be used as feedback and applied to model training in the training stage, wherein the model is continuously learning over time using both training data and live data and predictions. A model and training database 506 is present and configured to store training/test datasets and developed models. Database 506 may also store previous versions of models.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 503 may comprise a deep learning algorithm such as neural networks (e.g., recurrent, convolutional, long short-term memory networks, etc.).

In some implementations, the correlation network training system 270 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 506.

Figure 13:
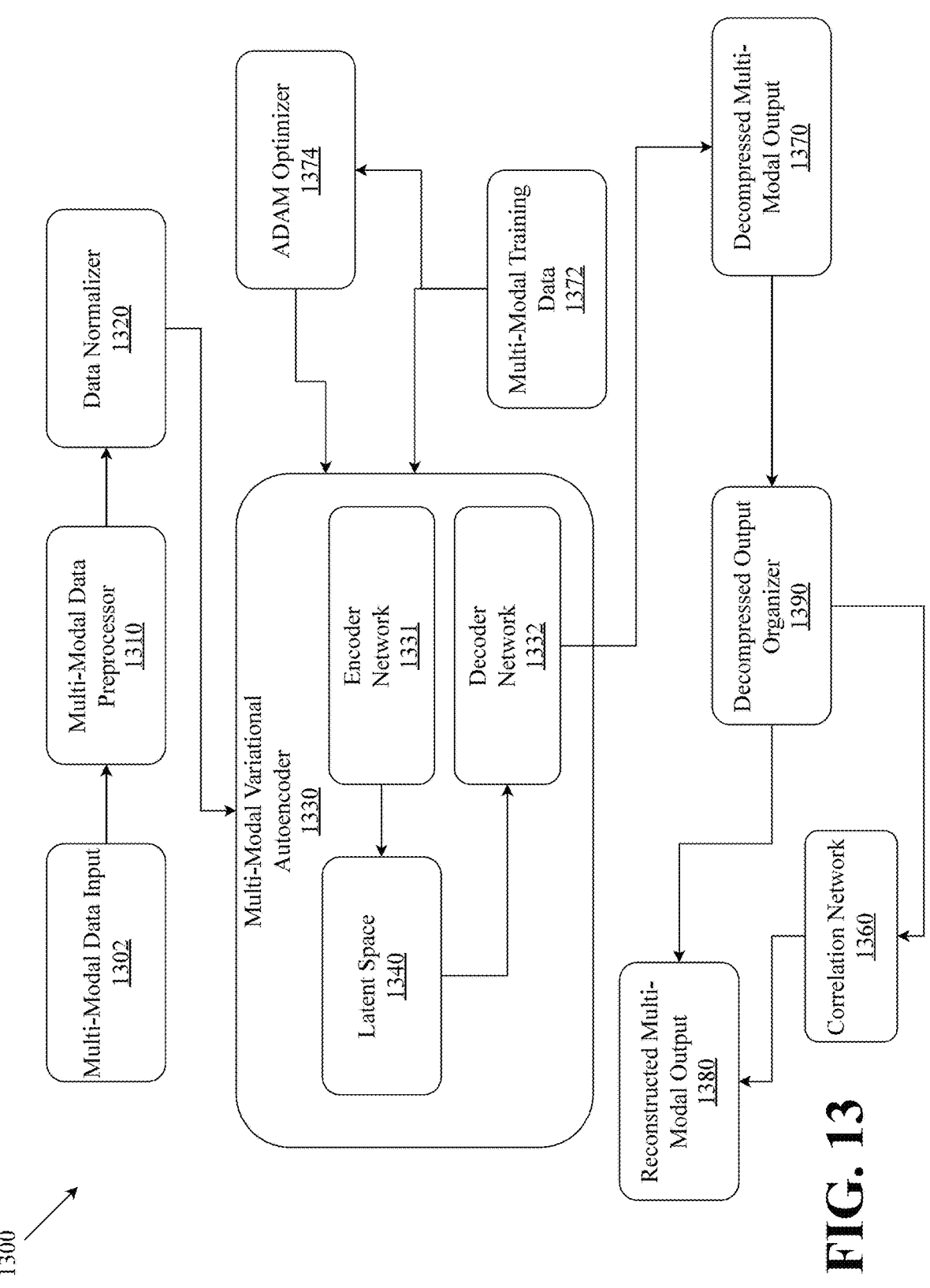
FIG. 13 is a block diagram illustrating an exemplary system architecture for compressing and restoring data using variational autoencoders, according to an embodiment.

FIG. 13 is a block diagram 1300 illustrating an exemplary system architecture for compressing and restoring multimodal data using a variational autoencoder. In one or more embodiments, compressing and restoring multi-modal data using a variational autoencoder enables homomorphic data compression across diverse data types. The multi-modal variational autoencoder can be configured to learn a smooth, continuous unified latent space representation of the multimodal input data. Thus, in embodiments, small perturbations in the unified latent space correspond to significant variations in the input data across modalities. In embodiments, linear operations in the unified latent space, such as addition, subtraction, and scalar multiplication correspond to meaningful operations in the multi-modal input data.

In general, data compression has advantages for computer systems in terms of resource usage and scalability. Data compression techniques can significantly reduce the storage space required for data while still maintaining its integrity and utility. This is particularly valuable in applications dealing with large volumes of data, such as cloud computing and big data analytics. Moreover, using data compression can lead to more efficient transmission over networks, reducing bandwidth requirements.

Homomorphic data compression offers several additional benefits over conventional data compression techniques, primarily in scenarios where preserving privacy and reducing computational overhead are important. One of the primary advantages of homomorphic data compression is the ability to compress data while keeping it encrypted. This is especially important in fields such as healthcare and finance, where sensitive data needs to be analyzed without compromising privacy. Homomorphic compression enables secure outsourcing of computations to third-party service providers while preserving data privacy. This is advantageous in scenarios where organizations need to leverage external resources for data processing without exposing sensitive information. Homomorphic compression techniques can facilitate data analysis on encrypted data without the need for decryption, enabling organizations to derive valuable insights while maintaining data confidentiality. In industries with stringent data privacy regulations, such as healthcare (Health Insurance Portability and Accountability Act of the United States (HIPAA)) and finance (General Data Protection Regulation of the European Union) (GDPR)), homomorphic compression can help organizations comply with regulatory requirements by ensuring the privacy and security of sensitive information.

In one embodiment, a system for compressing and restoring multi-modal data using a variational autoencoder comprises a plurality of multi-modal data inputs 1302, a multimodal data preprocessor 1310, a data normalizer 1320, a multi-modal variational autoencoder 1330 which further comprises an encoder network 1331 and a decoder network 1332. Configured and disposed between the encoder network 1331 and the decoder network 1332 is a unified latent space 1340. The unified latent space 1340 represents the low-dimensional continuous space where the autoencoder maps the multi-modal input data. The encoder network 1331 within the multi-modal variational autoencoder 1330 receives multi-modal data input 1302. Data input 1302 can include text, images, audio, video, hyperspectral data, timeseries data, sensor data, binary data, and/or other types of data. The encoder network 1331 maps the received multimodal data input 1302 to a probability distribution in the unified latent space 1340. In embodiments, the encoder network 1331 outputs parameters of a probability distribution. In embodiments, the parameters can include mean and variance. In embodiments, the probability distribution includes a Gaussian (normal) distribution. In one or more embodiments, the probability distribution can include a Bernoulli distribution, categorical distribution, and/or a multinomial distribution, instead of, or in addition to, a Gaussian distribution. In embodiments, programming instructions executing on a processor cause the variational autoencoder to perform partially homomorphic compression and/or partially homomorphic encryption. In embodiments, the variational autoencoder comprises a latent space, and wherein the plurality of programming instructions further includes instructions that, when executing on the processor, cause the variational autoencoder to perform one or more linear operations in the latent space. In embodiments, programming instructions further includes instructions that, when executing on the processor, cause the variational autoencoder to perform the linear operations that include at least one of addition, subtraction, and scalar multiplication.

The decoder network 1332 maps the unified latent space 1340 to a decompressed multi-modal output 1370. The decompressed multi-modal output can be input to a decompressed multi-modal output organizer 1390, which in turn outputs a reconstructed multi-modal output 1380. The multimodal data inputs 1302 can be representations of raw data from various sources, such as sensors, cameras, microphones, or databases. The raw data can be in different formats, including but not limited to images, videos, audio, time-series, or structured data. The plurality of multi-modal data inputs 1302 may be transferred to the multi-modal data preprocessor 1310 for further processing. The multi-modal data preprocessor 1310 applies various preprocessing techniques to the raw data received from the data input 1302. These techniques may include data cleaning, noise reduction, artifact removal, format conversion, and synchronization of different data modalities. The multi-modal data preprocessor 1310 ensures that the data from all modalities is in a suitable format and quality for subsequent stages of the system.

The preprocessed data may then be passed to the data normalizer 1320. The data normalizer 1320 scales and normalizes the data to a consistent range, typically between 0 and 1. Normalization can help to improve the training stability and convergence of the multi-modal variational autoencoder 1330. The normalized data is fed into the multi-modal variational autoencoder 1330, which includes both the encoder network 1331, latent space 1340, and the decoder network 1332. The encoder network 1331 is responsible for encoding the input data into a lower-dimensional latent space representation. The decoder network 1332 can include multiple layers of encoders that progressively reduce the dimensionality of the data while capturing the most important features and patterns.

The latent space 1340 has a significantly reduced size compared to the original input data, enabling efficient storage and transmission. The latent space 1340 represents a compressed output that may be stored in a storage system. A storage system may include any suitable storage medium, such as a database, file system, or cloud storage. Storage systems allow for the efficient management and retrieval or the compressed data represented by latent space 1340 as needed.

In embodiments, one or more operations may be performed on the compressed data of latent space 1340. The operations can include homomorphic operations. The homomorphic operations can include linear operations. The linear operations can include addition, subtraction, scalar multiplication, and/or other suitable operations.

When the compressed data needs to be restored or reconstructed, it may be retrieved from the storage system and passed to the decoder network 1332. Additionally, the compressed data may be directly passed directly to the decoder network 1332. The decoder network 1332 is responsible for decoding the compressed latent representation back into the original data space by outputting a decompressed output 1370. The decoder network 1332 can include multiple layers of decoders that progressively increase the dimensionality of the data, reconstructing the original input.

The decompressed multi-modal output 1370 from the decoder network 1332 may have some loss of information compared to the original multi-modal input data due to the compression process. In one or more embodiments, to further enhance the quality of the decompressed output, the system may optionally incorporate a multi-modal correlation network 1360. The multi-modal correlation network 1360 leverages the correlations and patterns between different compressed inputs, both within and across modalities, to restore the decompressed output more accurately. It learns to capture the relationships and dependencies within and between different data types, allowing for better reconstruction and restoration of the original multi-modal information. The multi-modal correlation network 1360 takes the decompressed multi-modal outputs 1370 as inputs. It analyzes the correlations and similarities between the data samples across modalities and uses this information to refine and enhance the decompressed output. The refined decompressed output from the multi-modal correlation network 1360 is a reconstructed multi-modal output 1380 of the system. The reconstructed multi-modal output 1380 closely resembles the original multi-modal input data, with minimal loss of information and improved quality compared to the output from the decoder network 1332 alone.

In one or more embodiments, the correlation network 1360 may receive inputs from a decompressed output organizer 1390 which operates on the decompressed outputs 1370 obtained from the decoder network 1332. The decompressed output organizer 1390 may organize the decompressed outputs 1370 into groups based on their correlations and similarities. By grouping decompressed outputs 1370 based on similarities, the correlation network 1360 will more easily be able to identify correlations between decompressed outputs 1370. Thus, embodiments can further include a correlation network, and wherein the output of the decompressed output organizer is input to the correlation network, and wherein the output of the correlation network provides the reconstructed output.

In one or more embodiments, the variational autoencoder 1330 is trained via training data 1372. The training data 1372 can be part of a supervised or semi-supervised learning process. In embodiments, the variational autoencoder 1330 can be optimized with an ADAM (Adaptive Moment Estimation) optimizer 1374. In one or more embodiments, the encoder network 1331 and decoder network 1332 are trained to learn meaningful representations of the data input 1302 and generate realistic output data for reconstructed output 1380. In embodiments, the ADAM optimizer 1374 is used to adjust the weights of the encoder network 1331 and/or decoder network 1332 based on factors such as the reconstruction error and/or the KL divergence between the learned latent distribution and a predefined prior distribution, such as a Gaussian distribution. In one or more embodiments, the KL (Kullback-Leibler) divergence is used as part of the objective function in probabilistic models to encourage learned distributions to match target distributions, regularize the model, and/or learn meaningful representations to enable features such as homomorphic data compression. Thus, embodiments can include training the variational autoencoder, wherein the training includes using an Adam optimizer.

Figure 14:
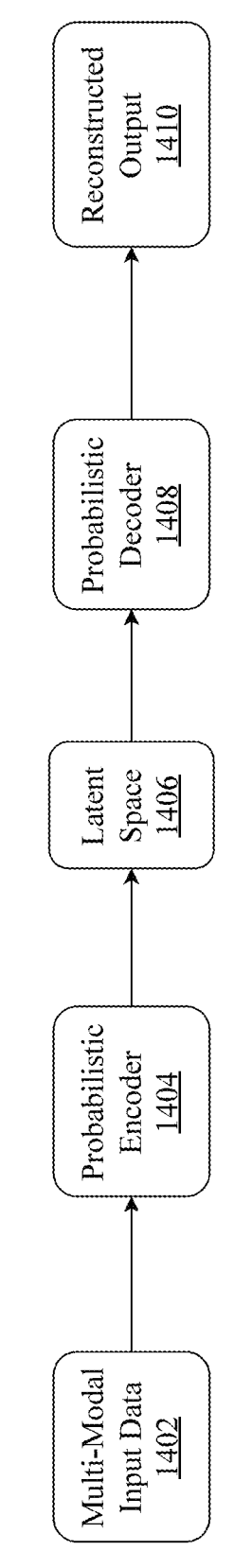
FIG. 14 is a block diagram of a variational autoencoder used in an embodiment.

FIG. 14 is a block diagram 1400 of a multi-modal variational autoencoder used in an embodiment. The general architecture of a multi-modal autoencoder includes a multi-modal encoder, multi-modal decoder, and unified latent space. The unified latent space may be implemented using a bottleneck layer. The encoder section includes multiple input layers that accept different types of input data. Hidden layers progressively reduce the dimensionality of the multi-modal input, capturing important features and patterns across all modalities. These layers comprise the multi-modal encoder. The bottleneck layer (unified latent space) is the final hidden layer, where the dimensionality is significantly reduced. This layer represents the compressed encoding of the multi-modal input data in a shared representation.

The multi-modal input data 1402 can include various types of uncompressed data. In one or more embodiments, the uncompressed data can include hyperspectral data, image data, audio data, text data, time-series data, and sensor data. The sensor data can originate from a wide variety of sensors, including IoT sensors. The multi-modal input data 1402 is provided to a multi-modal probabilistic encoder 1404. The multi-modal probabilistic encoder 1404 is configured to process different data types using modality-specific layers and then integrate this information using shared layers. It can be configured to output a deterministic encoding of the multi-modal input data 1402 as well as a probability distribution to generate a unified latent space 1406. The unified latent space 1406 may have homomorphic properties, which can enable homomorphic data compression and/or partial homomorphic data compression across all modalities. The information from the unified latent space 1406 can be input to a multi-modal probabilistic decoder 1408. In one or more embodiments, the multi-modal probabilistic decoder 1408 outputs the parameters of a probability distribution for each data modality. These distributions are then sampled to obtain a reconstructed multi-modal output 1410. The multi-modal variational autoencoder may utilize cross-modal attention mechanisms to capture relationships between different data types during both encoding and decoding processes. In one or more embodiments, the multimodal variational autoencoder may have a layer configuration similar to that shown in FIG. 2, where the innermost layer that provides compressed output (140 of FIG. 2) serves as a bottleneck layer, but with additional modality-specific layers and cross-modal attention mechanisms to handle diverse data types.

FIG. 15 is a flow diagram 1500 illustrating an exemplary method for compressing multi-modal data using a system for compressing and restoring data using multi-modal variational autoencoders, according to an embodiment. In a first step 1510, a plurality of multi-modal data sets is collected from a plurality of data sources. These data sources can include various sensors, devices, databases, or any other systems that generate or store diverse types of data. The data sets are inherently multi-modal, meaning they comprise different data types and formats. For example, the multi-modal data sets can include combinations of images, videos, audio recordings, time-series data, numerical data, textual data, and sensor readings. The collection process involves acquiring these diverse data sets from their respective sources and bringing them into a centralized system for further processing.

In step 1520, the collected multi-modal data sets are preprocessed using a multi-modal data preprocessor. The multi-modal data preprocessor is responsible for steps including one or more of cleaning, transforming, normalizing, aligning, and preparing the diverse data sets for subsequent analysis and compression. Preprocessing tasks may include, but are not limited to, data cleansing, data integration, data transformation, feature extraction, synchronization and alignment of different data modalities. Data cleansing involves removing or correcting any erroneous, missing, or inconsistent data points across all modalities. Data integration combines data from multiple sources and modalities into a unified format. Data transformation converts the various data types into suitable representations for further processing, such as scaling, normalization, or encoding categorical variables. Feature extraction identifies and selects relevant features or attributes from the multi-modal data sets that are most informative for the given task. The preprocessor also ensures that data from different modalities are properly aligned and synchronized for joint processing.

In step 1530, the preprocessed multi-modal data sets are compressed into a compressed output using a multi-modal variational autoencoder. The multi-modal variational autoencoder provides a deep learning model designed to learn compact and meaningful representations of the diverse input data in a unified latent space. As previously described and shown in at least FIG. 13 and FIG. 14, the multi-modal variational autoencoder of disclosed embodiments includes a multi-modal encoder network and a multi-modal decoder network. The multi-modal encoder network takes the normalized multi-modal data sets as input and progressively compresses them through a series of modality-specific and shared layers. These may include, but are not limited to, convolutional layers for image data, recurrent layers for sequential data, and fully connected layers for numerical data. The compressed representation is obtained at the bottleneck layer of the encoder network, which represents a unified latent space with significantly reduced dimensionality compared to the original multi-modal data. The multi-modal variational autoencoder may utilize cross-modal attention mechanisms to capture relationships between different data types. During the compression process, the multi-modal variational autoencoder learns to capture the essential features and patterns present in the diverse data sets while discarding redundant or irrelevant information. It aims to minimize the reconstruction error between the original multi-modal data and the reconstructed data obtained from the compressed representation, accounting for the characteristics of each data modality. In step 1540, the compressed output generated by the multi-modal variational autoencoder is outputted and/or stored for future processing. This compressed output represents the compact and informative representation of the original multi-modal data sets in a unified latent space. The compressed output can support homomorphic operations, enabling manipulation on encrypted multi-modal data. It significantly reduces the storage and transmission requirements compared to the original diverse data sets, making it more efficient for downstream tasks while preserving the relationships between different data modalities.

FIG. 16 is a flow diagram 1600 illustrating an exemplary method for decompressing multi-modal data input using a system for compressing and restoring data using multi-modal variational autoencoders, according to an embodiment. In a first step, 1610, a plurality of compressed multi-modal data sets is accessed from a unified latent space. Step 1620 includes decompressing the plurality of compressed multi-modal data sets using a multi-modal variational autoencoder, such as previously described and shown in at least FIG. 13 and/or FIG. 14. The multi-modal decoder network is responsible for mapping the unified latent space vectors back to the original multi-modal data space. The decoder network may include modality-specific techniques such as transposed convolutions for image data, recurrent layers for sequential data, and fully connected layers for numerical data, as well as shared layers and cross-modal attention mechanisms. In one or more embodiments, homomorphic operations may be performed on the compressed multi-modal data sets in the unified latent space prior to decompressing.

In a step 1630, the compressed multi-modal data sets are reconstructed using the multi-modal decoder (e.g., 1332 of FIG. 13) of the variational autoencoder. In a step 1640, the restored, decompressed multi-modal data set is outputted. The restored multi-modal data set represents the reconstructed version of the original diverse data types, which includes recovered information lost during the compression process across all modalities. The outputted multi-modal data may have had homomorphic operations performed on the unified latent space compressed version. This feature enables meaningful operations on multi-modal data while in its compressed (and/or encrypted) form which still apply when the data is decompressed, preserving relationships and transformations across different data types.

Figure 17:
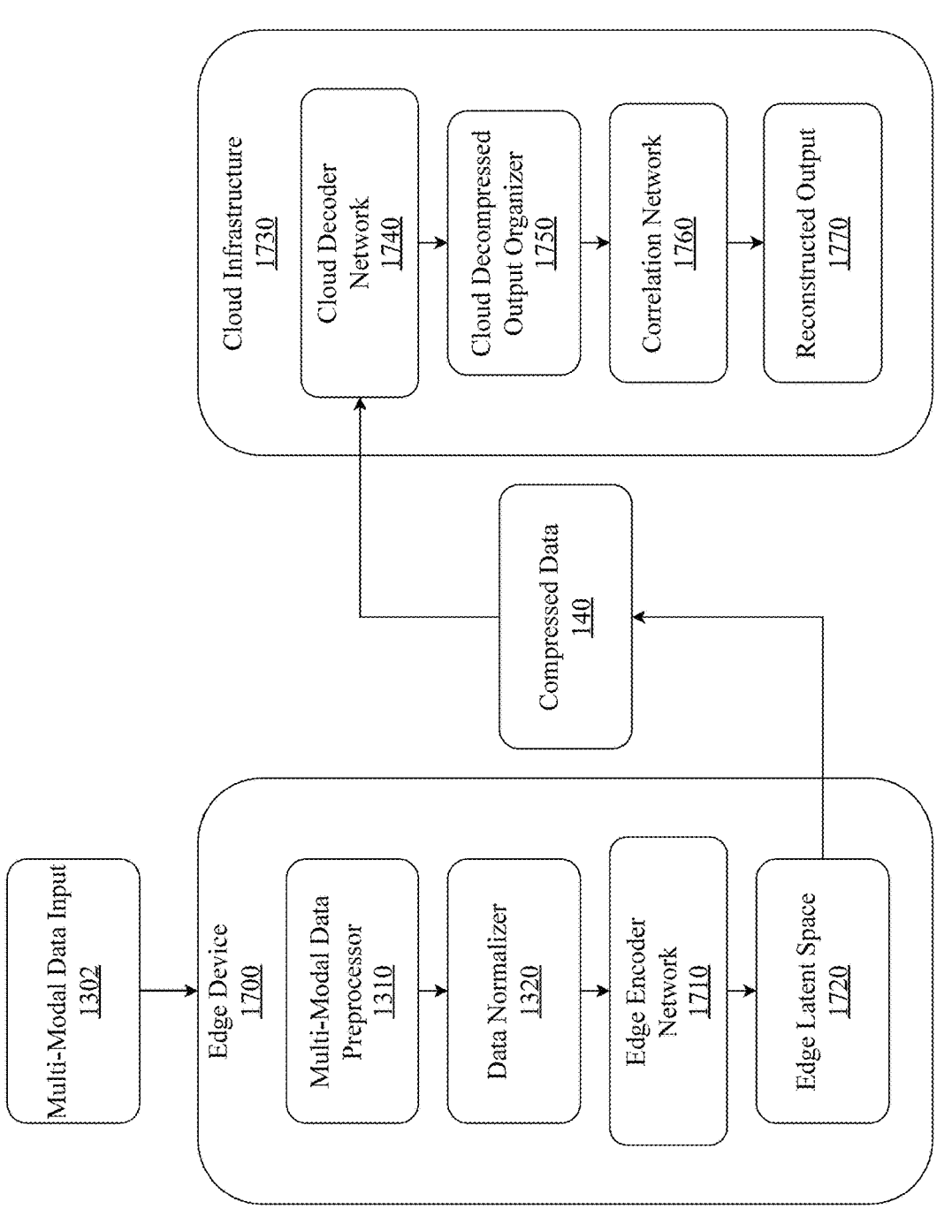
FIG. 17 is a block diagram illustrating an exemplary system architecture for compressing and restoring data using multi-level autoencoders and correlation networks on a plurality of edge devices.

FIG. 17 is a block diagram illustrating an exemplary system architecture for compressing and restoring data using multi-level autoencoders and correlation networks on a plurality of edge devices. The system comprises two main segments: an edge device component that handles initial data processing and compression, and a cloud infrastructure component that manages decompression and reconstruction.

The process begins with multi-modal data input 1302 which represents raw data streams from various sources such as sensors, cameras, or databases. The system supports deployment across multiple edge devices, each handling different aspects of data collection and processing. For example, in a smart manufacturing facility, edge devices might include industrial cameras performing quality control, vibration sensors monitoring equipment health, thermal sensors tracking operating temperatures, and audio sensors detecting machine anomalies. Each edge device operates independently while maintaining synchronization with the broader system.

Within each edge device 1700, a multi-modal data pre-processor 1310 applies various preprocessing techniques optimized for that device's specific deployment. Consider an autonomous vehicle system where multiple edge devices work in concert. The forward-facing cameras preprocess visual data for obstacle detection, while LIDAR sensors handle point cloud data for distance measurements. Simultaneously, microphone arrays preprocess audio for emergency vehicle detection while internal sensors manage vehicle telemetry data. These diverse data streams are processed in parallel across the distributed edge devices, each optimized for its specific data type while maintaining synchronization with the broader system.

The preprocessor ensures that multi-modal data is formatted appropriately while minimizing computational overhead on each edge device. In a smart building deployment, different edge devices might handle various aspects of the building's operation. Some edge devices focus on environmental monitoring, processing temperature, humidity, and air quality sensor data. Others manage security systems, handling camera feeds and access control data. Additional devices might process energy management data, including power consumption and occupancy information, while network monitoring devices handle connectivity data. Each edge device applies specific preprocessing optimizations based on its designated role and the types of data it handles.

This distributed approach allows for scalable deployment where additional edge devices can be seamlessly integrated into the system as needed. For instance, in a smart city deployment, edge devices might be added incrementally as new sensors and monitoring systems are installed. A traffic monitoring system might start with basic camera-equipped edge devices, then expand to include devices processing data from traffic flow sensors, environmental monitors, and emergency response systems. Each new edge device integrates into the existing network, contributing to the overall multi-modal data processing pipeline while maintaining efficient resource utilization and data synchronization across the entire system.

A data normalizer 1320 scales and normalizes the preprocessed data to ensure consistent ranges across all modalities. This normalization step enables stable processing in the subsequent compression stages and helps maintain data quality while operating within edge device constraints. For edge devices processing multiple data types, normalization provides a foundation for effective compression by bringing diverse data formats into aligned numerical ranges. In a manufacturing setting, for example, the normalizer processes temperature readings that might range from 0 to 1000 degrees, vibration measurements spanning microscopic distances, and audio signals with varying amplitudes, mapping each into standardized ranges that the compression system can efficiently handle.

Data normalizer 1320 is capable of adapting its scaling parameters based on the specific requirements of each edge device and its data types. In autonomous vehicle systems, the normalizer handles visual data from cameras, ranging from bright daylight to near-darkness conditions, alongside LIDAR measurements that might span several hundred meters, and acceleration data that varies by fractions of a g-force. Each data stream is scaled appropriately while preserving the relative relationships between measurements, ensuring that no information is lost during the normalization process.

In one embodiment, the normalization process may also consider the computational limitations of edge devices. Rather than performing complex statistical transformations that might overtax limited processing resources, the normalizer employs efficient scaling methods optimized for edge deployment. This approach allows edge devices to maintain high throughput while ensuring data quality. For instance, in IoT sensor networks, where devices might operate on battery power or limited computing resources, the normalizer balances the need for consistent data scaling with power and processing constraints.

This standardization of data ranges across modalities serves as a prerequisite for the subsequent compression stages, enabling the edge encoder to operate efficiently on normalized data regardless of its original scale or format. The process maintains the statistical relationships within each data type while creating a unified representation that can be effectively compressed and later reconstructed by the cloud infrastructure.

An edge encoder network 1710 compresses the normalized data using an optimized implementation of the encoder portion of the variational autoencoder, specifically designed for efficient operation on edge devices. The entire architecture is specifically optimized for deployment on resource-constrained edge devices through several key design considerations.

The encoder network employs a lightweight implementation that minimizes computational overhead while maintaining compression efficiency, utilizing optimized layer configurations and reduced parameter counts compared to traditional variational autoencoders. The system dynamically adjusts its processing based on each edge device's available resources, scaling the complexity of operations to match local computational capabilities, memory constraints, and power limitations. For instance, the preprocessing and normalization stages employ efficient algorithms that minimize memory usage, while the edge latent space is designed to achieve high compression ratios with minimal computational cost. The architecture supports local caching and batched processing to manage resource utilization effectively, allowing edge devices to compress and process data even with limited memory or intermittent connectivity. This resource-aware design extends to the homomorphic operations, which may be implemented using optimized algorithms suitable for edge computing constraints while still maintaining their privacy-preserving properties. In one embodiment the system may employ adaptive sampling and processing rates based on device capabilities and current load, ensuring stable operation across a wide range of edge devices from simple IoT sensors to more powerful edge computing nodes.

Compressed representations created by edge encoder network 1710 is maintained in an edge latent space 1720, which provides a unified representation of all data modalities while enabling homomorphic operations. This unified latent space serves as a mathematical bridge between different data types, allowing for operations to be performed on the compressed data without decompression. For instance, in a smart building system, the latent space might encode relationships between occupancy patterns, energy usage, and environmental conditions in a way that allows for direct analysis and optimization in the compressed domain. The homomorphic properties of this latent space enable privacy-preserving computations, allowing edge devices to perform meaningful operations on sensitive data while maintaining encryption.

Compressed data 140 from the edge latent space is then transmitted to the cloud infrastructure 1730, implementing an efficient data transfer protocol that minimizes bandwidth usage while ensuring data integrity. This transmission process can adapt to varying network conditions, potentially batching compressed representations during periods of limited connectivity or prioritizing certain data types based on application requirements. For example, in a medical monitoring system, critical patient data might be prioritized for immediate transmission while less time-sensitive data is batched for later transfer.

Once received by the cloud infrastructure, the cloud decoder network 1740 begins the reconstruction process, employing decompression techniques that leverage the full computational resources available in the cloud environment. This network maps the compressed representations back to their original data spaces through a series of expanding layers that progressively rebuild the multi-modal data. The decoder 1740 maintains the complex relationships between different modalities established during compression, ensuring that reconstructed data maintains its inter-modal correlations. For instance, in an autonomous vehicle system, the decoder might reconstruct visual scene data alongside LIDAR measurements and vehicle telemetry in a way that preserves the spatial and temporal relationships critical for accurate environment understanding and decision-making.

A cloud decompressed output organizer 1750 arranges the decompressed outputs based on their cross-modal correlations and similarities. This organization facilitates the correlation network's 1760 ability to identify and leverage relationships between different data modalities, allowing it to recover information that may have been lost during compression. Correlation network 1760 analyzes the organized outputs to identify patterns and dependencies both within and across modalities. By leveraging these relationships, it enhances the quality of the reconstructed data. The system ultimately produces a reconstructed output 1770 that closely resembles the original multi-modal input while maintaining the essential relationships between different data types.

This distributed architecture enables efficient processing of multi-modal data by optimizing resource usage between edge devices and cloud infrastructure. For example, in a smart manufacturing environment, edge devices could compress sensor data, machine vision inputs, and audio measurements from equipment, while the cloud infrastructure handles the complex task of reconstructing and analyzing this multi-modal data to detect patterns or anomalies.

Figure 18:
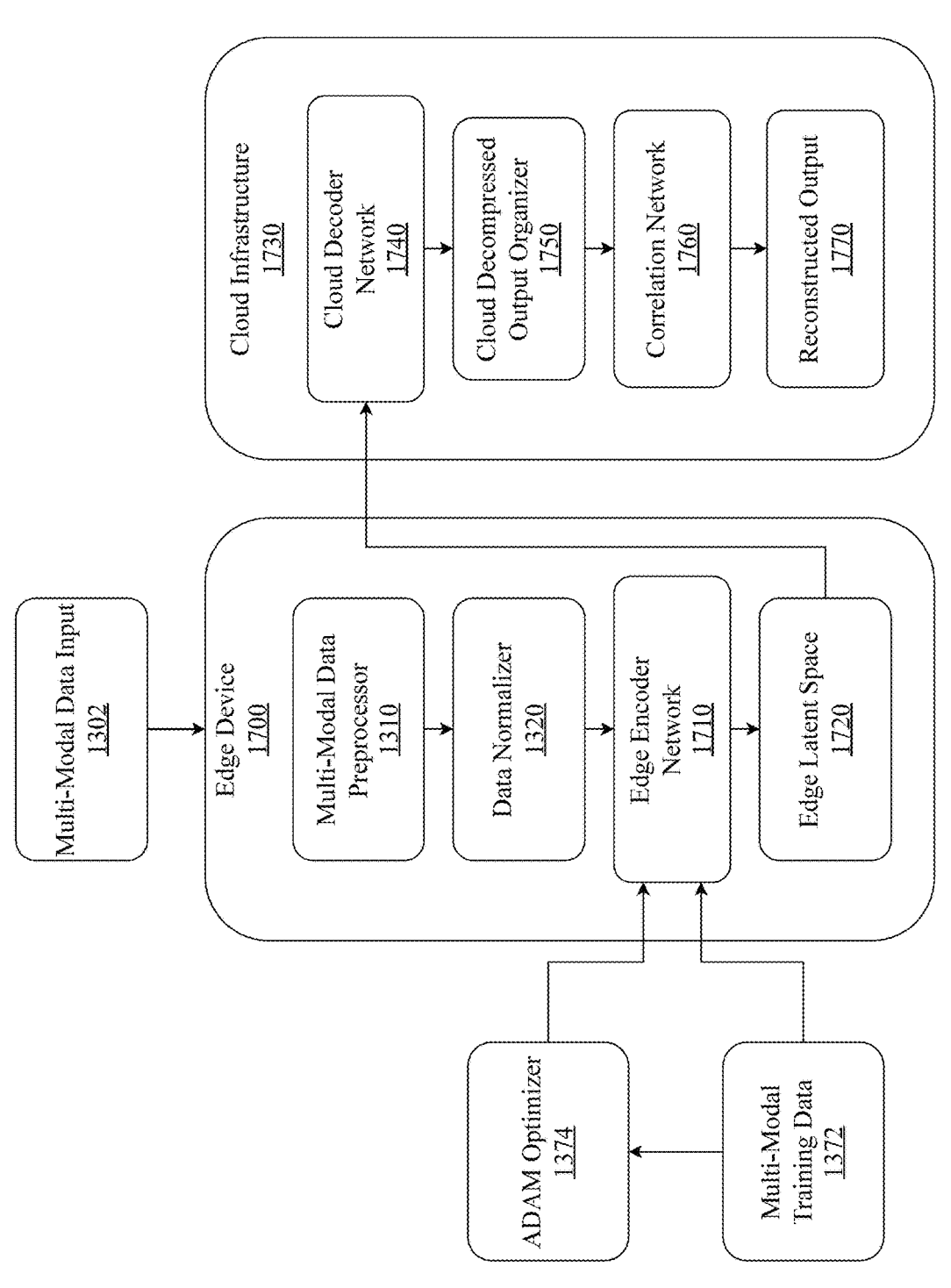
FIG. 18 is a block diagram illustrating an exemplary system architecture for compressing and restoring data using variational autoencoders, according to an embodiment.

FIG. 18 is a block diagram illustrating an exemplary system architecture for compressing and restoring data using variational autoencoders, according to an embodiment. In one embodiment, the system may incorporate training components that optimize the system's performance across both edge devices and cloud infrastructure. Multi-modal training data 1372 serves as the foundation for developing compression capabilities, comprising diverse examples that span multiple data modalities. This training data encompasses combinations such as sensor readings, visual inputs, audio signals, and textual data, enabling the system to learn both modality-specific features and cross-modal relationships.

An ADAM optimizer 1374 represents an optimization approach well-suited for training deep learning models in resource-constrained edge environments. By utilizing estimates of first and second moments of the gradients, it adaptively adjusts learning rates for different parameters, ensuring stable and efficient training despite the limitations of edge hardware. The optimizer interacts directly with the edge encoder network 1710 to refine its compression capabilities while preserving the network's ability to generate meaningful representations in the edge latent space 1720.

During the training process, the system learns to minimize reconstruction loss between the original multi-modal input data and the decompressed output while accounting for reconstruction quality across all data modalities. ADAM optimizer 1374 helps achieve this by dynamically adjusting the learning process based on the computed gradients, allowing the system to learn efficient compression strategies that work within the computational constraints of edge devices.

The training approach incorporates both supervised and semi-supervised learning processes, allowing the system to leverage both labeled and unlabeled data effectively. ADAM optimizer 1374 uses factors such as reconstruction error and KL divergence between learned latent distributions and predefined prior distributions to adjust the weights of the edge encoder network. This optimization process helps ensure that the compressed representations maintain meaningful relationships between different data modalities while achieving significant data reduction.

In practical applications, this training architecture enables continuous improvement and adaptation to specific deployment scenarios. For instance, in a smart city environment, the training data might include traffic camera feeds, environmental sensor readings, and urban noise measurements. ADAM optimizer 1374 ensures the edge encoder network learns to effectively compress this diverse data while maintaining the relationships necessary for meaningful analysis in the cloud infrastructure. The system can be periodically retrained with new data to adapt to changing patterns and requirements, with the optimizer ensuring efficient updates to the model parameters.

The combination of carefully curated multi-modal training data and adaptive optimization enables the system to achieve high compression ratios while preserving essential information across all data modalities. This approach is particularly valuable in scenarios where edge devices must process diverse data types under resource constraints while maintaining the ability to reconstruct meaningful insights in the cloud infrastructure.

Detailed Description of Exemplary Aspects

FIG. 6 is a flow diagram illustrating an exemplary method for compressing a data input using a system for compressing and restoring data using multi-level autoencoders and correlation networks. In a first step 600, a plurality of data sets is collected from a plurality of data sources. These data sources can include various sensors, devices, databases, or any other systems that generate or store data. The data sets may be heterogeneous in nature, meaning they can have different formats, structures, or modalities. For example, the data sets can include images, videos, audio recordings, time-series data, numerical data, or textual data. The collection process involves acquiring the data sets from their respective sources and bringing them into a centralized system for further processing.

In a step 610, the collected data sets are preprocessed using a data preprocessor. The data preprocessor may be responsible for cleaning, transforming, and preparing the data sets for subsequent analysis and compression. Preprocessing tasks may include but are not limited to data cleansing, data integration, data transformation, and feature extraction. Data cleansing involves removing or correcting any erroneous, missing, or inconsistent data points. Data integration combines data from multiple sources into a unified format. Data transformation converts the data into a suitable representation for further processing, such as scaling, normalization, or encoding categorical variables. Feature extraction identifies and selects relevant features or attributes from the data sets that are most informative for the given task.

A step 620 involves normalizing the preprocessed data sets using a data normalizer. Normalization is a step that brings the data into a common scale and range. It helps to remove any biases or inconsistencies that may exist due to different units or scales of measurement. The data normalizer applies various normalization techniques, such as min-max scaling, z-score normalization, or unit vector normalization, depending on the nature of the data and the requirements of the subsequent compression step. Normalization ensures that all the data sets have a consistent representation and can be compared and processed effectively.

In a step 630, the normalized data sets are compressed into a compressed output using a multi-layer autoencoder network. The multi-layer autoencoder network is a deep learning model designed to learn compact and meaningful representations of the input data. It consists of an encoder network and a decoder network. The encoder network takes the normalized data sets as input and progressively compresses them through a series of layers, such as but not limited to convolutional layers, pooling layers, and fully connected layers. The compressed representation is obtained at the bottleneck layer of the encoder network, which has a significantly reduced dimensionality compared to the original data. The multi-layer autoencoder network may utilize a plurality of encoder networks to achieve optimal compression performance. These encoder networks can include different architectures, loss functions, or optimization techniques. The choice of compression technique depends on the specific characteristics and requirements of the data sets being compressed. During the compression process, the multi-layer autoencoder network learns to capture the essential features and patterns present in the data sets while discarding redundant or irrelevant information. It aims to minimize the reconstruction error between the original data and the reconstructed data obtained from the compressed representation. In step 640, the compressed output generated by the multi-layer autoencoder network is either outputted or stored for future processing. The compressed output represents the compact and informative representation of the original data sets. It can be transmitted, stored, or further analyzed depending on the specific application or use case. The compressed output significantly reduces the storage and transmission requirements compared to the original data sets, making it more efficient for downstream tasks.

FIG. 7 is a flow diagram illustrating an exemplary method for decompressing a compressed data input using a system for compressing and restoring data using multi-level autoencoders and correlation networks. In a first step, 700, access a plurality of compressed data sets. In a step 710, decompress the plurality of compressed data sets using a multi-layer autoencoder's decoder network. The decoder network is responsible for mapping the latent space vectors back to the original data space. The decoder network may include techniques such as transposed convolutions, upsampling layers, or generative models, depending on the specific requirements of the data and the compression method used.

Step 720 includes leveraging the similarities between decompressed outputs using a correlation network, which may exploit shared information and patterns to achieve a better reconstruction. The correlation network is a deep learning model specifically designed to exploit the shared information and patterns among the compressed data sets. It takes the organized decompressed data sets as input and learns to capture the correlations and dependencies between them. The correlation network may consist of multiple layers, such as convolutional layers, recurrent layers, or attention mechanisms, which enable it to effectively model the relationships and similarities among the compressed data sets.

In a step 730, the compressed data sets are reconstructed using the correlation network. The reconstruction process in step 730 combines the capabilities of the correlation network and the decompression systems. The correlation network provides the enhanced and refined latent space representations, while the decompression systems use these representations to generate the reconstructed data. In a step 740, the restored, decompressed data set is outputted. The restored data set represents the reconstructed version of the original data, which includes recovered information lost during the compression process. The outputted data set more closely resembles the original data than would a decompressed output passed solely through a decoder network.

Figure 8:
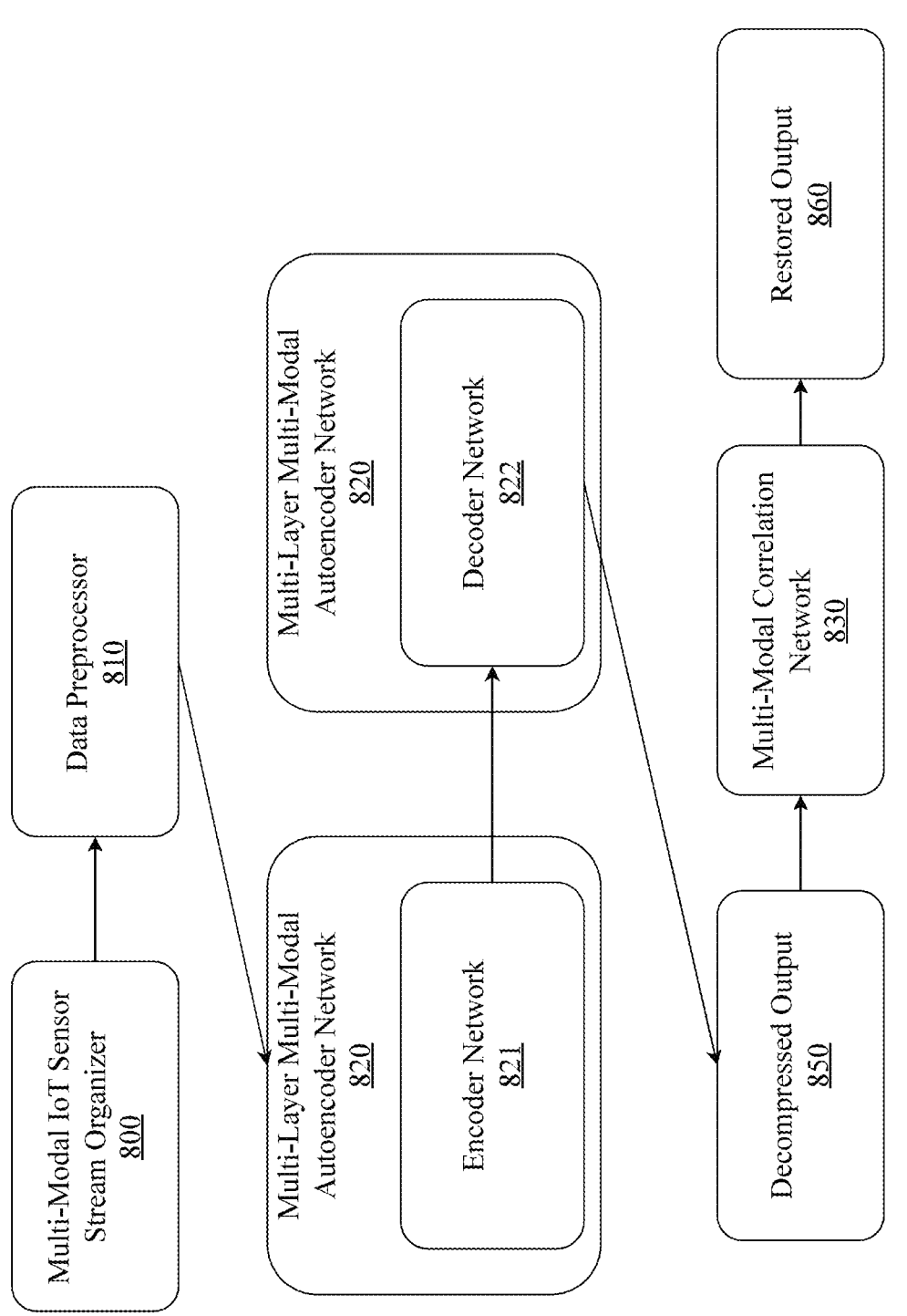
FIG. 8 is a block diagram illustrating an exemplary system architecture for compressing and restoring IoT sensor data using a system for compressing and restoring data using multi-level autoencoders and correlation networks.

FIG. 8 is a block diagram illustrating an exemplary system architecture for compressing and restoring multi-modal IoT data using a system for compressing and restoring data using multi-level autoencoders and correlation networks. The multi-modal IoT data organizer 800 is responsible for collecting and organizing data streams from various IoT sensors and devices. It receives raw multi-modal data from multiple sources, such as but not limited to time-series data from temperature and humidity sensors, image data from cameras, audio data from microphones, and motion data from accelerometers. The multi-modal IoT data organizer 800 may perform necessary preprocessing tasks, such as data cleaning, normalization, synchronization, and alignment of different data types, to ensure the multi-modal data is in a suitable format for further processing. The preprocessed multi-modal IoT data is then passed to a data preprocessor 810. The data preprocessor 810 prepares the multi-modal data for compression by transforming it into a unified latent space representation. It applies techniques such as modality-specific feature extraction, dimensionality reduction, and data normalization to extract meaningful features and reduce the dimensionality of the data across all modalities. The unified latent space representation captures the essential characteristics of the multi-modal IoT data while reducing its size.

The multi-layer multi-modal variational autoencoder 820 is responsible for compressing and decompressing the unified latent space representation of the multi-modal IoT data. It consists of an encoder network 821 and a decoder network 822. The encoder network 821 takes the unified latent space representation as input and progressively compresses it through a series of modality-specific and shared layers, such as but not limited to convolutional layers for image data, recurrent layers for time-series data, and fully connected layers for numerical data. The compressed representation passes through a bottleneck layer which transforms the original multi-modal data to have a significantly reduced dimensionality in a shared latent space. Further, the encoder network 821 manages the compression process and stores the compressed representation of the multi-modal IoT data. It determines the optimal compression settings based on factors such as the desired compression ratio, data characteristics across modalities, and available storage resources. The compressed representation is efficiently stored or transmitted, reducing the storage and bandwidth requirements for multi-modal IT data.

The decoder network 822 is responsible for reconstructing the original multi-modal IoT data from the compressed representation. It utilizes the multi-layer multi-modal variational autoencoder 820 to map the compressed representation back to the original multi-modal data space. The decoder network consists of layers such as transposed convolutional layers, upsampling layers, and fully connected layers, tailored to each data modality. It learns to reconstruct the original multi-modal data by minimizing the reconstruction error between the decompressed output and the original IoT sensor data across all modalities. The decompressed output 850 represents the decompressed multi-modal IoT data obtained from the decoder network 822. It closely resembles the original data and retains the essential information captured by the various IoT sensors and devices, but includes some information lost during the compression process. The decompressed output 850 may be further processed, analyzed, or utilized by downstream applications or systems.

To further enhance the compression and reconstruction quality, the system includes a multi-modal correlation network 830. The multi-modal correlation network 830 learns and exploits correlations and patterns within and across the different modalities of IoT data to improve the reconstruction process. It consists of multiple correlation layers that capture dependencies and relationships among different sensors, data streams, and modalities. The multi-modal correlation network 830 helps in preserving important information that may have been lost during the compression process, particularly focusing on cross-modal relationships. Following the identification of dependencies and relationships among different data streams and modalities, the multi-modal correlation network 830 reconstructs a decompressed output 850 into a restored output 860 which recovers much of the data lost during the compression and decompression process across all modalities.

The system may be trained using an end-to-end approach, where the multi-layer multi-modal variational autoencoder 820 and the multi-modal correlation network 830 are jointly optimized to minimize the reconstruction error and maximize the compression ratio across all data modalities. The training process involves feeding the multi-modal IoT data through the system, comparing the decompressed output with the original data for each modality, and updating the network parameters using backpropagation and gradient descent techniques. The proposed system offers several advantages for multi-modal IoT data compression. It achieves high compression ratios while preserving the essential information in the data across different modalities. The multi-layer multi-modal variational autoencoder 820 learns compact and meaningful representations of the data, exploiting spatial, temporal, and cross-modal correlations. The multi-modal correlation network 830 further enhances the compression quality by capturing dependencies and patterns within and across the data modalities. Moreover, the system is adaptable and can handle various types of multi-modal IoT data, making it suitable for a wide range of IoT applications. It can be deployed on resource-constrained IoT devices or edge servers, reducing storage and transmission costs while maintaining data quality across all modalities.

Figure 9:
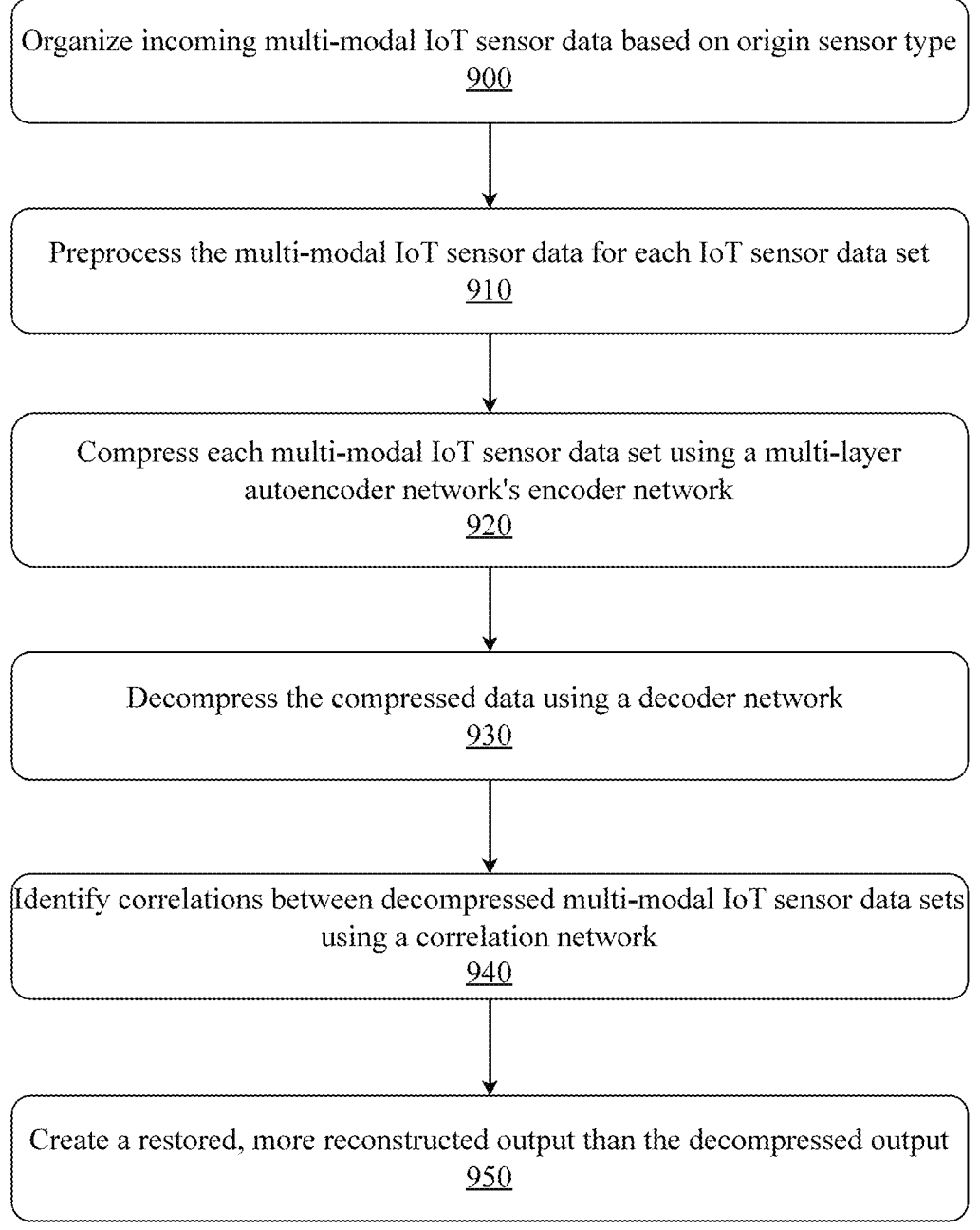
FIG. 9 is a flow diagram illustrating an exemplary method for compressing and
decompressing IoT sensor data using a system for compressing and restoring data using multi-level autoencoders and correlation networks.

FIG. 9 is a flow diagram illustrating an exemplary method for compressing and decompressing multi-modal IoT data using a system for compressing and restoring data using multi-level autoencoders and correlation networks. In a first step 900, incoming multi-modal IoT data is organized based on its data type and origin. Multi-modal IoT data can be generated from various sources, such as but not limited to temperature sensors, humidity sensors, pressure sensors, accelerometers, cameras, microphones, or any other devices deployed in an IoT network. Each data type captures specific measurements or information relevant to its function. The organization step involves categorizing and grouping the incoming multi-modal IoT data based on its modality (e.g., time-series, image, audio) and the type of device it originated from. This step helps to maintain a structured and organized representation of the diverse data types, facilitating subsequent processing and analysis.

In a step 910, the latent space vectors for each multi-modal IoT data set are preprocessed. Latent space vectors are lower-dimensional representations of the original data that capture the essential features and patterns across different modalities. Preprocessing the latent space vectors involves applying various techniques to ensure data quality, consistency, and compatibility across all data types. This may include but is not limited to data cleaning, normalization, feature scaling, or dimensionality reduction, with specific techniques applied as appropriate for each data modality. The preprocessing step aims to remove any noise, outliers, or inconsistencies in the latent space vectors and prepare them for the compression process while ensuring alignment and synchronization between different data types.

Step 920 involves compressing each multi-modal IoT data set using a multi-layer multi-modal variational autoencoder network. This deep learning model is designed to learn compact and meaningful representations of the multi-modal input data. It comprises an encoder network and a decoder network. The encoder network takes the preprocessed latent space vectors as input and progressively compresses them through a series of modality-specific and shared layers, such as convolutional layers for image data, recurrent layers for time-series data, and fully connected layers for numerical data. The compressed representation is obtained at the bottleneck layer of the encoder network, which has a significantly reduced dimensionality compared to the original data and represents a unified latent space for all modalities. The multi-layer multi-modal variational autoencoder network includes a compression system that specifically handles the compression of diverse IoT data types. The compression system can employ various techniques, such as quantization, entropy coding, or sparse representations, to achieve efficient compression while preserving the essential information across all data modalities. The compression system outputs a compressed multi-modal IoT data set, which is a compact representation of the original diverse data.

In step 930, the original multi-modal IoT data is decompressed using a decoder network. The decoder network is responsible for reconstructing the original data from the compressed representation in the unified latent space. It takes the compressed multi-modal IoT data sets and applies a series of decompression operations, such as transposed convolutions or upsampling layers, tailored to each data modality, to map the compressed data back to its original dimensionality and format for each data type.

In step 940, correlations between compressed multi-modal IT data sets are identified using a multi-modal correlation network. This separate deep learning model learns to capture the relationships and dependencies among different compressed multi-modal IoT data sets, both within and across modalities. It takes the decompressed data sets as input and identifies patterns, similarities, and correlations among them, paying particular attention to cross-modal relationships. The multi-modal correlation network can utilize techniques such as convolutional layers, attention mechanisms, or graph neural networks to effectively model the interactions and dependencies between the compressed data sets of various types. The identified correlations provide valuable insights into how different multi-modal IoT data sets are related and how they influence each other across modalities. These correlations can be used to improve the compression efficiency and enhance the restoration quality of the data.

In step 950, the multi-modal correlation network creates a restored, more reconstructed version of the decompressed output. By leveraging correlations between decompressed outputs both within and across modalities, the multi-modal correlation network is able to recover a large portion of information lost during the compression and decompression process. The restored, reconstructed output is similar to the decompressed output and the original multi-modal input, but recovers information that may have been missing in the decompressed output, providing a more accurate representation of the original diverse IoT data.

Figure 10:
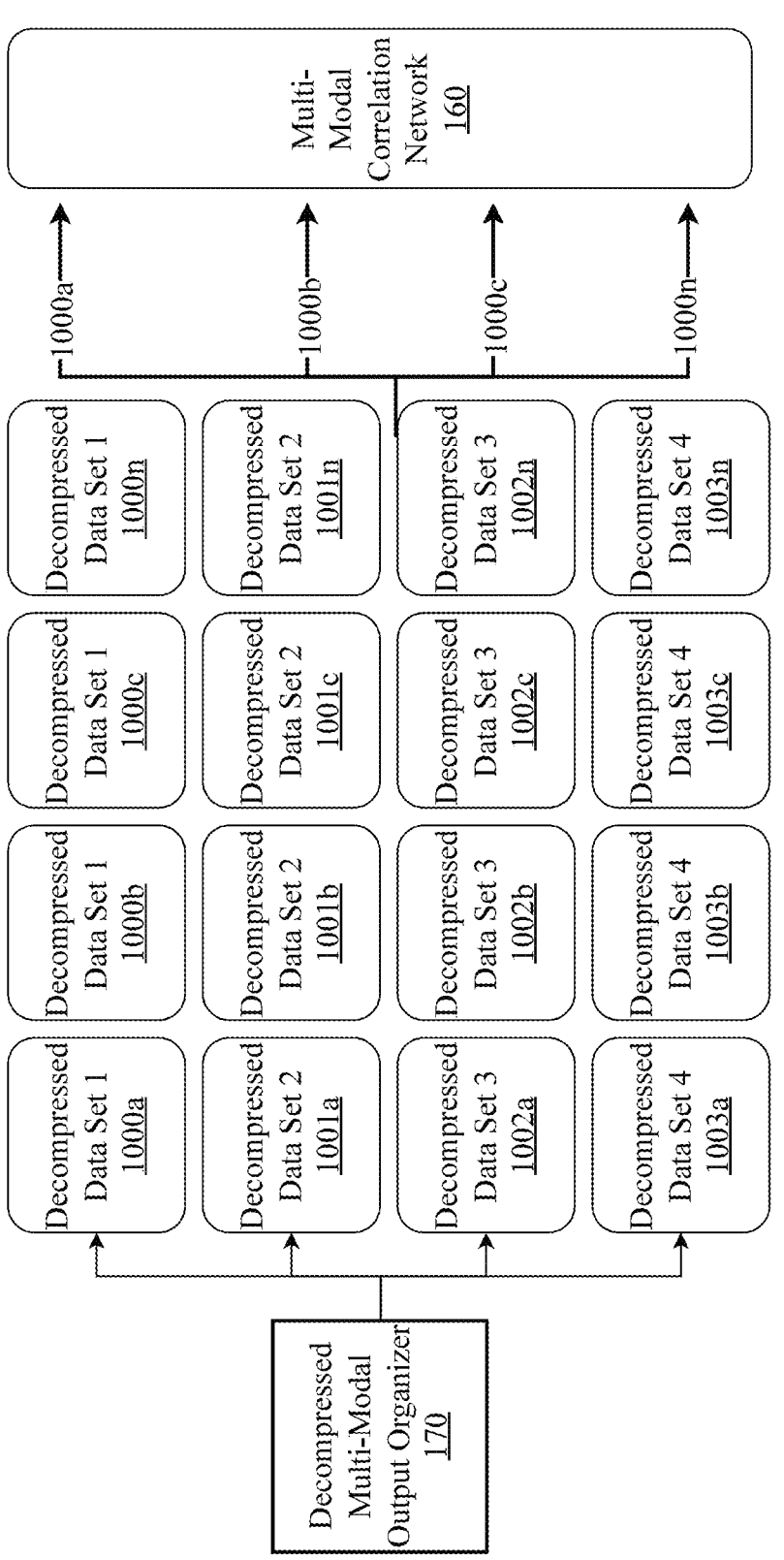
FIG. 10 is a block diagram illustrating an exemplary system architecture for a subsystem of the system for compressing and restoring data using multi-level autoencoders and correlation networks, the decompressed output organizer.

FIG. 10 is a block diagram illustrating an exemplary system architecture for a subsystem of the system for compressing and restoring multi-modal data using multi-level autoencoders and correlation networks, the decompressed multi-modal output organizer. In one embodiment, the decompressed multi-modal output organizer 190 may create a matrix of n by n data sets where each data set represents a decompressed set of information from various modalities. In the embodiment depicted, the decompressed multi-modal output organizer 190 outputs a 4 by 4 matrix of decompressed multi-modal data sets. The organizer 190 may organize the decompressed multi-modal data sets into groups based on how correlated each data set is to each other, both within and across modalities. For example, decompressed multi-modal data set 1, which includes 1000$a$, 1000$b$, 1000$c$, and 1000$n$, is a set of four data sets that the decompressed multi-modal output organizer 190 has determined to be highly correlated, potentially representing different aspects or modalities of the same phenomenon (e.g., temperature data, humidity data, image data, and audio data related to a single event). The same principle applies for decompressed multi-modal data sets 2, 3, and 4.

The decompressed multi-modal output organizer primes the multi-modal correlation network 160 to receive an already organized plurality of multi-modal inputs. The multi-modal correlation network may take a plurality of decompressed multi-modal data sets as its input, depending on the size of the organized matrix produced by the decompressed multi-modal output organizer 190. For example, in the embodiment depicted in FIG. 10, the decompressed multi-modal output organizer 190 produces a 4 by 4 matrix of multi-modal data sets. The multi-modal correlation network in turn receives a 4-element multi-modal data set as its input. If decompressed multi-modal data set 1 were to be processed by the multi-modal correlation network 160, the network 160 may take 1000$a$, 1000$b$, 1000$c$, and 1000$n$ as the inputs and process all four multi-modal data sets together, leveraging both intra-modal and cross-modal relationships. By clustering multi-modal data sets together into groups based on how correlated they are across different modalities, the decompressed multi-modal output organizer 190 allows the multi-modal correlation network 160 to produce outputs that better encompass the original pre-compressed and decompressed multi-modal data sets. More information may be recovered by the multi-modal correlation network 160 when the inputs are already highly correlated across various data types, enabling the network to exploit synergies between different modalities and reconstruct a more accurate representation of the original multi-modal data.

Figure 11:
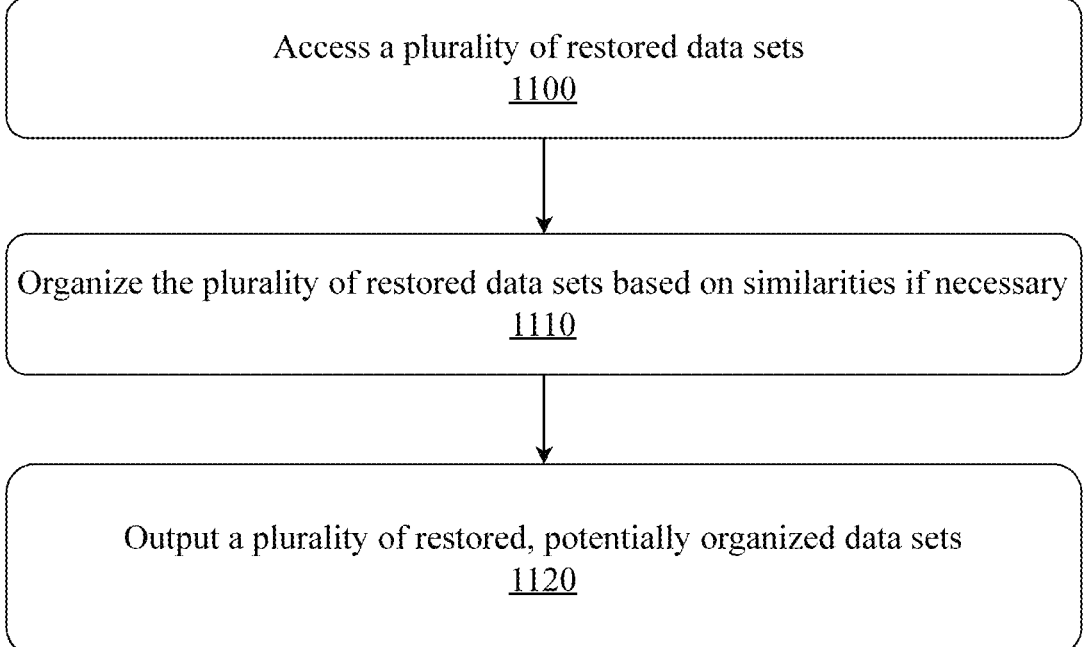
FIG. 11 is a flow diagram illustrating an exemplary method for organizing restored, decompressed data sets after correlation network processing.

FIG. 11 is a flow diagram illustrating an exemplary method for organizing restored, decompressed data sets after correlation network processing. In a first step 1100, access a plurality of restored data sets. In a step 1110, organize the plurality of restored data sets based on similarities if necessary. In a step 1120, output a plurality of restored, potentially organizer data sets. This method essentially reassesses the organizational grouping performed by the decompressed output organizer 190. The correlation network 160 may output a matrix where the matrix contains a plurality of restored, decompressed data sets. The final output of the system may reorganize the restored, decompressed data sets within the outputted matrix based on user preference and the correlations between each data set within the matrix.

FIG. 19 is a flow diagram illustrating an exemplary method for compressing a multi-modal data input on an edge device using a system for compressing and restoring data using variational autoencoders, according to an embodiment. In a first step 1900, multi-modal data streams are received from edge device sensors. These data streams can comprise various types of data including but not limited to images, audio, text, time-series data, and sensor measurements. The raw data arrives in different formats and modalities, requiring careful handling to maintain data integrity across all types. For example, in an industrial setting, this might include temperature readings, vibration measurements, acoustic sensors, and machine vision inputs.

In a step 1910, lightweight preprocessing parameters are initialized based on the edge device's capabilities. This step involves assessing available computational resources, memory constraints, and processing power of the edge device to optimize the preprocessing pipeline. The system configures parameters such as batch sizes, sampling rates, and buffer sizes to ensure efficient processing while working within hardware limitations.

In a step 1920, initial preprocessing is performed on the received data streams. This includes essential data cleaning, noise reduction, and format standardization optimized for edge deployment. The preprocessing step ensures that data from different modalities is properly aligned and synchronized, while maintaining computational efficiency. For example, image data might undergo basic resizing and normalization, while time-series data might be resampled to a consistent frequency.

In a step 1930, compressed representations are generated using the edge encoder. The edge encoder network, which represents the encoding portion of the multi-modal variational autoencoder, progressively reduces the dimensionality of the preprocessed data while preserving essential features across modalities. This compression occurs in a unified latent space that maintains relationships between different data types.

In a step 1940, compressed representations are cached in local storage on the edge device. This caching mechanism allows the system to temporarily store compressed data, enabling batch processing and helping manage network bandwidth usage. The local cache also provides resilience against network interruptions and allows for efficient data handling.

In a step 1950, homomorphic operations are executed on the cached compressed data. These operations enable computations to be performed directly on the compressed representations without requiring decompression. This capability is useful for maintaining data privacy and reducing computational overhead, as it allows for meaningful data processing while keeping information in its compressed form.

In a step 1960, the processed compressed data is synchronized with the cloud service. This synchronization step involves transmitting the compressed and processed data to cloud infrastructure for further processing, decompression, and analysis. The system manages this transfer efficiently, potentially using batch transmission to optimize network usage and ensure reliable data delivery.

FIG. 20 is a flow diagram illustrating an exemplary method for decompressing compressed multi-modal data input on using a system for compressing and restoring data using variational autoencoders stores in a cloud environment, according to an embodiment. In a first step 2000, synchronized compressed data is received from edge devices in the cloud infrastructure. This represents the compressed representations that have been processed and transmitted by various edge devices, potentially including multiple data modalities from different sources. The synchronization ensures that related data from different edge devices is properly aligned in time and context.

In a step 2010, the integrity of received compressed representations is validated. This validation process ensures that the compressed data maintains its mathematical properties and hasn't been corrupted during transmission. The system verifies that the compressed representations remain in the correct format for the unified latent space and checks for any anomalies or inconsistencies in the data structure.

In a step 2020, the compressed data is processed in the unified latent space. The unified latent space provides a continuous and differentiable representation where all data modalities can be processed together while maintaining their relationships. This step may involve aligning different compressed representations and preparing them for global operations.

In a step 2030, global homomorphic operations are executed across the aggregated data. These operations allow for computations to be performed on the compressed data from multiple edge devices simultaneously, without requiring decompression. This capability is particularly valuable for analyzing patterns across multiple data sources while maintaining data privacy and computational efficiency.

In a step 2040, the processed data is decompressed using the cloud decoder. The cloud decoder network maps the processed compressed representations back to their original data spaces while preserving the relationships between different modalities. This step begins the reconstruction process of the original multi-modal data.

In a step 2050, decompressed outputs are organized using a correlation network. The correlation network analyzes relationships both within and across modalities to enhance the reconstruction quality. It leverages these identified patterns to recover information that may have been lost during compression and helps establish connections between different data types.

In a step 2060, the final reconstructed multi-modal output is generated. This output represents the fully processed and reconstructed version of the original data, enhanced through the correlation network's pattern recognition and relationship modeling. The final output maintains the essential features and relationships present in the original multi-modal data while benefiting from the global processing performed in the cloud infrastructure.

Exemplary Computing Environment

Figure 12:
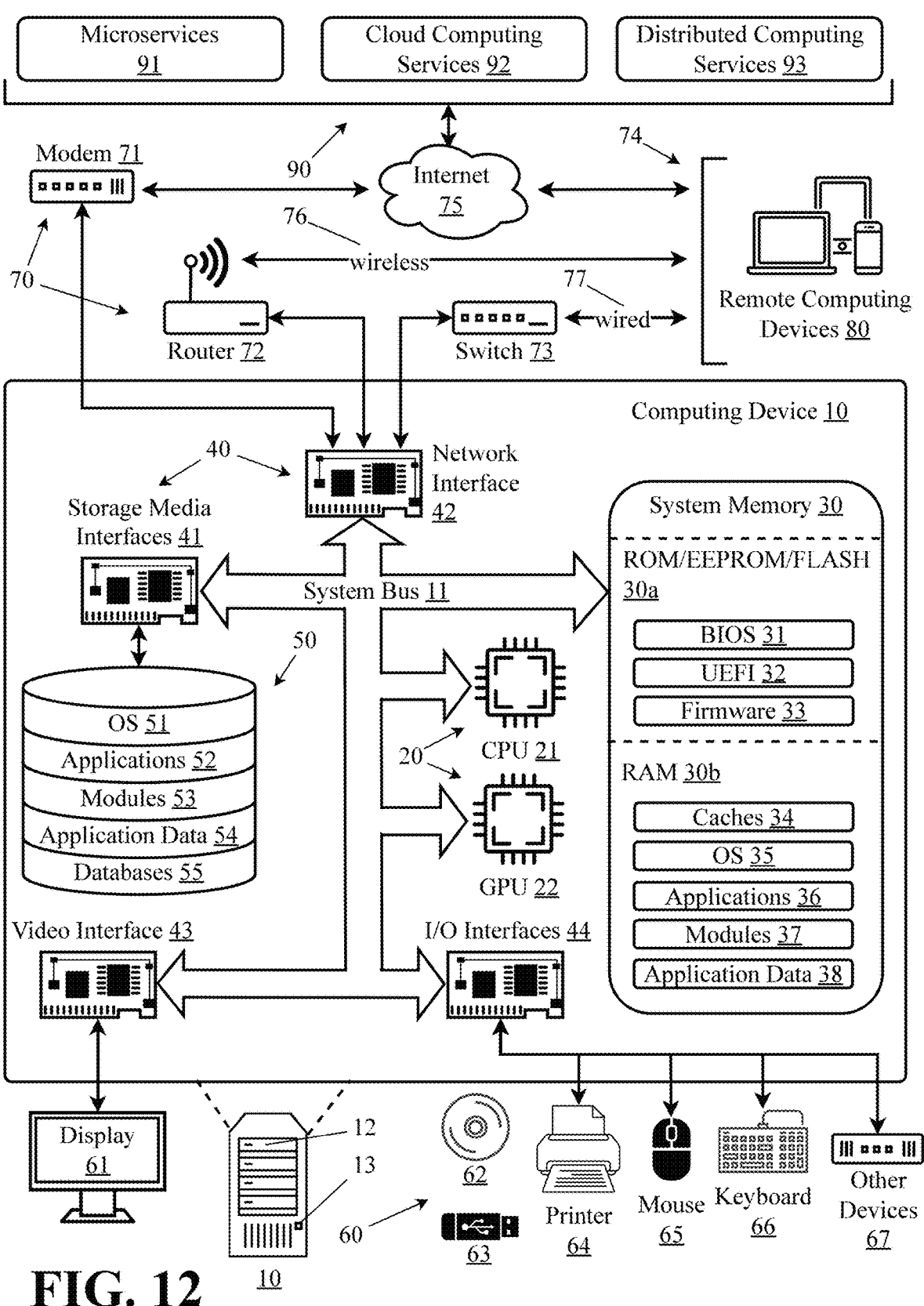
FIG. 12 illustrates an exemplary computing environment on which an embodiment described herein may be implemented, in full or in part.

FIG. 12 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90. The system memory 30 can include a computer readable storage medium.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid-state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, BOSQL databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containers or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

As can now be appreciated, disclosed embodiments utilize a variational autoencoder to enable homomorphic compression techniques. Input data is compressed into a latent space using an encoder network of a variational autoencoder. Homomorphic operations are performed on the compressed data in the latent space. The latent space compressed data is decompressed using a decoder network of the variational autoencoder. The homomorphic operations can enable performing operations while the data is in a compressed form, and preserving the results of those operations after the data is in a decompressed form. One or more embodiments can compress data using partially homomorphic encryption (PHE). The PHE of disclosed embodiments allows for specific types of computations to be performed on encrypted data without decrypting it. For example, in a partially homomorphic encryption scheme that supports addition and multiplication, embodiments can include encrypting a value x, encrypting a threshold value T, and then performing a homomorphic comparison operation to check if x<T. In a medical records application, the value T can be a year, and the value x can be a birth year of a patient in a medical record. The result of this operation provides an encrypted value that represents the comparison result. Continuing with the example, disclosed embodiments can enable checking if a patient referred to in a medical record is above a certain age, without needed to decrypt/decompress the medical record. This powerful feature enables third-party verification operations. Continuing with the example, a third party can perform age verification on medical records while in an encrypted form, such that the third party cannot view any personally sensitive identifying information in the medical records. Thus, the homomorphic encryption and compression of disclosed embodiments can provide a range of benefits including enhanced privacy, data security, reduced storage requirements, efficient data processing, and secure data outsourcing.

Although described above as a physical device, referring again to FIG. 12, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device.

Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for adaptive real-time multi-modal compression with dynamic resource allocation, comprising:

a computing device comprising a processor and a memory;

a plurality of programming instructions stored in the memory which, when operating on the processor, cause the computing device to:

continuously monitor device resource state comprising battery level, CPU utilization, and memory availability;

classify multi-modal input data streams to determine priority levels, wherein the multi-modal input data comprises at least two data types selected from image data, audio data, text data, and sensor data;

determine optimal compression parameters by executing multi-objective optimization that balances compression efficiency, reconstruction quality, and energy consumption while satisfying resource availability constraints;

compress the multi-modal input data using an adaptive variational autoencoder comprising an encoder network with dynamically selectable processing complexity, a unified latent space representation with adjustable dimensionality, and a decoder network;

automatically switch between operational modes based on the monitored device resource state, including an emergency mode that applies maximum compression settings when resources fall below predetermined thresholds; and adapt compression parameters based on observed performance outcomes to improve future optimization.

2. The system of claim 1, wherein the multi-objective optimization utilizes evolutionary algorithms to generate Pareto-optimal solutions that balance the compression efficiency, reconstruction quality, and energy consumption.

3. The system of claim 1, wherein the programming instructions further cause the computing device to measure network transmission conditions and incorporate network bandwidth availability into the multi-objective optimization.

4. The system of claim 1, wherein the adaptive variational autoencoder further comprises modality-specific processing layers for different data types and shared fusion layers for integrating information across modalities.

5. The system of claim 1, wherein the unified latent space representation enables homomorphic operations to be performed on compressed data without decompression.

6. The system of claim 1, wherein the programming instructions further cause the computing device to predict future resource availability using machine learning models trained on historical resource consumption patterns.

7. The system of claim 1, wherein the emergency mode implements intelligent data triage that processes critical data types before non-critical data types according to predetermined priority rankings.

8. The system of claim 1, wherein the system implements a gradual recovery process that incrementally transitions from emergency mode to normal operation while monitoring system stability.

9. The system of claim 1, wherein the dynamically selectable processing complexity comprises lightweight, medium, and heavy processing paths selected based on available computational resources.

10. The system of claim 1, wherein adapting compression parameters comprises updating optimization weights based on actual compression ratios achieved and storing successful configuration parameters for retrieval under similar operational contexts.

11. A method for adaptive real-time multi-modal compression with dynamic resource allocation, comprising the steps of:

continuously monitoring device resource state comprising battery level, CPU utilization, and memory availability;

classifying multi-modal input data streams to determine priority levels, wherein the multi-modal input data comprises at least two data types selected from image data, audio data, text data, and sensor data;

determining optimal compression parameters by executing multi-objective optimization that balances compression efficiency, reconstruction quality, and energy consumption while satisfying resource availability constraints;

compressing the multi-modal input data using an adaptive variational autoencoder comprising an encoder network with dynamically selectable processing complexity, a unified latent space representation with adjustable dimensionality, and a decoder network;

automatically switching between operational modes based on the monitored device resource state, including an emergency mode that applies maximum compression settings when resources fall below predetermined thresholds; and adapting compression parameters based on observed performance outcomes to improve future optimization.

12. The method of claim 11, wherein determining optimal compression parameters comprises utilizing evolutionary algorithms to generate Pareto-optimal solutions that balance the compression efficiency, reconstruction quality, and energy consumption.

13. The method of claim 11, further comprising measuring network transmission conditions and incorporating network bandwidth availability into the multi-objective optimization.

14. The method of claim 11, wherein compressing the multi-modal input data comprises processing different data types through modality-specific processing layers and integrating information across modalities through shared fusion layers.

15. The method of claim 11, wherein the unified latent space representation enables performing homomorphic operations on compressed data without decompression.

16. The method of claim 11, further comprising predicting future resource availability using machine learning models trained on historical resource consumption patterns.

17. The method of claim 11, wherein the emergency mode comprises implementing intelligent data triage that processes critical data types before non-critical data types according to predetermined priority rankings.

18. The method of claim 11, further comprising implementing a gradual recovery process that incrementally transitions from emergency mode to normal operation while monitoring system stability.

19. The method of claim 11, wherein the dynamically selectable processing complexity comprises selecting between lightweight, medium, and heavy processing paths based on available computational resources.

20. The method of claim 11, wherein adapting compression parameters comprises updating optimization weights based on actual compression ratios achieved and storing successful configuration parameters for retrieval under similar operational contexts.

\* \* \* \* \*